(12) United States Patent
Dolgoff

(10) Patent No.: US 10,298,904 B1
(45) Date of Patent: May 21, 2019

(54) PRACTICAL STEREOSCOPIC 3-D TELEVISION SYSTEM

(71) Applicant: Gene Dolgoff, Westbury, NY (US)

(72) Inventor: Gene Dolgoff, Westbury, NY (US)

(*) Notice: Subject to any disclaimer, the term of this patent is extended or adjusted under 35 U.S.C. 154(b) by 191 days.

(21) Appl. No.: 15/244,365

(22) Filed: Aug. 23, 2016

Related U.S. Application Data

(63) Continuation of application No. 12/983,869, filed on Jan. 3, 2011, now Pat. No. 9,423,602.

(60) Provisional application No. 61/380,966, filed on Sep. 8, 2010, provisional application No. 61/291,768, filed on Dec. 31, 2009.

(51) Int. Cl.
| | |
|---|---|
| *H04N 13/122* | (2018.01) |
| *H04N 13/305* | (2018.01) |
| *H04N 13/324* | (2018.01) |

(52) U.S. Cl.
CPC ......... *H04N 13/122* (2018.05); *H04N 13/305* (2018.05); *H04N 13/324* (2018.05)

(58) Field of Classification Search
CPC ....... G02B 21/365; G02B 21/06; G02B 21/16
See application file for complete search history.

(56) References Cited

U.S. PATENT DOCUMENTS

| | | |
|---|---|---|
| 1,295,842 A | 3/1919 | Berger |
| 1,422,527 A | 7/1922 | Berger |
| 1,673,793 A | 6/1928 | Ames, Jr. |
| 2,056,600 A | 10/1936 | Crosier |
| 2,118,160 A | 5/1938 | Cawley |
| 2,301,254 A | 11/1942 | Carnahan |
| 2,349,071 A | 5/1944 | Baird |
| 2,365,212 A | 12/1944 | Oriol |
| 2,384,260 A | 9/1945 | Goldsmith |
| 2,508,920 A | 5/1950 | Kell |
| 2,621,247 A | 12/1952 | Wright |
| 2,931,855 A | 4/1960 | Abramson |
| 3,621,127 A | 11/1971 | Hope |
| 3,737,567 A | 6/1973 | Kratomi |
| 3,821,466 A | 6/1974 | Roese |

(Continued)

FOREIGN PATENT DOCUMENTS

EP 1176807 A1 1/2002

*Primary Examiner* — Jonathan R Messmore
(74) *Attorney, Agent, or Firm* — Clifford H. Kraft

(57) ABSTRACT

The present invention provides the first practical stereoscopic 3-D television/computer solution for home consumers. Taking advantage of the way the human brain processes imagery, a new compression algorithm, utilizing a new concept called "shared pixel parts", allows for the transmission, reception, and display of full HD stereoscopic 3-D video with no loss of resolution or frames to either eye, using a single conventional TV channel and any type of conventional display without alteration. Depending on the type of display used, viewers wear either passive polarized glasses, a new type of static colored filter glasses, or a new type of active colored filter glasses to view the same data signal showing virtually ghost-free full-color images with great depth, a wide angle of view, and a bright flickerless image which doesn't produce any discomfort even after extended viewing, and the signal is also compatible with current 3-D-ready TVs. Unlimited 3-D content can be made available instantly as well, from any video source including TV, Internet, video games, DVD, Blu-ray, camcorders, digital phones, DVRs, and VCRs.

2 Claims, 36 Drawing Sheets

(56) References Cited

U.S. PATENT DOCUMENTS

| | | | |
|---|---|---|---|
| 4,134,644 A | 1/1979 | Marks et al. | |
| 4,424,529 A | 1/1984 | Roese et al. | |
| 4,441,791 A | 4/1984 | Hornbeck | |
| 4,523,226 A | 6/1985 | Lipton et al. | |
| 4,995,718 A | 2/1991 | Jachimowicz et al. | |
| 5,012,274 A | 4/1991 | Dolgoff | |
| 5,221,982 A | 6/1993 | Faris | |
| 5,300,942 A | 4/1994 | Dolgoff | |
| 5,327,285 A | 7/1994 | Faris | |
| 5,537,144 A | 7/1996 | Faris | |
| 5,564,810 A | 10/1996 | Larson | 353/8 |
| 5,640,273 A | 6/1997 | Hamagishi et al. | |
| 6,064,424 A | 5/2000 | van Berkel et al. | |
| 6,111,598 A | 8/2000 | Faris | |
| 2003/0072161 A1 | 4/2003 | Hough et al. | 362/293 |
| 2003/0076423 A1 | 4/2003 | Dolgoff | G03B 35/16 348/222.1 |
| 2004/0218269 A1 | 11/2004 | Divelbiss et al. | 359/464 |
| 2005/0146540 A1 | 7/2005 | Marshall et al. | |
| 2005/0264904 A1 | 12/2005 | Sato et al. | 359/885 |
| 2005/0270649 A1 | 12/2005 | Thiel et al. | 359/603 |
| 2006/0270077 A1 | 11/2006 | Behfar et al. | 438/24 |
| 2007/0194121 A1* | 8/2007 | Yang | G06K 7/10722 235/454 |
| 2007/0285663 A1 | 12/2007 | Hewitt et al. | 356/399 |
| 2008/0036854 A1 | 2/2008 | Elliott et al. | |
| 2009/0002481 A1* | 1/2009 | Kim | H04N 19/597 348/42 |
| 2009/0002830 A1 | 1/2009 | Okamoto | 359/589 |
| 2009/0040608 A1 | 2/2009 | Tsai et al. | 359/487 |
| 2009/0168026 A1 | 7/2009 | Chen | 353/20 |
| 2009/0213459 A1 | 8/2009 | Amirparviz | 359/465 |
| 2009/0322861 A1 | 12/2009 | Jacobs et al. | 348/53 |

* cited by examiner

PRACTICAL STEREOSCOPIC 3-D TELEVISION SYSTEM

CROSS-REFERENCES TO RELATED APPLICATIONS

This is a continuation-in-part of application Ser. No. 12/983,869 filed Jan. 3, 2011, now U.S. Pat. No. 9,423,602 issued Aug. 23, 2016. Application Ser. No. 12/983,869 claimed priority from provisional application No. 61/380,966 filed Sep. 8, 2010 and provisional application No. 61/291,768 filed Dec. 31, 2009. Application Ser. No. 12/983,869, 61/380,966 and 61/291,768 are hereby incorporated by reference in their entireties.

FIELD OF THE INVENTION

The present invention pertains to three dimensional ("3-D") television display systems.

BACKGROUND

At least as far back as Sir Charles Wheatstone's invention of the stereoscope in the 1840s, people have been making stereoscopic 3-D images using various methods in an effort to capture and play back the most realistic reproduction of past experiences and entertaining presentations. Ever since the invention and development of television, beginning in the 1930s and continuing to the present, people have tried to produce a practical 3-D television system (especially for viewing by multiple viewers simultaneously) utilizing various methods that were forerunners of today's most significant competing 3-D TV systems. With the advent of high-brightness, computer-controlled digital projectors (first developed in the 1980s by the present inventor) that can project polarized right-eye and left-eye stereoscopic images without any need of operator alignment, 3-D movies in theaters have finally become mainstream and profitable. Their widespread acceptance, success, and rapid growth have created a new high level of consumer acceptance of, and demand for, stereoscopic entertainment utilizing 3-D glasses. This has resulted in an unprecedented demand for a practical, high quality, affordable stereoscopic TV system solution. The predominant competing 3-D TV display approaches center around four different viewing technologies: Anaglyphic (or other colored) Glasses, Polarized Glasses, Shutter Glasses, and Glasses-Free Viewing. Several proposals have also been made as to how to send two video streams over a single video channel since stereoscopic 3-D requires separate images for each eye of the viewers.

Anaglyphic Glasses Viewing

In 1918, Christian Berger filed a patent application (now U.S. Pat. No. 1,295,842) for a system to separate the visibility of two images by making them of complementary colors (such as green and red) and using complementary filters to restrict viewing by each eye to one or the other of the images. In 1920, he filed an additional patent application (now U.S. Pat. No. 1,422,527) utilizing the same technique to display anaglyphic stereoscopic 3-D images (the anaglyph technique was first proposed by the painter J. C. d'Almeida in 1858). In 1932, Frank Crosier filed an application (now U.S. Pat. No. 2,056,600) for a camera that shot anaglyphic stereoscopic movies wherein one eye's image was shot in red while the other eye's image was shot in blue and green(cyan). 3-D could be seen by spectators wearing red and blue/green (cyan) glasses. In 1941, John Baird filed for a patent (now U.S. Pat. No. 2,349,071) for an anaglyphic stereoscopic television system utilizing spinning anaglyphic color-wheel filter glasses for the viewers. Later that year, Alfred Goldsmith of RCA applied for a patent (now U.S. Pat. No. 2,384,260) for a full color version of the Baird system utilizing spinning multicolor-wheel filter glasses for the viewers. In 1977, Alvin and Mortimer Marks filed for a patent (now U.S. Pat. No. 4,134,644) to improve the color fidelity of anaglyphic stereoscopic images by using green and magenta filters.

Polarized Glasses Viewing

In 1938, Chalon Carnahan of the Sylvania Corp. filed for a patent (now U.S. Pat. No. 2,301,254) for a stereoscopic television system wherein the right and left images were interlaced, alternate lines on the display screen were polarized perpendicularly, and the viewers wore polarized glasses. In 1945, Ray Kell of RCA applied for a patent (now U.S. Pat. No. 2,508,920) for a stereoscopic color TV system which alternately transmitted the left and right images in sequence as alternate fields, utilizing a rotating polarizing filter in front of the display and polarized glasses for the viewers. In 1963, the current inventor developed a stereoscopic TV system utilizing two displays placed at right angles to each other, which were also polarized perpendicular to each other, whose images were overlapped with a beam combiner for 3-D viewing with polarized glasses. Similar systems are available today utilizing LCDs, for instance, from Planar Corp. In 1984, the current inventor built the world's first LCD projector, filing a patent on it in 1987 (application number 140,233, which became U.S. Pat. No. 5,012,274 after refiling in 1988), in which he disclosed methods of projecting stereoscopic 3-D (utilizing either front-projection or rear-projection) with an LCD projector, wherein the viewers wear polarized glasses or view the 3-D without glasses through a special lenticular screen. This technology was expanded to include any type of light valve projector in his 1991 patent application (now U.S. Pat. No. 5,300,942).

In 1990, Sadeg Faris applied for a patent (now U.S. Pat. No. 5,327,285) disclosing how to make a micro-polarizer sheet to be placed over an LCD screen, polarizing certain pixels in one direction and other pixels in the perpendicular direction. Also in 1990, he applied for a patent (now U.S. Pat. No. 5,537,144), which disclosed how to use the micro-polarizer attached to an LCD to provide a stereoscopic video display for viewers wearing polarized glasses. In 2006, Arisawa Corp., partly under a license from him (in addition to their own technological improvements), began making and selling other companies' LCD displays with attached micro-polarizer filters and the electronics to take two simultaneous stereoscopic video signals, provided in any one of four formats, and interlace them so that the even lines display one eye's image and the odd lines display the other eye's image, allowing viewers to see a stereoscopic 3-D image when wearing polarized glasses. The four formats are: 1. One image above the other image within a single frame, each image being compressed to half its height, 2. One image beside the other within a single frame, each image being compressed to half its width, 3. Sequentially presented full frames, first a left-eye frame, then a right-eye frame, and then a left-eye frame, and so on, and 4. A sequence of frames in which each frame consists of a left-eye image interlaced with a corresponding right-eye image.

In 1993, Faris applied for a patent (now U.S. Pat. No. 6,111,598) using his micro-polarizer technology, but using a more complex cholesteric micro-filter array structure (disclosed by him in 1991 in U.S. Pat. No. 5,221,982), using a direct-view LCD display and polarized color multiplexing, to improve upon an earlier technology invented by Karen Jachimowicz and Ronald Gold, filed in 1989 (now U.S. Pat. No. 4,995,718), that also utilized polarized color multiplexing, but with a single full-color video projector, with the addition of an electronically controlled liquid crystal polarization rotator (such as a pi-cell), which provided viewing of projected stereoscopic 3-D images by viewers wearing polarized glasses. A pi-cell is a liquid crystal polarization rotator that was developed at Tektronix Corp. in 1984. It is capable of rotating the polarization of light 90 degrees, quickly and on demand. The pi-cell is used today in front of the projection lens of digital projectors in most movie theaters showing 3-D movies. In his patent, Faris also described methods using polarized glasses with a pi-cell polarization rotator placed over a CRT or other display screen, and a system utilizing complex image processing to form spectrally multiplexed images which are viewed through complex active polarizing glasses that use six different wavelength bands for each eye.

Shutter Glasses Viewing

In 1922, Adelbert Ames Jr. applied for a patent (now U.S. Pat. No. 1,673,793) utilizing shutter glasses to view 3-D images. In 1941, Ramon Oriol filed for a patent (now U.S. Pat. No. 2,365,212) for making motion pictures in which successive frames of the movie were alternately right eye and left eye views, with the spectators wearing electromechanical shutter glasses. In 1969, Karl Hope applied for a patent (now U.S. Pat. No. 3,621,127) for stereoscopic TV and movie systems which alternately displayed left and right images while the viewer wore wireless shutter glasses whose shutters opened and closed by mechanical action. The invention of the liquid crystal display (LCD) in the 1970s, which led to many important breakthroughs in the development of stereoscopic TV displays, also led to improved shutter glasses for 3-D viewing. In 1972, Shunsei Kratomi applied for a patent (now U.S. Pat. No. 3,737,567) for a stereoscopic, alternating frame system using liquid crystal shutter glasses. In 1974, a similar system was described in a patent application (now U.S. Pat. No. 3,821,466) by John Roese, who later improved upon it in his 1980 patent application (now U.S. Pat. No. 4,424,529) by remotely triggering the shutter glasses, making them wireless. In 1985, Lenny Lipton, Michael Starks, James Stewart, and Lawrence Meyer filed an application for a patent (now U.S. Pat. No. 4,523,226) disclosing an improved shutter-glasses-based stereoscopic display system, wherein the display operated at 120 Hz, rather than the usual 60 Hz, to diminish the flicker seen in all previous stereoscopic shutter glasses systems.

In 1982, Larry Hornbeck of Texas Instruments applied for a patent (now U.S. Pat. No. 4,441,791) for a new type of display device utilizing an array of micro-mirrors on a deformable membrane, referred to as a deformable mirror device (DMD), eventually also being referred to as a digital light processor (DLP). This light-valve based system is capable of very fast frame rates. In 2004, Stephen Marshall, Michael Allbright, and Bill McDonald, also of Texas Instruments, applied for a patent (U.S. pending application publication number 20050146540) that added the technique of image dithering to the DMD to increase the apparent resolution of the image. This was done by doubling the display frequency to 120 Hz and displaying the same image data twice in two different positions (½ a pixel apart), making the boundaries of the individual pixels less noticeable. In 2006, Keith Elliott, David Hutchison, Henry Neal, and Bradley Walker, also of Texas Instruments, applied for a patent (U.S. pending application publication number 20080036854) to use the dithered DLP for stereoscopic 3-D projection, displaying the left and right eye images sequentially, one after another. Utilizing this system with liquid crystal shutter glasses reduces perceived flicker since the DLP projector operates at 120 Hz (rather than conventional television's 60 Hz), allowing each eye to see 60 flashes per second. To further minimize the visibility of pixels and flicker, the left and right images are displayed as alternating checkerboard patterns (with the checkerboard squares rotated to form diamond shapes). With this method, one pattern (sent to one of the viewers' eyes through shutter glasses), beginning in the first row of pixels with a pixel showing image information, is followed by a black pixel, which is followed by another pixel showing image information, and so on, while the second pattern, sent to the other of the viewers' eyes, begins with a black pixel, followed by a pixel showing image information, followed by a black pixel, and so on. Every other field is shifted horizontally by the width of half a pixel, with respect to the previous field, to provide the appearance of higher resolution and to reduce the appearance of pixels. In 2007, this system, built into a cabinet utilizing rear-projection, was licensed to Samsung and Mitsubishi, which are currently marketing it as a 3-D-ready television.

Glasses-Free Viewing

In 1930, Aloysius Cawley filed for a patent (now U.S. Pat. No. 2,118,160) for a color stereoscopic system projecting polarized images onto a prismatic screen for 3-D viewing without any need for special glasses. In 1950, Arthur Wright filed for a patent (now U.S. Pat. No. 2,621,247) for a color stereoscopic TV system utilizing the color wheel and a lenticular type of screen for glasses-free 3-D viewing. In 1957, Albert Abramson filed for a patent (now U.S. Pat. No. 2,931,855) disclosing designs for stereoscopic television utilizing either one of a lenticular lens or a barrier screen on the front of the display for glasses-free 3-D viewing. Although many people have also proposed and patented various lenticular-based auto-stereoscopic television displays throughout the years, the first TV system to get rid of the obvious and annoying black lines visible between columns of pixels on an LCD screen utilizing a lenticular lens was Cornelis van Berkel of the Philips Corp., who filed a patent application on it (now U.S. Pat. No. 6,064,424) in 1997, wherein he tilted the lenticular lenses with respect to the columns of pixels. The system displays nine different perspective views over a few predefined angles, within which viewers can see an auto-stereoscopic image with parallax, without the need to wear any special glasses. Through the years, many people have also proposed and patented auto-stereoscopic LCD television displays utilizing a parallax barrier. One example is disclosed in a patent application filed in 1995 (now U.S. Pat. No. 5,640,273) by Goro Hamagishi of the Sanyo Corp. In recent years, NewSight Corp. has been selling parallax barrier LCD stereoscopic television displays in which the parallax barriers are also tilted with respect to the columns of pixels on the LCD, providing a similar auto-stereoscopic viewing experience (to the lenticular version), also without the need to wear any special glasses.

Drawbacks of the Various 3-D TV Systems Listed Above

This history (above) summarizes the advances made in the technologies that have proven to be the most promising in producing working 3-D television displays. However, none of them have succeeded in overcoming all obstacles regarding required quality, simplicity, practicality, and affordability to enable any of them to be accepted by the marketplace and become the standard for consumer stereoscopic 3-D television.

Anaglyphic (and other color-separation) glasses-viewed displays, still in use today, fail to provide natural color imagery and usually produce eyestrain and headaches after a relatively short period of time. This is due to color rivalry and brightness imbalance between the images supplied to the two eyes of the viewers. In addition, the difficulty in providing filters that match the colors emitted by TV sets and efficiently separate the images by their color, due to the overlapping spectra of TV phosphors or filters, causes ghosting that reduces the 3-D effect, blurs image elements in front of, and behind, the image plane, and provides an annoying experience.

Spinning filter wheels and other mechanical devices are unreliable, prone to breakage, noisy, and bulky.

Perpendicular dual displays are expensive, bulky, and ugly.

Lenticular displays provide a limited angle of view, after which an annoying pseudoscopic image, followed by an annoying jump, can be seen. In addition, the full-screen image resolution is divided by the number of images being shown at different angles, dramatically reducing the resolution of each image. The display also only works within a narrow range of distances from the display. Being too close or too far from the display produces eyestrain and eliminates the appearance of 3-D. In addition, due to image crosstalk, two or more images can always be seen at the same time, causing ghosting and blurring of image elements appearing too far in front of, or behind, the image plane. This limits the amount of depth that can be shown with this technology.

Parallax barrier displays have the same drawbacks as lenticular displays, with the added drawback that they produce a dimmer image.

The polarized color multiplexing projector system technology requires an electronic polarization rotator in front of a projector, making direct view stereoscopic display with conventional direct-view televisions impossible.

The combination of polarized color multiplexing with micro-polarizer technology utilizes a complex system requiring special cameras and either an expensive complex series of large (as big as the entire display) electro-optical (pi-cell) panels, or, alternately, an expensive, complex, never-before-tried cholesteric micro-polarizer filter screen installed in front of a display. Color multiplexing active cholesteric glasses requires 6 wave-bands and complex processing.

Shortcomings of Today's Leading 3-D TV System Candidates

As of the filing date of this application there is no compression and transmission system capable of providing the ability to encode stereoscopic image pairs over a single TV channel wherein each image of the stereo pair is transmitted with full high-definition resolution while enough unique (representing different points in time) stereo pairs are transmitted per second to provide the full standard video frame rate for each eye. Nor is there a way to display stereoscopic image pairs on readily available TV monitors wherein each image of the stereo pair is displayed with full high-definition resolution while enough unique (representing different points in time) stereo pairs are displayed per second to provide the full standard video frame rate for each eye. This is primarily because the current HDTV standard was designed to transmit and display 30 frames per second, with each frame having a resolution of 1920 by 1080 pixels. Doubling the information content (required to send and display stereo pairs of images) would produce data that would not fit into a single TV channel utilizing prior art technologies and the doubled information content could not be displayed on conventional TV monitors utilizing prior art technologies since they only have 1920×1080 pixels. In other words, the current HDTV standard does not support the amount of information required to transmit and display two images needed for 3-D at the maximum resolution and frame rate for both required stereoscopic images. Sensio has developed an algorithm which is currently used most often in 3-D encryption and decryption, that could be used for broadcast application. However, they also discard half of the pixels from each eye's image to cut the bandwidth requirement of each image of each stereo pair in half to allow transmission on a single channel.

Currently there are mainly only two types of stereoscopic 3-D TV systems being sold in "commercial quantities." Today's front-runners for an acceptable consumer 3-D TV system (referred to as "3-D-ready TVs") are: 1. The DLP-based rear projection, LED-illuminated LCD, and plasma-panel-based televisions viewed with shutter glasses (the "alternate frame" system); and 2. The simple micro-polarizer LCDs viewed with polarized glasses (the "alternate line" system).

The first type of system, the "alternate frame" system, alternately drops every other frame from each of the two streams of frames intended for the viewer's two eyes and transmits the remaining frames, one at a time, in an interleaved sequence. One version of this system, utilizing a digital micro-mirror device (DMD) developed and patented by Texas Instruments, has mainly been productized in rear projection TV sets sold primarily by Samsung and Mitsubishi. Another version of this "alternate frame" system, sold by Samsung, Sony, L G, and Panasonic, utilizes either a flat-panel plasma or LED-illuminated LCD display. Both "alternate frame" systems utilize shutter glasses to direct each image of each stereo pair to the proper eye of the TV viewers. The shutter glasses are not inexpensive (currently being sold for $150 each) and produce the appearance of some noticeable flicker (especially in peripheral vision), since each eye alternately switches from total black to total image brightness, giving the flicker the highest possible contrast and visibility. During one second, each eye of the viewer is shown image information derived from only 15 unique frames. Each eye's image is "jumpy" since every other original frame of action for each eye is missing. To reduce the appearance of flicker, the frames are stored in buffers on the receiving end and either each frame is flashed at least twice or interpolation based on motion prediction algorithms is used to produce intermediate frames. However, even with monitors operating at 120 Hz, the rods in many people's eyes (which make up 125 million of the 130 million receptors of each eye and which are found predominantly in the periphery of the retinas) can still detect the flicker, which is annoying and can create eyestrain and headaches after a period of time.

Since each eye sees black at least 50% of the time, the shutter cuts the overall perceived TV image brightness to half (or less). In addition, since the glasses use polarizers, while light coming from the TVs are not polarized, perceived brightness is further reduced by an additional 60 to 70%, bringing the visible image brightness down to about 30-35%. The TVs initially required the hook up and use of an external computer, with installation of special software, reducing their potential audience (although this computer function is now built into 3-D-ready sets). To synchronize the TV picture with the glasses, an infrared transmission system is used which is directionally sensitive, causing loss of synchronization (and 3-D), creating a brief double image if the viewer's head is not in the right position and/or orientation.

The other type of stereoscopic 3-D TV system on the market, the "alternate line" system, alternately drops every other line from each frame in the two streams of stereo pairs intended for the viewer's two eyes, interlacing the remaining lines from each stereo pair of images into a single frame. When each of these interlaced frames is displayed on the TV monitor, the odd lines display one eye's image while the even lines display the other eye's image. Currently, while this system is becoming popular in Europe, the US has very limited sales. Since less of these sets have been sold, their prices are much higher than alternate-frame (shutter glasses) 3-D TVs. Even though the alternate-line system produces less ghosting than the alternate-frame system, the increased profit margin on sales of shutter glasses has resulted in this imbalance in sales volumes of the two systems.

This alternate line system utilizes micro-polarizers, each the height of one scanning line, adhered to the front of the monitor so that each scanning line is polarized perpendicular to the next scanning line. Wearing simple, inexpensive polarized glasses to direct each image of each stereo pair to the proper eye of a TV viewer, one of the viewer's eyes will see only the odd lines while the other of the viewer's eyes will see only the even lines, providing a 3-D image to the viewer. When viewing this image with both eyes and polarized glasses, however, each eye sees an image wherein every other line appears black. This cuts the resolution and brightness of each eye's image in half. It also introduces jaggies, creating image artifacts, and eliminates fine detail, often making small, originally readable text unreadable.

This is illustrated in FIGS. 1a-1h. FIG. 1a is a high-definition image. FIG. 1b is a close-up view of part of the image showing extremely fine text which is parallel to the horizontal. FIG. 1c is a close-up view of another area on the image showing some small readable text situated at nearly a 45° angle. FIG. 1d shows the actual display pixels in a portion of the image in FIG. 1c, as seen through a magnifying lens. FIG. 1e depicts the same image shown in FIG. 1a except that every other line is black. This is what one eye would see with this "alternate line" system described above. FIG. 1f shows a close-up view of the same area shown in FIG. 1b, but with every other line being black. With every other line of data missing, the fine text is noticeably difficult to read. FIG. 1g shows a close-up view of the small previously readable text situated at nearly a 45° angle depicted in FIG. 1c, again with every other line being black. This text is now virtually unreadable. FIG. 1h shows the actual display pixels of the display as in FIG. 1d, as seen through a magnifying lens, with every other line being black. Notice also that straight lines in FIG. 1a (such as the lines depicting the edge of the door and the bottom edges of the front bumper and the left side of the car body) become jagged in FIG. 1d.

Another drawback of the alternate line system is that the micro-polarizer is attached to the outside surface of the LCD, thereby being spaced a distance away (the thickness of the LCD glass) from the actual pixels. Consequently, there is a limited vertical viewing angle (you can't stand up or lie on the floor when viewing this display), beyond which parallax error (between pixels and micro-polarizers) causes both images to be seen by each eye, eliminating the 3-D and creating an annoying double image.

As stated above, since the micro-polarizers are mounted on the outside of the glass surface of the monitor, while the liquid crystals which form the image are on the opposite side of the glass, a parallax error is created, producing a limited vertical angle of view. This is depicted in FIG. 2. The LCD monitor 210 comprises liquid crystal material 216 suspended between two glass plates, one plate 212 on the viewer side of the LCD and one plate 214 on the light source side (light source not shown). Odd horizontal scanning lines, such as those indicated at 220, are viewed through micro-polarizer stripes 270 and through one polarizer 244 in the viewer's polarized glasses 240. Each odd scanning line 220 subtends an angle 250 through each micro-polarizer stripe 270. The even scanning lines 230 are similarly visible through corresponding micro-polarizer stripes 280 subtending a similar angle, and are visible through the other polarizer 242 in the viewer's glasses 240. The viewer sees 3-D through the polarized glasses 240 when viewing the LCD screen 210 within the subtended viewing cone 250. However, if the viewer attempts to view the screen from an angle 260 outside of the viewing cone 250 (such as happens when standing up), each eye will see a double image and no 3-D. At such an angle, light from odd scanning lines 220 can be partially seen through micro-polarizer stripes 270 and through polarizer 244 in the viewing glasses 240 as well as through micro-polarizer stripes 280 and through polarizer 242 in the viewing glasses 240, simultaneously. The same is true for even scanning lines 230. Currently this type of system is being sold by Pavonine, Zalman, Hyundai, and JVC.

All systems suffer from the fact that, to display a stereoscopic image, two images must simultaneously be transmitted and displayed over a single television channel, which is only large enough for one image. Consequently, displaying the two images to create stereoscopic viewing reduces the overall information content (resolution or motion smoothness of each eye's image) by 50% (although time-multiplexing and image shifting techniques used in the DLP-based system reduce the ability to notice this loss somewhat).

No 3-D System Available for Existing Displays

The switch to 3-D consumer television would be most successful if already-installed home televisions, computers, hand-held devices, and projectors, as well as newly manufactured made-for-3-D TV displays, could be utilized to display 3-D. Although new types of displays (LCD, plasma, DLP, LED, OLED, Laser, etc.) are becoming very popular, and CRT televisions are no longer being sold, there is still a very large established base of CRT television ownership throughout the world, and CRT televisions have the longest lifetime (often 20 years or more). Consequently, the best 3-D TV solution would also allow owners of any type of television, including current CRT set owners, to watch 3-D TV. Unfortunately, however, none of the current 3-D television technologies work with existing conventional 2-D televisions. Additionally, since many "3-D-ready" TV displays (utilizing the 3-D display technologies detailed above) have already been sold to consumers, any new 3-D TV technology would be more widely accepted if it was also compatible with such existing 3-D-ready displays.

The Chicken/Egg Barrier to Development of a 3-D Solution

Another problem that has to be overcome before successful consumer 3-D television can become a reality is the chicken/egg problem created by the lack of 3-D content and the lack of an installed base of consumers with 3-D-capable TV sets. Without an established "best solution" to form the basis for a 3-D TV standard, most TV manufacturers can't justify the expenditures necessary to develop, mass produce, mass-market, and aggressively sell a 3-D TV system to consumers. Without confirmation that there will be a widespread installed base of 3-D TV set owners, and without the knowledge of what the 3-D television standard will be, content providers can't justify the expense of large-scale production of 3-D television content. Thus, in addition to the need for a practical 3-D TV technology to be found, a source of virtually unlimited 3-D content must also be developed for the transition to 3-D TV to occur.

To foster the development of a 3-D TV industry, there is a strong need for a 3-D television technology that can work with all existing TV sets of any kind (without modification), as well as with all new TV sets that will be manufactured and sold in the foreseeable future. These sets need to provide at least 30 frames (taken at different times) per second (for NTSC) or at least 25 frames (taken at different times) per second (for PAL) for each eye, the highest possible resolution displayed with top-quality 3-D (showing bright and sharp images at all depths, with no ghosting, full undistorted color, viewability from all angles, and no perceivable flicker, eyestrain, or headaches) and need to be able to utilize currently available single-channel bandwidths, at an affordable price.

SUMMARY OF THE INVENTION

The present invention relates to creating 3-D TV content, encoding stereoscopic image pairs for transmission over a single TV channel, displaying stereoscopic image pairs on new as well as readily available displays, and directing each image of each stereo pair to the proper eye of a TV viewer. The present invention also provides the means to display 2-D images with double the resolution of the display used ("double resolution images") without changing the resolution of the display device nor the bandwidth of the transmission. In this patent disclosure, it is to be understood that "TV" also refers to any type of video display including those connected to computers, whether viewed directly or projected, and hand-held displays.

Present Day Color Television

To understand the value of the inventive encoding schemes discussed herein, it is helpful to start by looking at the compression method used in present-day color television.

In the 1960s, color information was added to analog black-and-white TV utilizing what is called the "YUV color space". The Y component represents the complete black-and-white luminance information, which was already present in black and white TV. It contains all the information and resolution of the image being transmitted and displayed. Two additional signals, referred to as U and V, which provide chrominance (color) information, were added to the signal on 3.58 MHz subcarriers 90° out of phase with each other. By using simple arithmetic on the receiving end, the U, V, and Y signals are used to calculate the values of all three color signals (red, green, and blue) for display on color sets.

Analog video signals are now converted into digital video signals for transmission. Full conversion of all analog video information to digital form, however, would produce too much information for even the most advanced computers to manipulate quickly enough and to store economically. Consequently, digital video compression is utilized to reduce the raw bitstream by a factor of 100.

Two of the important techniques utilized are called sampling and quantization. The sampling rate is the number of samples of the analog signal taken each second. Only the values of the signal at the sampling points are utilized, the rest of the data being discarded. Quantization limits the number of bits of information allocated to each sample of the analog signal, which limits the fidelity of its reproduction. Several standards have been established dictating different combinations of sampling rates and quantization for different applications. Since it has been discovered that the human visual system is less sensitive to changes in color than it is to changes in luminance, the U and V chrominance signals are sampled at a lower rate (less often) than the luminance signal. The luminance signal is sampled at a frequency of four times a selected base sampling frequency of 3.375 MHz (4×3.375 MHz equaling 13.5 MHz. This sampling rate frequency of 13.5 MHz is required according to the Nyquist theorem. The theorem states that the sampling frequency must be greater than twice the bandwidth of the signal being sampled to capture every frequency within the signal. The standard NTSC TV signal uses a 6 MHz bandwidth, thus 13.5 MHz satisfies the requirement.). The chrominance signals (U and V), however, are only sampled at twice the base frequency (2×3.375 MHz which equals 6.75 MHz) and then (for HDTV transmission) the chrominance values from consecutive lines are averaged. Consequently, four pixels (two adjacent pixels on one scanning line and the two adjacent pixels on the scanning line directly beneath it) are given the same chrominance values. This makes these four pixels have the same color, although they may have different luminance values (brightnesses).

The pixel arrangement, including labeling of the signal information content of the pixels, is illustrated in FIG. 3, which shows two adjacent pixels on a present day color TV display and the two adjacent pixels below them. The samples are quantized to a bitrate of 8 bits each. With this technique, an average of only 12 bits is used for each pixel, which is half the information that would be required if the U and V signals were sampled at the same frequency that the luminance signal is sampled. Sharing color information between pixels in this way successfully reduces the number of required bits per pixel. This standard color format, (referred to as the 4:2:0 format) is used for DVDs and HDTV broadcasts. The success of this technique demonstrates the acceptability of consumer television images with reduced chrominance (color) resolution as long as the luminance resolution is reproduced faithfully. Referring with more particularity to FIG. 3, four adjacent pixels, 310, 320, 330, and 340 are represented. Each of them is associated with a Y, U, and V value. However, pursuant to the discussion above, only the Y value, representing luminance is unique to each pixel in this group. The four pixels have the same U and V values.

Y, U, and V values are computed prior to transmission from image RGB values in the following way:

$Y=(0.587*G)+(0.114*B)+(0.299*R)$ $U=0.493*(B-Y)$ $V=0.877*(R-Y)$

Like this universally accepted color-sharing technique (explained above) which is used to reduce the amount of information needed to be transmitted to convert black-and-white TV to color, the present invention utilizes an additional, but different, color-sharing encoding and playback technique to allow the conversion of high-definition color television to stereoscopic 3-D high-definition color television, while still being able to utilize the same currently available TV channel bandwidth and TV displays currently in use. No currently existing or proposed system accomplishes this end without the loss of resolution or the loss of video frames, as well as without various other limitations of image quality and viewability.

The present invention provides, for the first time, an end-to-end practical solution for stereoscopic 3-D TV, mobile, and computer applications. It includes means for generation of unlimited 3-D content using an instant conversion system, a new compression algorithm utilizing specially selected subsets of sub-pixels (referred to as "pixel parts") from the stereoscopic images generated, which can be transmitted simultaneously within a single TV channel or Internet bitstream and displayed on any existing or new monitor without any loss of resolution or frames for either eye of viewers, and can be viewed over wide angles with the highest quality, flicker-free, artifact free, full-color, High-Definition 3-D, either with passive polarized glasses and a special new unique micro-array screen filter on the monitor (for new displays), or with no modification to existing monitors utilizing new unique electronic active or static color-separation glasses with special new transmission curves. Various embodiments are described. The 3-D signal can be provided to viewers, for instance, on selected channels designated as 3-D channels, on regular 2-D channels at special times, on a pay-per-view or video-on-demand basis, or through Internet sites for direct viewing or storage allowing viewing at a later time (including on distributed pre-recorded media such as DVDs, video CDs, mobile device memories, and Blu-ray disks). The use of pixel parts and the pixel-part addressing methods described herein provide for viewing of 2-D images with twice the native resolution of the viewing display used for viewing.

Consequently, it is an advantage of the present invention to overcome all of the currently existing 3-D TV system drawbacks to produce a stereoscopic television system that meets the requirements of the marketplace.

One advantage of the present invention is the ability to produce a stereoscopic television display system that displays a full-screen-resolution image to each eye with 30 unique frames per second to each eye for NTSC televisions (25 frames per second to each eye for PAL) utilizing the currently allotted bandwidth for a single TV channel and current television display monitor resolution.

Another advantage of the present invention is the ability to produce a stereoscopic television display system that displays a bright enough image to be comfortably seen in a well-lit room.

An additional advantage of the present invention is the ability to produce a stereoscopic television display system that displays a stereoscopic 3-D image viewable by as many viewers as desired from any vertical or horizontal viewing angle and from any viewing distance.

A further advantage of the present invention is the ability to produce a stereoscopic television display system that displays an image without any noticeable flicker.

Still another advantage of the present invention is the ability to produce a stereoscopic television display system that displays an image that doesn't produce any eyestrain or headache.

Another advantage of the present invention is the ability to produce a stereoscopic television display system that can be used to display stereoscopic 3-D on any existing television display (such as CRT, LCD, LED, OLED, Plasma, Laser, DLP, or other projection) with the use of simple 3-D glasses, without adding to, or changing the display itself.

Yet another advantage of the present invention is the ability to produce a stereoscopic television display system that displays stereoscopic 3-D on newly manufactured televisions with only simple inexpensive polarized glasses needed for viewing.

An additional advantage of the present invention is the ability to produce a stereoscopic television display system that displays stereoscopic 3-D on existing flat-panel televisions with only simple inexpensive polarized glasses needed for viewing.

Another advantage of the present invention is the ability to produce a stereoscopic television display system that displays stereoscopic 3-D on existing 3-D ready televisions.

A further advantage of the present invention is the ability to produce a stereoscopic television display system that displays an image with virtually unlimited depth, both in front of, and behind, the image plane of the television, providing image sharpness without ghosting at all displayed depths.

Still a further advantage of the present invention is the ability to produce a stereoscopic television display system that displays TV images incorporating these advantages with the capability of converting all regular 2-D television signals to 3-D, providing unlimited 3-D content.

An additional advantage of the present invention is the ability to display 2-D images on any display with twice the native resolution of the display itself.

An additional advantage of the present invention is the ability to provide a stereoscopic television display system that displays 3-D TV images on existing 2-D or 3-D-ready displays which only requires viewers to wear inexpensive passive, static color-separation glasses for 3-D viewing.

The present invention successfully mimics the human perception of reality using the existing bandwidth allocation for transmitting a television program, whereas systems of the prior art categorically fail in this endeavor. Quantum physicists teach that time and space are not infinitely divisible, but rather are segmented into discrete packets. For purposes of this application, time and space, as described by quantum physicists shall be referred to as objective reality. Contrary to objective reality, the human eyes and brain, making up a psycho-visual system, perceive time and space as continuous. In the same vein, color is a phenomenon that exists only in the psycho-visual system of the human brain. Light, at a given frequency and amplitude, is given qualities such as hue, saturation, and luminance in the psycho-visual system. Certain combinations of colors and brightnesses sent to the two eyes of a viewer cause eyestrain whereas other color/brightness combinations are considered complementary or harmonious. Any perception of color, motion, brightness, or structure is created in the brain. It is evident, therefore, that the human perception of reality is not an exact representation of objective reality. Instead, it is an illusion. The present invention zeros-in on the critical factors at play in inducing the illusion of reality in the human psycho-visual system and allocates a TV channel's bandwidth to these factors appropriately. The criticality of these factors is counterintuitive and heretofore has been unappreciated by others. Only in hindsight is it clear that systems of the prior art fail in mimicking the human perception of reality because they allocate bandwidth to unneeded information while sacrificing information pertaining to these critical factors. An example of this is transmitting unnecessary chrominance information at the expense of critical motion information or image resolution.

The two 3-D TV systems currently being sold (at year-end 2009) sacrifice either half of the image resolution or of the motion information from each eye's image to enable the transmission of stereo pairs over a single channel and the display of stereo pairs on existing displays. The present invention, on the other hand, enables the sending, at 30 frames per second for each eye for NTSC (25 frames per second for each eye for PAL), of two full-resolution, high-definition color stereoscopic images over a single channel and their display on a conventional display screen by utilizing a new color data compression algorithm, while leaving luminance data intact to be displayed in full resolution. The human psycho-visual system produces its experience of image sharpness and resolution by detecting perceived spatial frequencies of image borders that appear as a result of adjacent pixel brightness (luminance) differences rather than as a result of perceived color differences. Resolution detail is detected and analyzed in different areas of the brain than color information, which is analyzed in less detail. This fact was utilized in the development of the current color television standard. Looking at a present-day color TV image which includes a red object on a white background, for instance, it may be seen that the red color goes beyond the borders of the object, like a picture from a child's coloring book in which the crayon marks don't stay inside the lines defining the image. The chrominance (color) signal has a lower resolution (and thus, lower data content) than the luminance signal, allowing an "apparently" full-color image to be sent over a single black-and-white-sized TV channel, while the full resolution of the black-and-white image is still present and perceived.

Current 3-D TV systems using 3-D glasses separate the stereoscopic right-eye and left-eye images (from each stereo pair displayed on the monitor screen) and send each to the proper eye of the viewer using one of three methods. This is accomplished without modification to the monitor itself either by color separation using colored (such as anaglyphic) glasses, by time separation using shutter glasses, or, with the addition of a micro-polarizer screen filter attached to the monitor, by spatial separation using polarized glasses. Each technique has its own drawbacks, producing an unsatisfactory sub-optimal 3-D TV solution. The present invention utilizes unique new combinations of these techniques to eliminate the drawbacks encountered when using only one technique alone.

The present patent disclosure exemplifies the use of pixels which consist of three sub-pixels. However, it is to be understood that the same basic technique, in accordance with the present invention, can be applied to pixels containing other numbers of sub-pixels. In some of the embodiments of the present invention, only half of the transmission bandwidth and half of the on-screen display's sub-pixels are actually used for each image (each image being one half of a stereo-pair) at any given instant of time. However, instead of the usual way pixels are addressed, each pixel is split into two parts, one part consisting of one sub-pixel and the other part consisting of two sub-pixels. This produces twice as many "pixel parts" as there are pixels. The luminance information from each of any two given transmitted "corresponding" pixels ("corresponding" meaning two pixels, each pixel from nearly or essentially the same scene location in each image of a stereo pair, being transmitted and displayed) are displayed using only parts of two pixels on the display. To the human psycho-visual system, it appears that the full luminance information corresponding to all pixels within each image of each original stereo pair is transmitted and displayed. This is accomplished with luminance data from each original pixel being displayed on its own "pixel part" of the display screen, which results in the perception by the viewer of full luminance resolution of each image of each stereo pair.

In a preferred embodiment, to provide the most uniformity during the display of each frame, every other row alternates as to whether the first "pixel part" in the row comes from the right eye image or the left eye image at any given time, creating alternating offset rows. Chrominance information is sacrificed, but since most immediately (horizontally and vertically) adjacent visible pixels in any given image have the same, or nearly the same, color makeup, their close proximity to each other results in no perceptible color information loss in most of the image. When there is a significant color error, it is at a feature boundary that is generally too small to be noticed. Such errors go unnoticed because the human psycho-visual system is generally unable to detect errors in fine image detail, and especially in color, at image boundaries, in moving images, and during scene changes. Even small text usually appears correct and without noticeable artifacts with the present invention. Since each image of each stereo pair is displayed using only half the sub-pixels on the display, the apparent image brightness is reduced, which can be satisfactorily corrected for by slightly increasing brightness, contrast, and saturation levels before and/or after transmission as well as during display.

Discarding part of the chrominance information from each original pixel can preferably be accomplished before the image information is transmitted. This enables the transmission of the full luminance information of both images of the stereo pair over a single channel. This step can, however, be performed within or near the TV display itself (for instance, if the two images of each stereo pair are generated from a local stereo camera, DVD, or computer) to allow display on a conventional TV display.

Although the sub-pixels within any display pixel can be partitioned into two "pixel parts" using any one of three possible combinations (red and blue/green, green and red/blue, or blue and red/green), the preferred split is green and red/blue. This combination matches the color presentation sequence provided to each eye over time in preferred embodiments of the present invention (as explained below) minimizing the possibility of seeing any flicker or brightness variation between the two eyes of a viewer. During one progressively scanned frame (or two fields in an interlaced display), every two "pixel parts" from each odd scanning line (forming one screen pixel), in conjunction with the two "pixel parts" on the even scanning line below it (forming another screen pixel), display three colored sub-pixels (forming one full-color pixel) to each eye of the viewer, while displaying the luminance data of four pixels (two pixels for each eye).

In the 2-D enhanced resolution embodiment of the present invention, adjacent pixel parts are used to display the luminance information of adjacent pixels from an image with higher resolution than the display that the image will be viewed on. Since there are twice as many pixel parts in a scanning line of a given display as there are pixels, this method allows for the display of twice as many pixel luminance values within a scanning line as there are actual full-color pixels within the scanning line. This provides twice the resolution on a given display as compared to display of image information utilizing conventional techniques.

Therefore, an aspect of the present invention is a method for efficiently compressing and encoding a specific number of input double-resolution image frames, and subsequently decoding and displaying to a viewer the same specific number of output double-resolution image frames, wherein all double-resolution image frames comprise pixels and sub-pixels and specific luminance information values in each frame, while retaining said specific luminance information values in each output double-resolution image frame during display as was present in each input double-resolution image frame, comprising:

receiving a first input double-resolution image stream comprising odd-numbered pixels from first input double-resolution image frames having a first frame rate, a first number of input frames, and a first transmission bandwidth, each first input double-resolution image frame having a first resolution and its own unique set of specific luminance information values;

receiving a second input double-resolution image stream comprising even-numbered pixels from second input double-resolution image frames having a second frame rate, a second number of input frames, and a second transmission bandwidth, each second input double-resolution image frame having a second resolution and its own unique set of specific luminance information values;

compressing said first input double-resolution image stream and said second input double-resolution image stream by generating a composite image stream comprising composite image frames using data from said first input double-resolution image frames and said second input double-resolution image frames, said composite image stream having a third frame rate, a third number of input frames, and a third transmission bandwidth, wherein said third frame rate is similar to said first or second frame rates, said third number of input frames is similar to said first or second number of input frames, said third transmission bandwidth is similar to said first or second transmission bandwidths, each said composite image frame having a third resolution which is similar to said first or second resolutions, wherein said composite image stream is generated by selectively encoding color sub-pixel information from each said first input double-resolution image frame and each said second input double-resolution image frame of said first input double-resolution image stream and said second input double-resolution image stream into said composite image frames forming said composite image stream;

decoding said composite image stream into first output double-resolution image frames forming a first output double-resolution image stream and second output double-resolution image frames forming a second output double-resolution image stream, said first output double-resolution image frames and said second output double-resolution image frames forming composite output double-resolution image frames, wherein said first output double-resolution image stream has a frame rate similar to the first frame rate, a number of output frames substantially the same as the first number of input frames, and a transmission bandwidth similar to the first transmission bandwidth and wherein said second output double-resolution image stream has a frame rate similar to the second frame rate, a number of output frames substantially the same as the second number of input frames, and a transmission bandwidth similar to the second transmission bandwidth, and wherein each said first output double-resolution image frame has a resolution similar to said first resolution and wherein each said second output double-resolution image frame has a resolution similar to said second resolution; and displaying said first output double-resolution image frames, whereby said first output double-resolution image frames have substantially the same sets of luminance information values as the first input double-resolution image frames and whereby said second output double-resolution image frames have substantially the same sets of luminance values as the second input double-resolution image frames, whereby both said first and second output double-resolution image frames are seen by said viewer as combined into output double-resolution image frames with substantially the same sets of luminance values as the input double-resolution image frames.

When using existing displays (electronic, printed, or otherwise), the preferred method of viewing stereoscopic images using the present invention is with passive, static colored glasses utilizing specially designed color filters, since they are lightweight and inexpensive and can provide a reasonably bright image with a minimum of ghosting or color distortion, allowing for maximum quality full-color 3-D visualization. Such special filters are currently available from The 3D Source, Inc., 139 Linden Avenue, Westbury, N.Y. 11590, phone: (516) 338-5020, email: info@the3dsource.com. They are currently designated as FC3DL for the left eye and FC3DR for the right eye.

The preferred method of viewing the stereoscopic images displayed utilizing the present invention on newly manufactured displays is with passive polarized glasses, as they are lightweight and inexpensive and can provide a reasonably bright image with a minimum of ghosting or color distortion, allowing for maximum quality full-color 3-D visualization. Use of these glasses requires the monitor to display sub-pixels from the left and right stereoscopic images with perpendicular polarizations. This polarization is best accomplished in the present invention with the use of a special micro-waveplate lens array filter mounted to the front of the monitor or projection display elements.

When TV sets are newly manufactured, or if an aftermarket product can be mounted on the display screen, the display can be fitted with this new type of wide-angle sub-pixel-sized micro-waveplate screen filter, disclosed herein. The micro-waveplate lens array screen filter rotates the plane of polarization of half of the green sub-pixels and half of the red and blue sub-pixels to one polarization orientation, while transmitting or rotating the other sub-pixels at the perpendicular (or other handed, in the case of circular polarization) orientation. If the display is NOT already polarized, as with plasma technology, for instance, a polarizer can be added to the screen first. The new micro-waveplate lens array screen filter, in addition to having alternating areas of polarization-rotating material arranged in a layout to match the location of displayed left-eye and right-eye image sub-pixels, also preferably has a micro-lens array which focuses the light from each sub-pixel into a the plane of the micro-waveplate filters and, where necessary, into corresponding sections of polarization rotating material itself, eliminating parallax error. In addition, for direct-view displays, the micro-waveplate lens array screen filter also preferably has a diffusion component for wide-angle light dispersion. With this arrangement, the viewers can see full-color stereoscopic 3-D images from wide viewing angles by using simple inexpensive passive polarized glasses, whether using conventional transmission algorithms or the new color data compression algorithms of the present invention, for transmission and display of each of the stereoscopic 3-D images with full resolution and all frames displayed to each eye of viewers.

The present invention can display each stereoscopic image using full-color pixels on each scanning line for each eye, wherein both pixel parts of a single full-color pixel come from the same stereoscopic image over time. For instance, the odd numbered pixels on every odd scanning line and the even numbered pixels on every even scanning line could be displayed to one eye of the viewer over the time required for the display of two image presentation periods (e.g. fields), while the remaining pixels are shown to the other eye of the viewer during the same time, providing properly formatted 3-D imagery with a uniform distribution. Each full-colored pixel can be displayed by activating different pixel parts during different image display periods (for a total of $\frac{1}{30}^{th}$ of a second, for instance).

The algorithms of the present invention are designed so that the same signal that provides stereoscopic 3-D viewing using simple passive polarized glasses with existing displays, fitted with an add-on micro-waveplate lens array screen filter of the present invention, as well as with newly manufactured displays incorporating the micro-waveplate lens array screen filter of the present invention, will also provide the same stereoscopic 3-D viewing experience using the active colored glasses of the present invention with existing displays.

The present invention, consequently, includes a new user-viewing-device referred to herein as "active colored glasses", which are preferred for use with displays that are not polarized (such as plasma or DLP displays). These glasses act in synchronization with the imagery displayed by the display device through a communications channel. The communications channel may comprise a wired connection, or preferably a wireless connection such as via IR or RF. The purposes of this new viewing device are to assure that each of the viewer's eyes sees completely different image data at any given time, and that a full-resolution, full-color image is seen by each eye in every frame. The bandpass filters on the glasses are made with specially designed transmission and blocking bands with narrow cutoffs for each type of display device (CRT, LCD, Plasma, LED, OLED, Laser, DMD, etc.) to minimize crosstalk between the different color components being shown to each eye. Consequently, each image from each stereo pair can be presented to the appropriate eye of the viewer without any significant crosstalk, allowing for the perception of virtually unlimited depth in full color. These unique bandpass filters can also be applied to the production of non-active (static) passive colored glasses for viewing of 3-D imagery on any existing display source with less ghosting, more 3-D, better color rendition, elimination of eyestrain, and a higher perceived brightness than available from anaglyphic glasses of the prior art. With this implementation of the specially designed transmission filters of the present invention, one image of a stereo pair (the left image, for instance) will only address the green sub-pixels of a conventional (3-color sub-pixels per pixel) display, while the other image of the stereo pair (the right image, for instance) will only address the red and blue sub-pixels of the same display.

With the new active colored glasses, different colors are presented to the two eyes of the viewer at different times. There are several sequences of color component presentation that can be utilized to accomplish this with the present invention. Any grouping of colors could be chosen to show different colors to each eye at any given time (red to one eye with green and blue to the other eye, green to one eye with red and blue to the other eye, or blue to one eye with red and green to the other eye). The preferred color component presentation grouping (further explained herein below) is green shown to one eye while red and blue are shown to the other eye, followed by the reverse. The distribution of the colors presented on the display at different times is changed in a specific sequence, depending on whether the display is interlaced or progressively scanned, to match the color sequence presented to the eyes of the viewer through the glasses.

In the following discussion, 60 Hz and 30 Hz are used merely as exemplary field and frame rates respectively. The preferred sequence for an interlaced display comprises displaying, for instance, on the odd scanning lines of the display, to the viewer's left eye, the green information from the odd scanning lines of the left image of a stereo pair while the viewer's right eye is shown (also, for instance, on the odd scanning lines of the display) the red and blue information from the odd scanning lines of the right image of the stereo pair, both during $\frac{1}{60}^{th}$ of a second (the display time of one field), followed by (in the next $\frac{1}{60}^{th}$ of a second) the viewer's left eye being shown (for instance, on the even scanning lines of the display) the red and blue information from the even scanning lines of the left image of the same stereo pair while the viewer's right eye is shown (also, for instance, on the even scanning lines of the display) the green information from the even scanning lines of the right image of the stereo pair. Thus, within $\frac{1}{30}^{th}$ of a second, each eye sees a full color frame of the appropriate image from a stereo pair. The odd scanning lines (of each frame displayed) differ from the even scanning lines displayed, by which scanning line (odd or even) in the frame begins with a "pixel part" originating from the right image and which begins with a "pixel part" originating from the left image. This sequence of color component presentation is repeated every frame to allow the display of all colors in each eye's image on an interlaced display.

The preferred sequence for a progressively scanned display comprises displaying to the viewer's left eye, in the first progressively scanned frame during the first $\frac{1}{60}^{th}$ of a second for a 60-hertz display (or less, such as $\frac{1}{120}^{th}$ of a second in a 120-hertz display), for instance, a specified sub-set ($\frac{1}{3}$) of all the green sub-pixels from the left image of the stereo pair while the viewer's right eye is shown a specified sub-set ($\frac{2}{3}$) of all the red and blue sub-pixels from the right image of the stereo pair. In the next $\frac{1}{60}^{th}$ of a second (or less for a faster display), the viewer's left eye is shown an alternate sub-set ($\frac{2}{3}$) of all the red and blue sub-pixels from the left image of the stereo pair while the viewer's right eye is shown another sub-set ($\frac{1}{3}$) of all the green sub-pixels from the right image of the same stereo pair. This sequence is repeated every $\frac{1}{30}^{th}$ of a second with each new stereo pair corresponding to a new frame. In displays with pulse rates higher than 60 Hz, it is preferable to repeat the frames or fields as many times as possible before the next frame of motion is to be displayed. This is because the human psycho-visual system perceives a more continuous and brighter display with more fluid motion when more frames or fields are displayed per second, even if the frames or fields repeat images already presented to the psycho-visual system.

It is to be understood that the same system (interlaced or progressive) can be used with PAL and with 24 frame-per-second movies (with 3:2 pull-down as well as with direct playback at 24 frames per second or a multiple thereof, as well as any other frame rate).

The active colored glasses of the present invention provide the proper colors to each eye of the viewer in synchronization with the color presentation sequence presented on the display. Although conventionally known shutter glasses produce an objectionable flicker with standard television, the active colored glasses of the present invention overcome this problem. Conventional shutter glasses completely prevent any light from reaching a given eye of a viewer during one half to three quarters of the flashing cycle, while letting the full amount of light enter the same eye during the other half to one quarter of the flashing cycle. The large difference between bright eye stimulation and no eye stimulation, coupled with the fact that the alternately presented "opaque partial cycle" cuts the visible frame rate in half, maximizes the perception of flicker. In contrast, the active colored glasses of the present invention provide light to both eyes at all times, with the colors changing at 60 Hz while displaying 30 frames-per-second to each eye of the viewer (or more for faster displays), minimizing the possibility of perceiving any flicker. The main reason the described color presentation combination is chosen as the preferred method is that color television utilizes a mixture of approximately 59% green, 30% red, and 11% blue to create the experience of white. By switching between green and magenta (red and blue), the brightness difference from one color state to the other for each eye of the viewer is minimized (59% green switches to 41% magenta with this combination of colors). Brightness reduction of perceived green data, such as with neutral density filtering or narrowing of the width of the green passband, can further equalize the energy density perceived by each eye at any given time. Such perceived brightness balance between the two eyes of a viewer is essential to reducing eyestrain and headache production as well as providing proper color perception. Also, sufficient shielding of ambient light is essential to allow viewer's to perceive a brighter image.

The method of display of the present invention, using active colored glasses, allows the viewer to see full-color stereoscopic 3-D images on any type of display without any modification to the display itself. The color filters in the glasses have to be designed to match the color spectra of the pixels on the display being viewed to eliminate any significant crosstalk and resulting ghosting. In addition, while looking through these glasses (when switched on), the outside world will appear naturally colored (unlike the experience of viewing the world through standard anaglyphic or other colored glasses using, for instance, red and green, red and blue, red and cyan, or yellow and blue filters). In addition, when viewing the natural world through the properly designed static colored glasses of the present invention, all colors can be seen naturally by the viewer as well. This has never been accomplished before. Preferably, an adjustment capability is provided on either type of colored glasses to allow viewers with different eye-brain system color make up to make color adjustments for optimal color fidelity.

In summary, utilizing the present invention, superior stereoscopic 3-D imagery can be viewed on any existing display utilizing either the passive static colored glasses of the present invention or the active colored glasses of the present invention, and on displays which include the micro-waveplate lens array screen filter of the present invention with passive polarized glasses. The exact same displayed information will produce essentially the same full-color, full resolution 3-D experience with the active colored glasses as with the passive polarized glasses. The less-expensive static passive colored glasses of the present invention will provide a very similar 3-D viewing experience. The active colored glasses of the present invention will provide somewhat better color stability for many people than the static passive colored glasses of the present invention, while the passive polarized glasses will provide the best color, with the least ghosting of all.

Any source of two stereoscopic images can be used with this system such as, for instance, images from two cameras, 3-D image generation software (such as Maya, Lightwave, SoftImage, and 3-D Studio Max), video games written with 3-D graphics software, or a system that converts 2-D to 3-D, such as disclosed in U.S. Pat. No. 6,392,689, filed in 1998 by the present inventor, which is incorporated in its entirety herein by reference. With the inclusion of an automatic 2-D to 3-D conversion system, there is unlimited 3-D content, which will stimulate 3-D TV manufacturing, 3-D TV sales, and 3-D content production.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 1O shows the same area as FIG. 1c, but using the preferred embodiment of the encoding methods of the present invention on an interlaced display.

DEFINITIONS

Figure 1A:
FIG. 1A shows a high-definition image, here of a car, as an example of an image in general, for discussion purposes in the present patent disclosure.

The following are defined terms for this disclosure:

Field: A subset of the image data for a frame. In the context of interlaced video, each field is half the data of the corresponding frame and contains the image data for every other row of the frame.

Field Rate: This is the rate at which fields are represented on a display. In the context of this specification, 60 Hz is used as an exemplary field rate. However, other field rates are within the scope of the invention.

Frame: One of many consecutive images in a video. In the context of this specification, a video frame displayed in an interlaced fashion consists of two fields.

Frame Rate: The rate at which frames are presented on a display. In the context of this specification, 30 Hz is used as an exemplary frame rate. However, other frame rates are within the scope of the invention.

G-Part: A pixel part consisting of the sub-pixel for green.

Industry Standard: A standard used in the TV industry. It will be understood by those familiar with the TV industry that the industry moves to different standards over time, thereby resulting in a "Prevailing Industry Standard" at any given time.

Jaggies: A jagged, stairstep effect on curved or diagonal lines.

Pixel: A picture element on a display having a red, a green, and a blue sub-pixel. A pixel can also be thought of as having two pixel parts. However, other pixels being made up of a different number of and/or differently colored sub-pixels are within the scope of the invention.

Pixel Part: A component of a pixel comprising a subset of the total number of sub-pixels that make up the pixel. For instance, with pixels that consist of three sub-pixels, a pixel part can consist of either one or two sub-pixels.

RB-Part: A pixel part consisting of the sub-pixels for red and blue.

Sub-Pixel: A color component of a pixel such as a red, green, or blue component.

DETAILED DESCRIPTION

There are four essential capabilities that are needed, at minimum, in order to produce a successful 3-D TV system:
1. The ability to create, or convert from existing 2-D sources, virtually unlimited TV content consisting of stereoscopic image pairs wherein each image of the stereo pair is created with full high-definition resolution while enough unique (representing different points in time) stereo pairs are created per second to provide the full standard video frame rate for each eye;
2. The ability to encode and transmit stereoscopic image pairs over a single TV channel wherein each image of the stereo pair is transmitted with full high-definition resolution while enough unique (representing different points in time) stereo pairs are transmitted per second to provide the full standard video frame rate for each eye;
3. The ability to display stereoscopic image pairs on readily available TV monitors wherein each image of the stereo pair is displayed with full high-definition resolution while enough unique (representing different points in time) stereo pairs are displayed per second to provide the full standard video frame rate for each eye; and
4. The ability to direct each image of each stereo pair to the proper eye of the TV viewers, with a minimum of crosstalk, to provide observability of high-quality 3-D TV to the viewers over wide viewing angles.

Item number 1 (creation or conversion) can be accomplished with some 3-D content being shot with stereo cameras, some 3-D content being created from scratch by 3-D image generation utilizing computer software, and most 3-D content being converted (at least in the initial years of 3-D TV) by a system that converts existing 2-D content (whether made in the past or newly created in 2-D) to 3-D, as inexpensively as possible, and preferably instantly (on-the-fly), rather than by being converted to 3-D by an expensive, slow, frame-by-frame conversion process (such as rotoscoping). Such instant 2-D to 3-D conversion can best be accomplished by utilization of the "instant 2-D to 3-D conversion system" disclosed in U.S. Pat. No. 6,392,689 by the present inventor.

The present invention provides the solution to satisfy the requirements of item numbers 2 (encoding) and 3 (display) above with a new type of stereoscopic image compression method which utilizes a new technique referred to herein as pixel sharing using pixel parts. Item number 4 is accomplished by the use of passive polarized glasses using monitors fitted with a new filter screen containing a lens and micro-waveplate array or with new static or active colored glasses of the present invention with conventional existing displays. Various embodiments are disclosed.

The compression technique of the present invention utilizes a unique new method referred to herein as pixel sharing of color information using pixel parts, which reduces the required transmission bandwidth and display resolution requirements for each image of each stereo pair by 50%, making room for the simultaneous transmission and display of two stereoscopically related images in each frame, without any noticeable loss in image quality. Unlike the existing 3-D transmission and display techniques in use today, no frames are dropped from either of the two eyes' stereoscopic images and no luminance resolution is lost in either image, making the new technique the superior choice for stereoscopic 3-D transmission and display with existing channel bandwidth, transmission hardware, and conventional display technology.

The standard NTSC television signal is a composite of luminance, color, audio, and synchronization signals. Each of those signals are sampled and quantized independently from each other. The CCIR 601 standard is an accepted set of encoding parameters. Within that standard, different sets of sampling rates and quantization are grouped together to form accepted "formats". The highest fidelity format, referred to as 4:4:4, is used for studio and other professional applications. The Nyquist sampling rate of 13.5 MHz (described above) was divided by 4 to produce a base sampling frequency of 3.375 MHz. In the 4:4:4 format, the luminance (Y), and the two chrominance (U and V) signals are each sampled at 4 times the base frequency (thus the designation of 4:4:4). 4×3.375 MHz=13.5 MHz, resulting in the highest fidelity. With this standard, each pixel has its own luminance and chrominance samples utilizing an average of 24 bits per pixel. In a second standard format, referred to as 4:2:2, the luminance signal is again sampled at 4 times the base frequency (at 13.5 MHz), but the two chrominance signals (U and V) are only sampled at two times the base frequency (at 2×3.375 MHz=6.75 MHz), half the sample rate of the luminance signal. Consequently, there are two luminance samples for every sample of a chrominance pair, resulting in a single color sample being shared by two horizontally adjacent luminance samples. Two such pixels therefore have the same color, although they may have different brightness values. The result is a pixel which only utilizes an average of 16 bits. This format is used for digital video tape. In the 4:2:0 standard format, which is used for DVDs and HDTV, four adjacent pixels (two adjacent pixels on one line and the two adjacent pixels directly below them) share a single set of color values. The color values for the two adjacent pixels on one line are sampled (as in the 4:2:2 standard) at twice the base frequency (6.75 MHz), as are the color values for the two adjacent pixels directly beneath them. However, the two resulting sets of color values (from the two sets of adjacent pixels) are then all averaged together to produce a single set of color values that are shared by all four pixels. This results in an average utilization of only 12 bits per pixel. Consequently, the process of sharing color information between four pixels in this way cuts the number of required bits per pixel, and thus the total number of bytes required to represent the image, in half (as compared to the 4:4:4 format), without any noticeable loss in picture quality.

Figure 4:
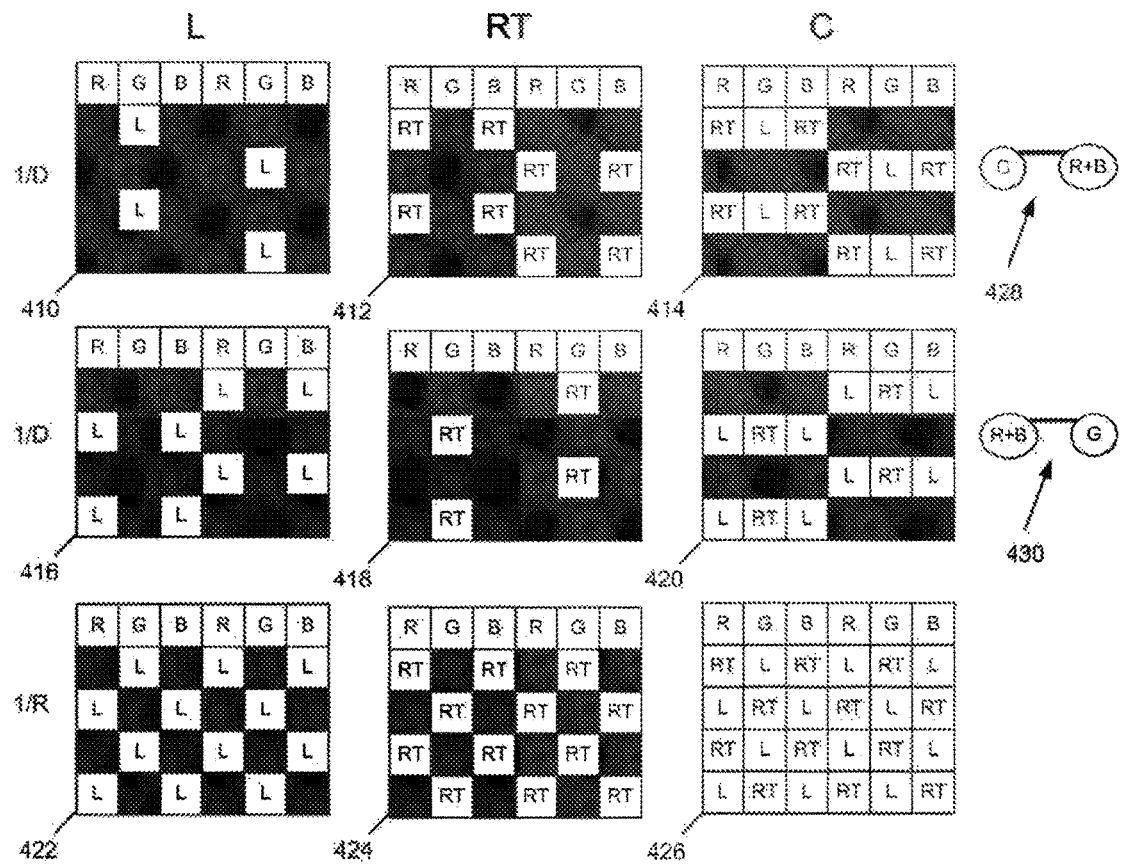
FIG. 4 shows a preferred pixel data processing arrangement of the present invention for producing composite images from two stereoscopic image streams.

The present invention takes this concept one step further by causing the viewer's eye/brain system to share sub-pixel color values of nearby pixel parts in nearby pixels, creating the experience of full-color pixels and a complete full-color image, while cutting the number of required bits per pixel by alternately one third and two thirds (for adjacent pixels), resulting in an overall reduction of the total number of bytes required to represent each image of a stereo pair by an additional 50%, again with no noticeable loss in resolution or color fidelity. When displaying a 2-D image on a given display, the displayed image resolution can be doubled, while again cutting the number of required bits per pixel in half. This perception is generated during display in three ways, which can be understood by referring, for instance, to FIG. 4, which shows the pixel and sub-pixel arrangements on a progressive-scan display utilizing the preferred embodiment of the present invention. FIG. 4 uses the notation 1/D, wherein D represents the number of fields that are displayed in one second for a particular display. Similarly, FIG. 4 includes the notation 1/R, wherein R represents the number of frames that are displayed in one second for a particular display.

Firstly, looking at the processed (according to the present invention) left-eye image (422 in FIG. 4), the green sub-pixel (also referred to herein as the green pixel part or G-Part) in the first pixel of the first row, is turned on and is located right above the first pixel in the second row, which is displaying only the red and blue sub-pixels, as they are also turned on (the red/blue pixel part or RB-Part) during display of one frame. The first pixel in the first row, displaying only the green sub-pixel, is seen to have its own luminance information, as does the first pixel in the second row (which is only displaying red and blue sub-pixel information), in part due to the fact that their values actually come from two different pixels, and in part due to the fact that they occupy two different spatial positions on the display. Consequently, two separate pixels are perceived by the left eye even though only three sub-pixel values are being displayed to the left eye, giving rise to the perception of twice as much data as is actually being transmitted and displayed. The complementarity of the colors also causes the brain to merge them chromatically and create the experience of two different full-color pixels. It is important to note that each perceived pixel has either one or two sub-pixels that are displaying accurate information, with the remaining one or two sub-pixels in each perceived pixel appearing to display an average of the values of those sub-pixels that are turned on in surrounding pixels. This means that each pixel is displaying a unique overall luminance value which is partly completely accurate and partly possibly accurate or close to accurate because most immediately adjacent pixels have the same or a similar color value, further creating the illusion of full-color pixels. Since the perceived luminance values of each pixel will consequently be unique, the image seen will appear to have full resolution. This method is superior to other stereoscopic transmission proposals, such as the Sensio system, which completely discards all data from every other pixel and creates a new pixel on the receiving end by simple nearest-neighbor-interpolation, which is generally very inaccurate (as explained in the discussion of interpolation below).

Secondly, looking at the processed (according to the present invention) right-eye image (424 in FIG. 4), the same situation occurs as it did for the left eye, but in reverse, as only green is displayed in the first pixel of the second row instead of the first row, for instance. As happened with the left eye, the right eye is also tricked into seeing two separate full-color pixels at the beginning of the first and second rows with only half the amount of data actually being displayed.

Figure 1B:
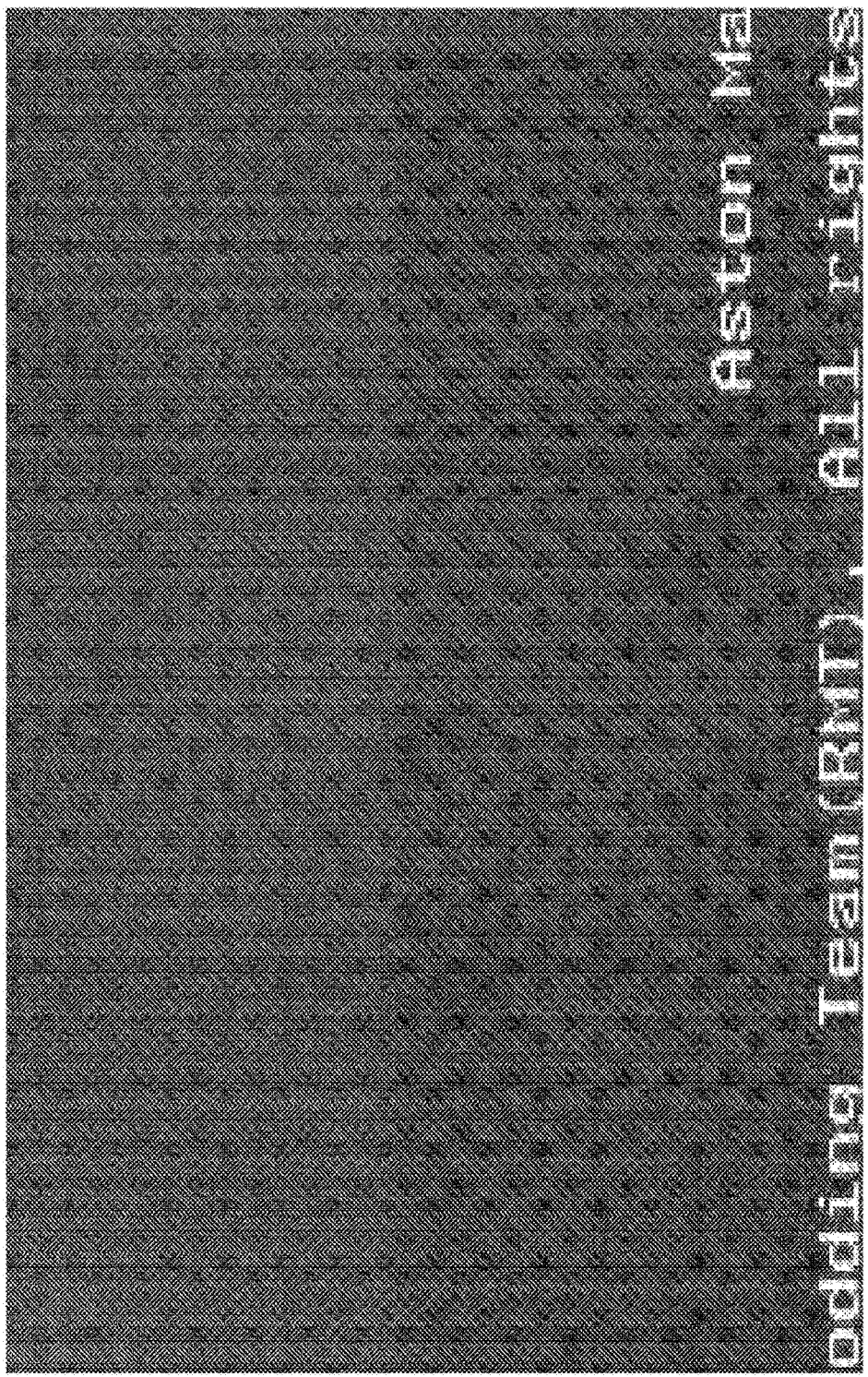
FIG. 1B is a close-up view of part of the image in FIG. 1a, showing extremely fine text which is parallel to the horizontal.
Figure 1C:
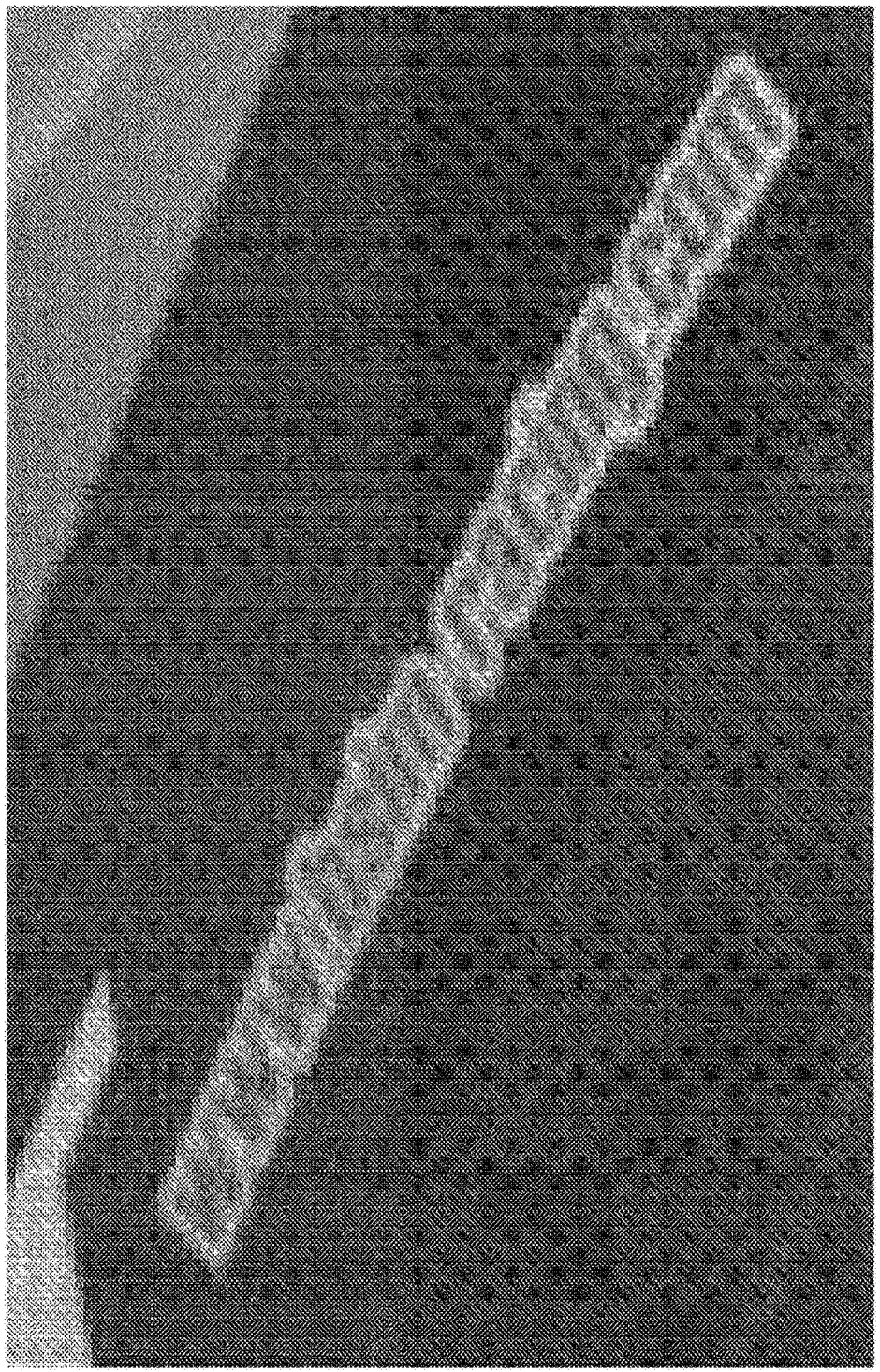
FIG. 1C is a close-up view of another area on the image of FIG. 1a, showing some small readable text situated at nearly a 45° angle.
Figure 1D:
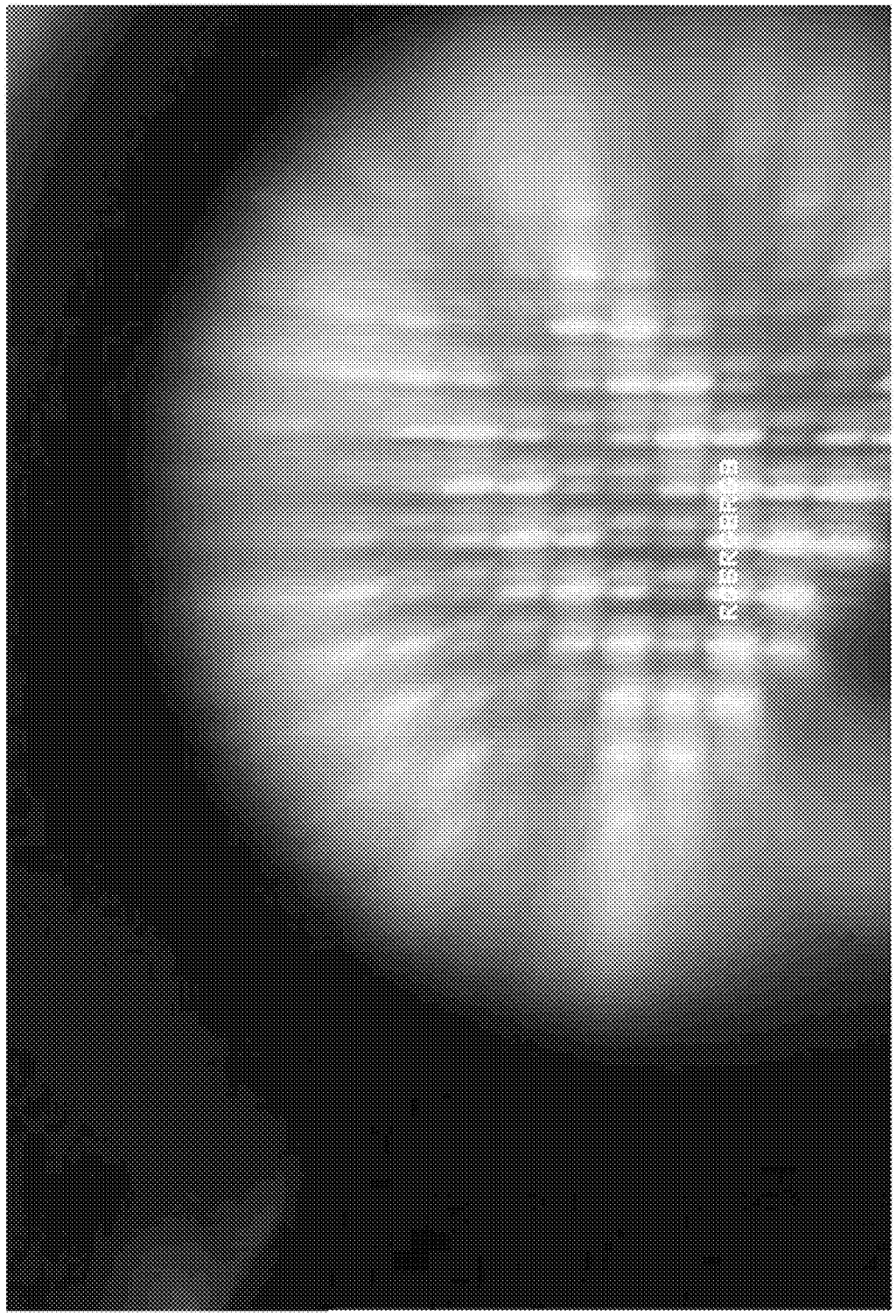
FIG. 1D is a magnified section of a portion of the image in FIG. 1c, showing the pixel structure and the fact that all of the pixels are utilized.
Figure 1E:
FIG. 1E depicts the same image shown in FIG. 1a except that every other line is black, as would be seen using an alternate line system of the prior art described herein.
Figure 1F:
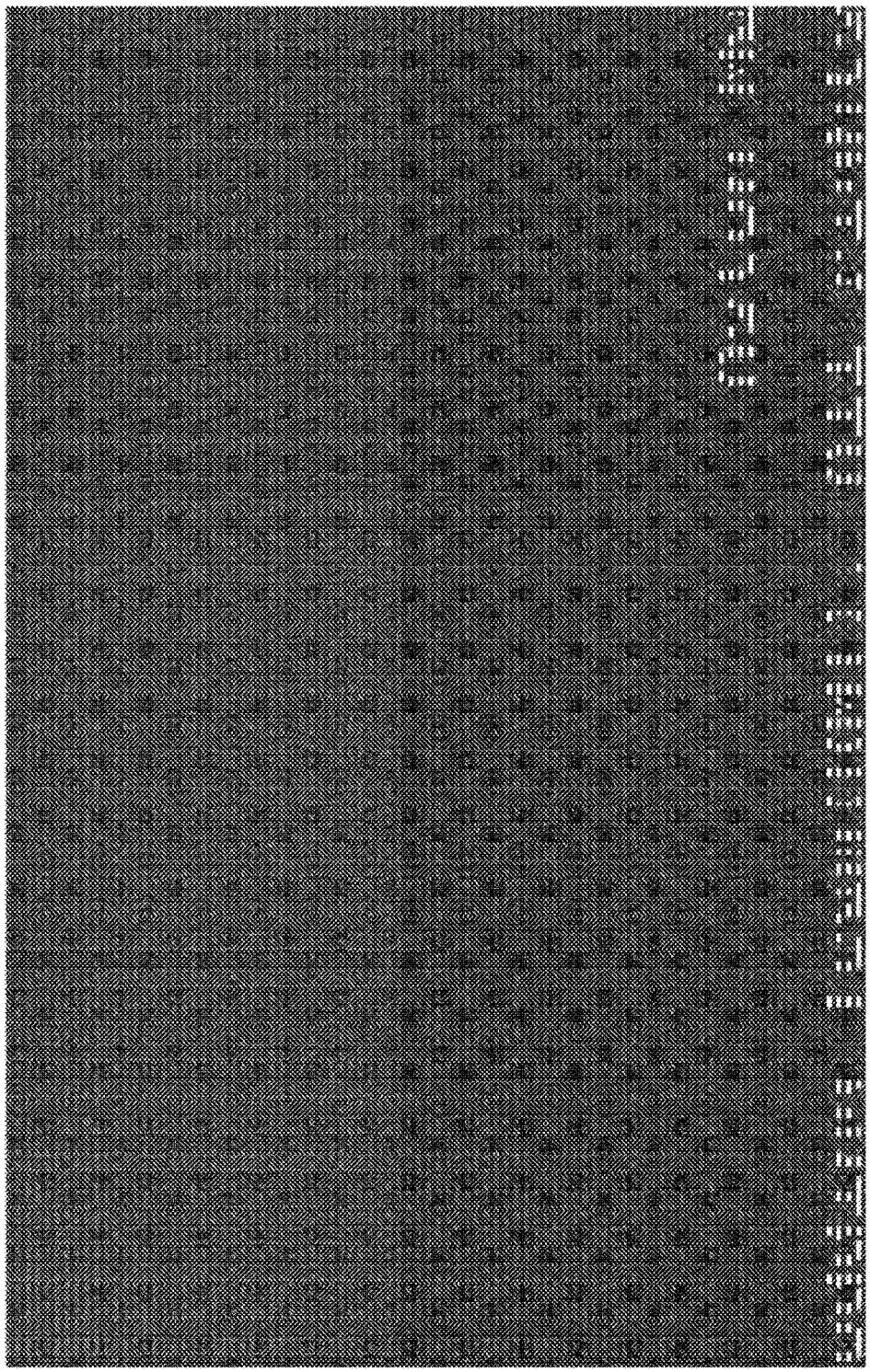
FIG. 1F shows a close-up view of the same area shown in FIG. 1b, but with every other line being black. With every other line of data missing, the fine text is difficult to read.
Figure 1G:
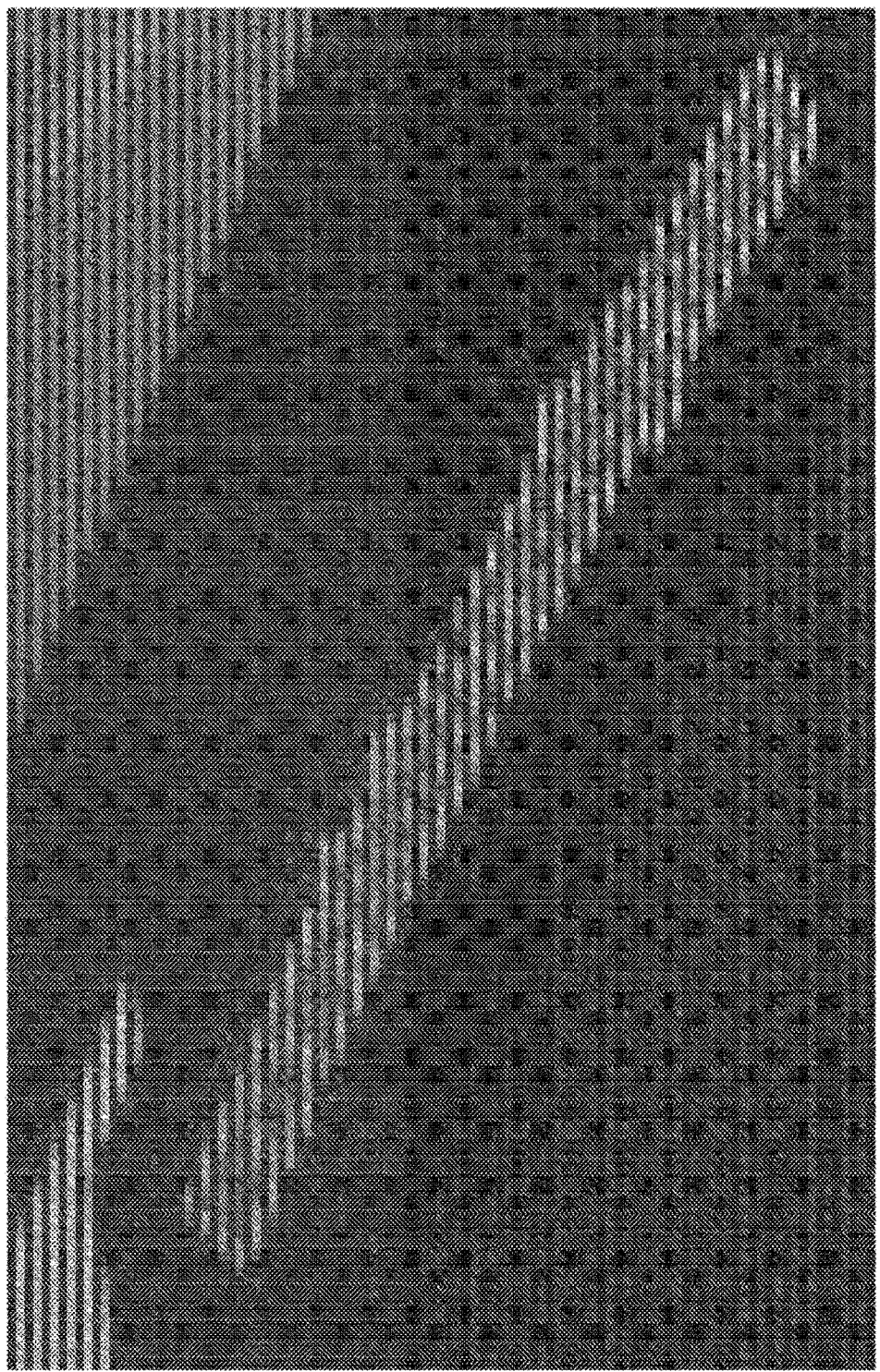
FIG. 1G shows a close-up view of the small previously readable text situated at nearly a 45° angle depicted in FIG. 1c, again with every other line being black, making it unreadable.
Figure 1H:
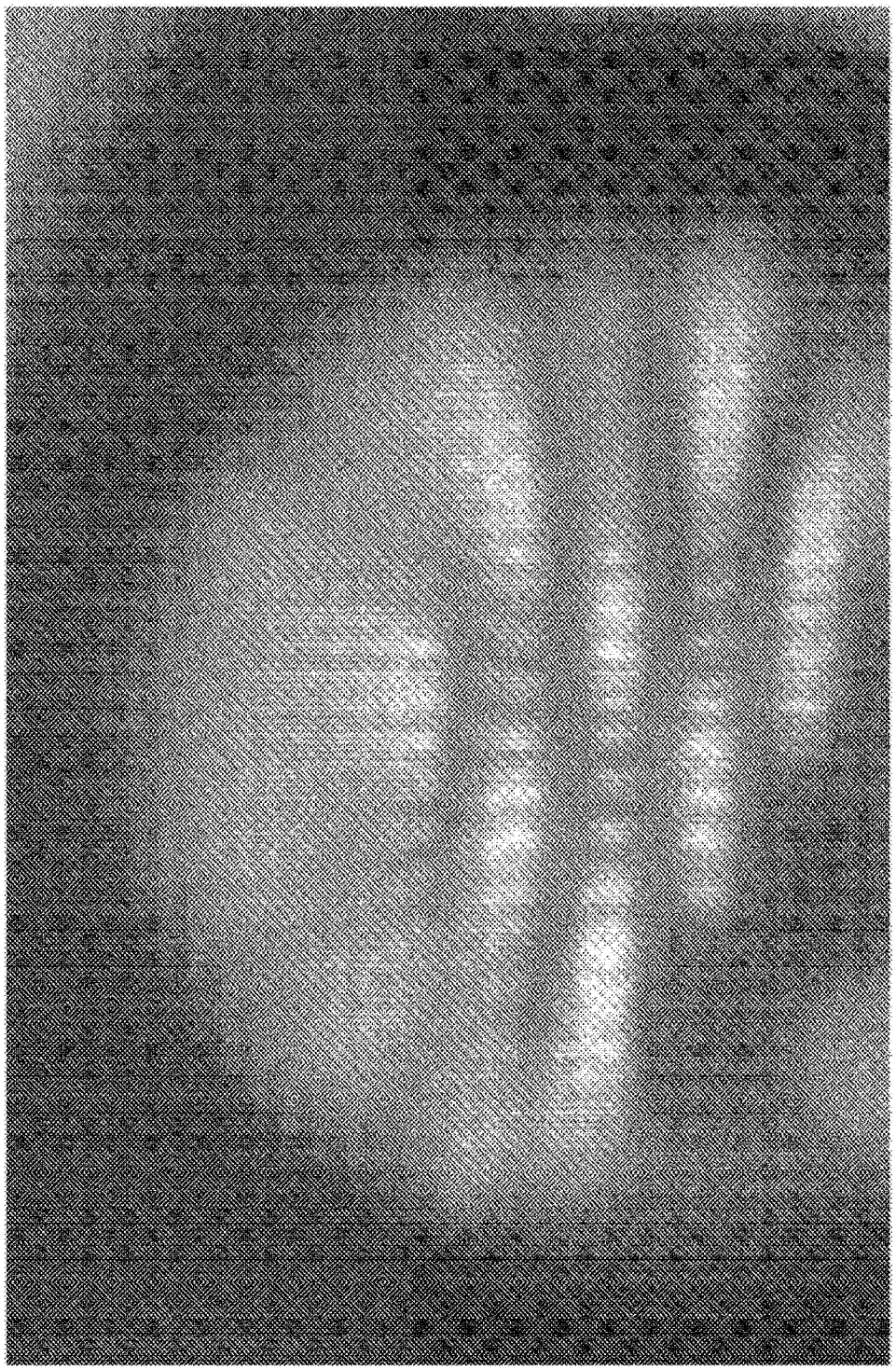
FIG. 1H is a magnified section of a portion of the image in FIG. 1g, showing the pixel structure and the fact that every other row of pixels is black.
Figure 1I:
FIG. 1I depicts the same image shown in FIG. 1a but with each pixel either displaying only the G-Part or the RB-Part, in accordance with a preferred embodiment of the encoding methods of the present invention.
Figure 1J:
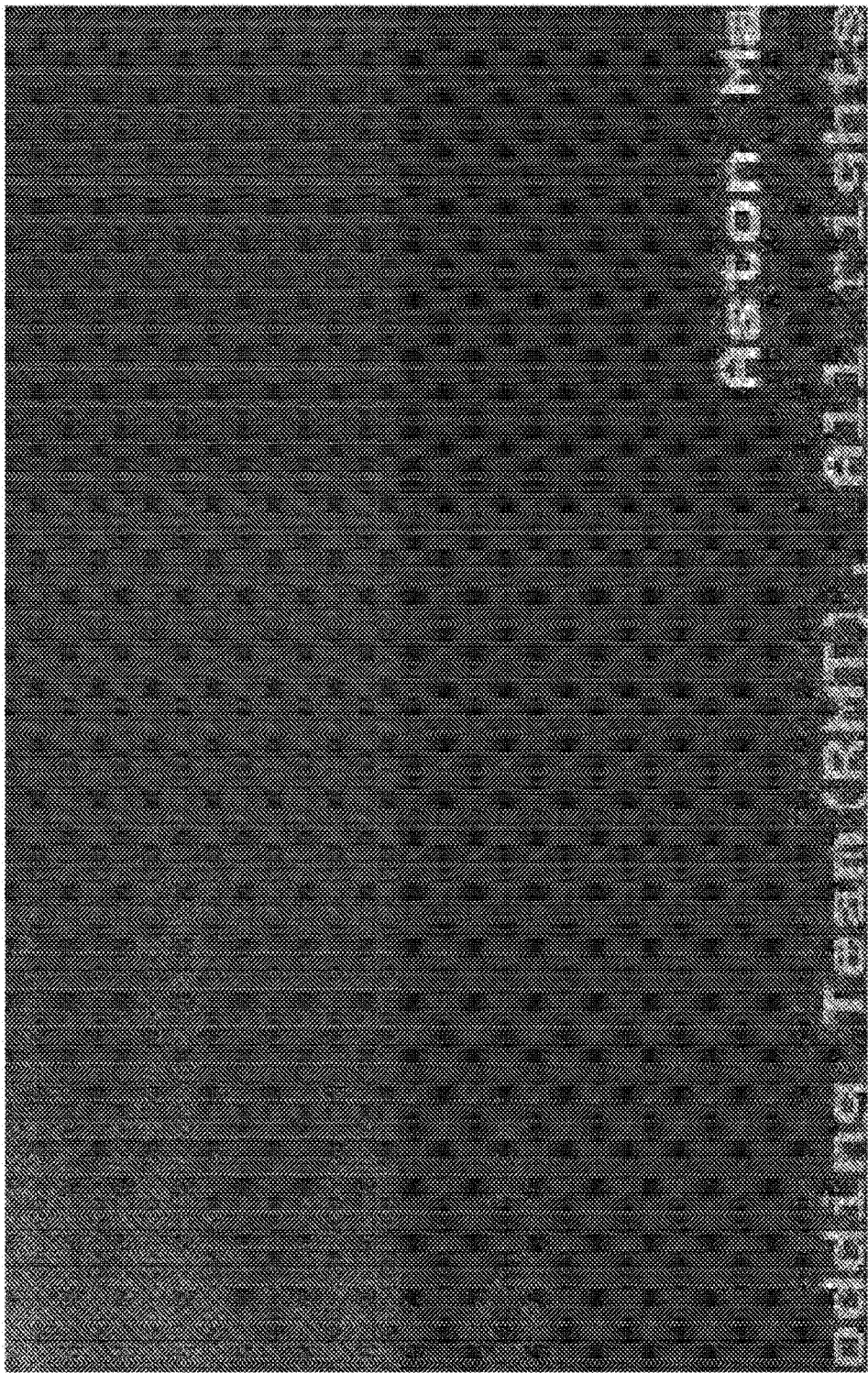
FIG. 1J shows the same area as FIG. 1b, but using such a preferred embodiment of the encoding methods of the present invention.
Figure 1K:
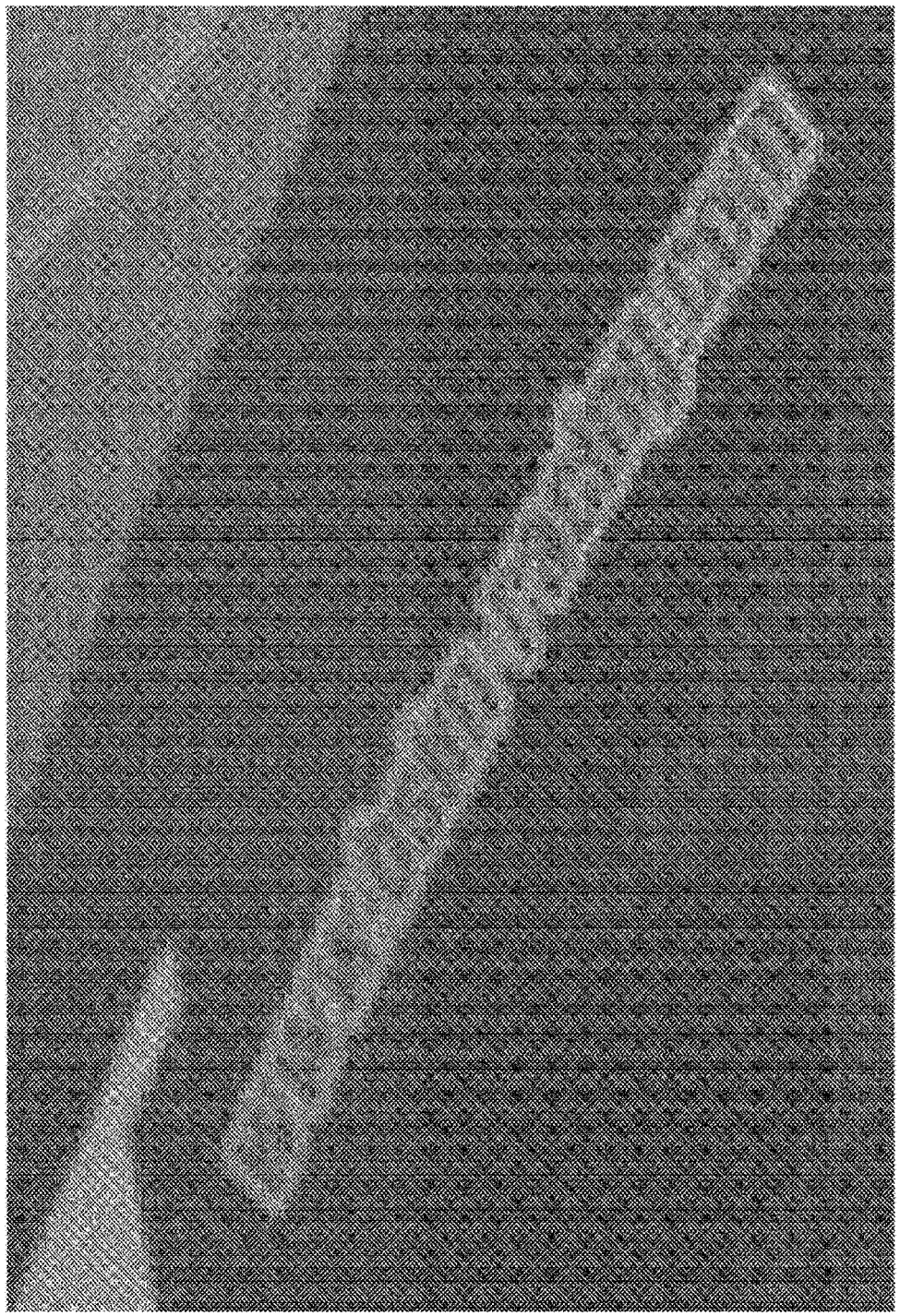
FIG. 1K shows the same area as FIG. 1c, but using such a preferred embodiment of the encoding methods of the present invention.
Figure 1L:
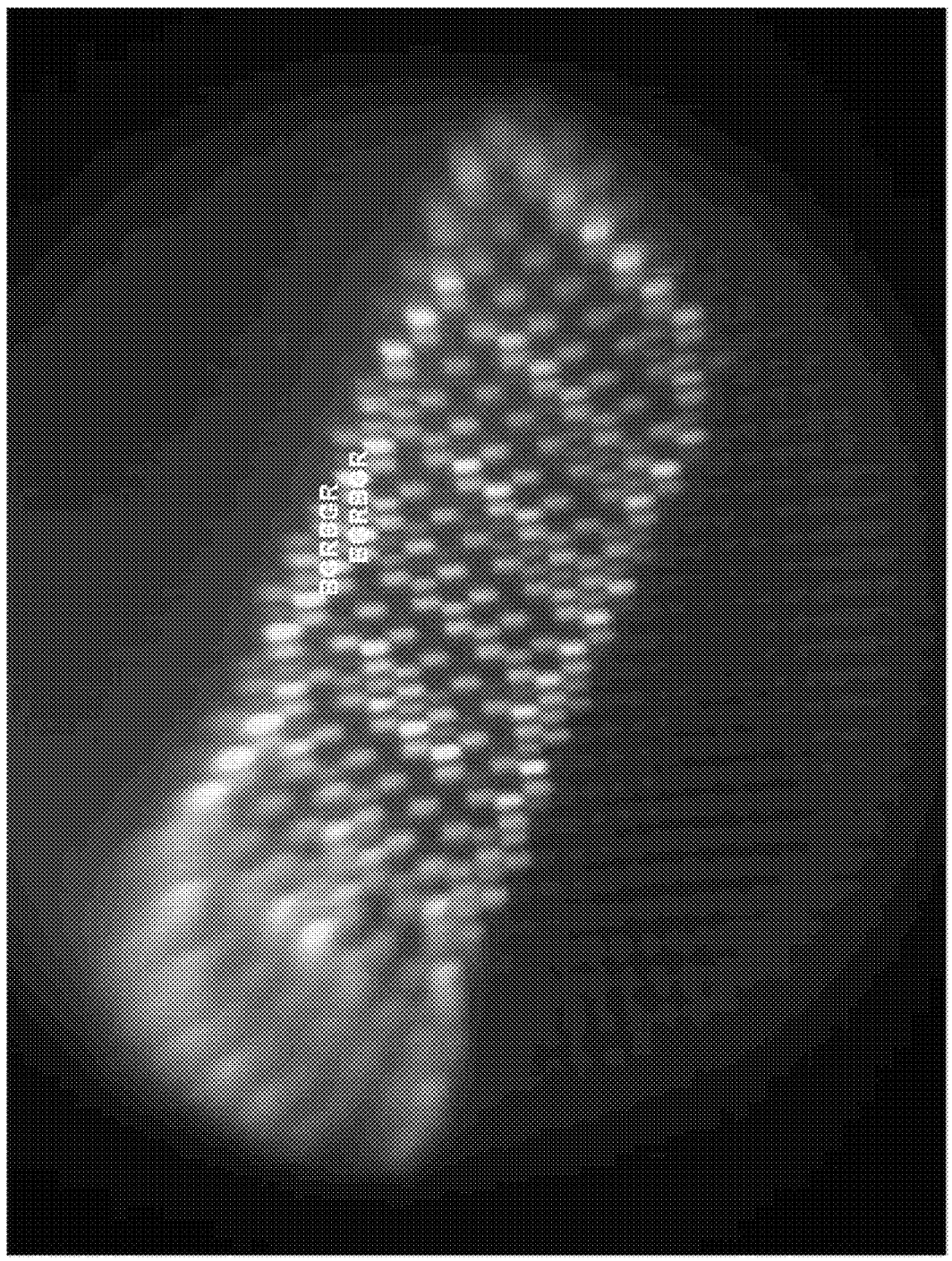
FIG. 1L shows an area of the email address on the windshield from FIG. 1k as seen through a magnifying lens, showing the actual pixel structure using the preferred embodiment of the encoding methods of the present invention.

The same illusion occurs everywhere in the image. This is demonstrated in FIGS. 1*i*, 1*j*, 1*k*, and 1*l*, which only contain information from one pixel part per pixel, showing the view that would be seen utilizing the preferred embodiment of the present invention (illustrated in FIG. 4) through one eye only. FIG. 1*i* shows the same picture as in 1*a*, but with each pixel either displaying only the G-Part or the RB-Part. The brightness of the pixels displaying information in FIG. 1*i* has been boosted somewhat (as can easily be done with a conventional television signal before and/or after transmission and on a conventional display) to compensate for the reduced brightness caused by half the sub-pixels being turned off for each eye. FIG. 1*i* appears essentially indistinguishable from FIG. 1*a* as to color and resolution. Notice also that, unlike FIG. 1*e* (the prior art, wherein every other line appears black to a given eye), FIGS. 1*a* and 1*i* present no jaggy artifacts at the bottom of the door, around the opening in the chassis where the headlights shine out from, on the protruding edge of the left bumper, the bottom of the chassis under the door, the seam where the hood meets the body, or on the large white letters on the windshield. FIG. 1*j* shows the same area as FIG. 1*b*, but also using the preferred embodiment of the present invention. Notice the small text (with features as small as one pixel in some places) is just as readable in both images, unlike in FIG. if (utilizing the prior art), which is very hard to read. FIG. 1*k* shows the same area as FIG. 1*c*, but also utilizing the preferred embodiment of the present invention. Notice that the diagonally oriented text in the email address on the windshield is equally readable in both images, unlike the same area shown in FIG. 1*g* of the prior art, which is practically unreadable. FIG. 1*l* shows an area from FIG. 1*k* of the email address on the windshield as seen through a magnifying lens, showing the actual pixel structure, also using the preferred embodiment of the present invention. Unlike the pixel structure of the original image, magnified and shown in FIG. 1*d*, wherein all pixels are utilized for the image, and unlike the pixel structure of the prior art, magnified and shown in FIG. 1*h*, wherein every other row of pixels is black, the pixel structure created using the preferred embodiment of the present invention uses only one pixel part per pixel to display the image, with no apparent loss of resolution or color. This can be more readily appreciated by noticing that in the white area of FIG. 1*d* all red, green, and blue sub-pixels (comprising both pixel parts) of each pixel are turned on (in that order), whereas in the white areas of FIG. 1*l* it can be seen that half of the pixels have only the red and blue sub-pixels (comprising one pixel part) turned on, while the pixels immediately surrounding each such red-and-blue-displaying pixel have only the green sub-pixel (comprising one pixel part) turned on. It is also apparent that surrounding every pixel in which only the green sub-pixel is turned on, are pixels in which only the red and blue sub-pixels are turned on. Notice that the apparent sub-pixel color order along a row using this preferred embodiment of the present invention, as seen from left to right, is red, blue, and green due to half of the sub-pixels not being used for a single eye's image, unlike in FIG. 1*d*, depicting prior-art display technology, (which is red, green, and blue). Thus only 50% of the display area is utilized to display an entire image for a given eye, while producing no observable loss in picture quality.

Since each pixel part is displaying a unique overall luminance value, twice as many luminance values can be displayed by a given number of pixels. When displaying a 2-D image, both eyes of viewers perceive twice as many pixels of information and, thus, twice the resolution of the display device itself.

Thirdly, in addition to the two ways (described above) in which the viewer is caused to see unique full-color pixels everywhere in the scene, it is important to realize that when the viewer looks at any given point in the scene with both eyes simultaneously, the viewer's eyes swivel horizontally so that the corresponding points in the left and right images (seen by the left and right eyes), fall on the same retinal areas in each eye, causing those two images of that point in the scene to overlap and merge in the brain. Thereby, when a viewer looks, for instance, at a scene point located at the plane of the display and is looking at the first pixel in the first row (for instance) with both eyes when utilizing the present invention, the green value of the first pixel in the first row of the left eye image is combined in the brain with the red and blue values of the first pixel of the first row of the right eye image, again producing the perception of a full-color pixel at that point in the scene. If the eyes are looking at two different screen pixels in order to converge on a single point in the scene not on the plane of the display, the same color mixing occurs for the same reason. As the eyes move around to look at other different points in the scene, the same full-color illusion is also generated everywhere in the same way. When the colors presented to the eyes switch (during the next image presentation period), the same full-color, full-resolution perception is still provided to the viewer (although with reversed pixel-part data being displayed to each eye for any given point in the scene).

Encoding and Transmission

Encoding of stereoscopic images into sampled pixel parts, as illustrated above, for transmission and display can be more clearly understood by referring to the various FIGS and further detailed explanation below.

Figure 5:
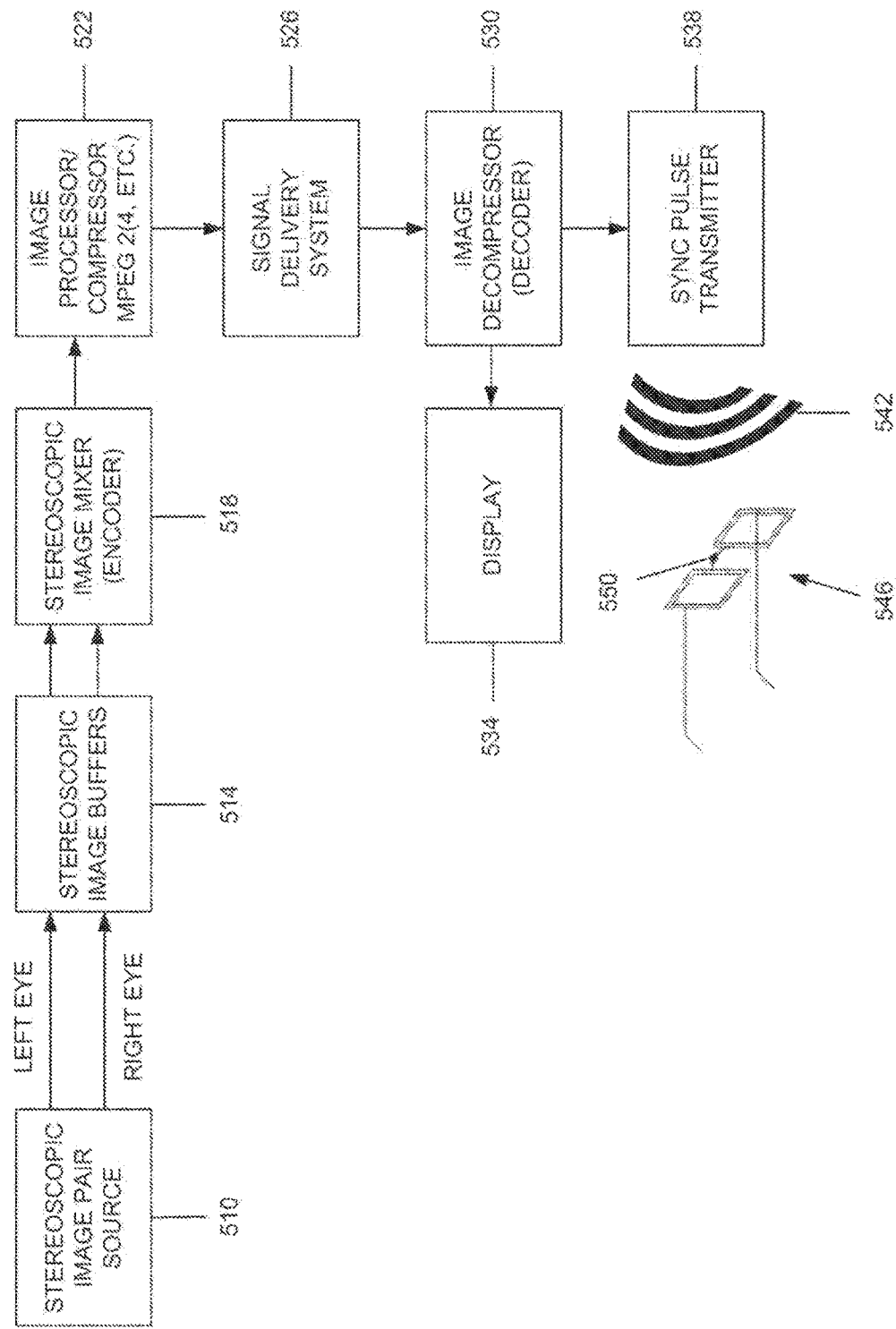
FIG. 5 is a block diagram showing the basic configuration of a digital television system incorporating the present invention.

The basic configuration of a digital television system incorporating the present invention is illustrated in block diagram form in FIG. 5. With the present invention, a source of stereoscopic image pairs 510, such as two cameras, a storage device such as a DVD, tape, or hard drive, a stereoscopic image generation software program, or a 2-D to 3-D converter, sends left eye and right eye images to left and right image buffers 514. These signals may be analog or digitized. A mixer/encoder 518, selects specific color sub-pixels from the left and right images of each stereo pair according to the chosen algorithm of the present invention, forming a new composite image in the mixer/encoder 518. If a double resolution 2-D image is used as the source information instead of stereoscopic image pairs, the mixer/encoder 518 selects specific color sub-pixels from consecutive adjacent pixels to form a new composite image. An image processor/compressor 522 digitizes the signal (if it's still analog), converts the color space of the composite image from RGB to a more easily compressible color space, such as YUV, and compresses the digital signal utilizing an acceptable codec such as MPEG-2 or MPEG-4. The signal is then delivered to the viewer through a signal delivery system 526, for instance by terrestrial transmission, satellite transmission, cable or fiber-optic transmission, or physically on a DVD, tape, or digital memory source, such as a hard drive. The image is decompressed in a decoder 530, where it is converted to the RGB color space and to the required interlaced or progressive format, and delivered as an analog or digital signal to a display 534. When using the active colored glasses of the present invention, synchronization information, transmitted during the vertical blanking period, goes to a sync-pulse transmitter 538 in the vicinity of the display 534 which sends a signal 542 that could be infrared, or, preferably, RF, to the receiver 550 of the active colored glasses 546 worn by viewers to synchronize the glasses with the color sub-pixel pattern displayed on the screen. When utilizing RF, a signal privacy system, such as Bluetooth technology, can be utilized to prevent crosstalk between units operating in the same vicinity. Alternately, when the micro-waveplate lens array filter disclosed herein is used on the display, viewers can view the 3-D imagery with passive polarized glasses and without the need for a sync-pulse transmitter 538, a sync signal 542, or a sync-pulse receiver 550.

Figure 6:
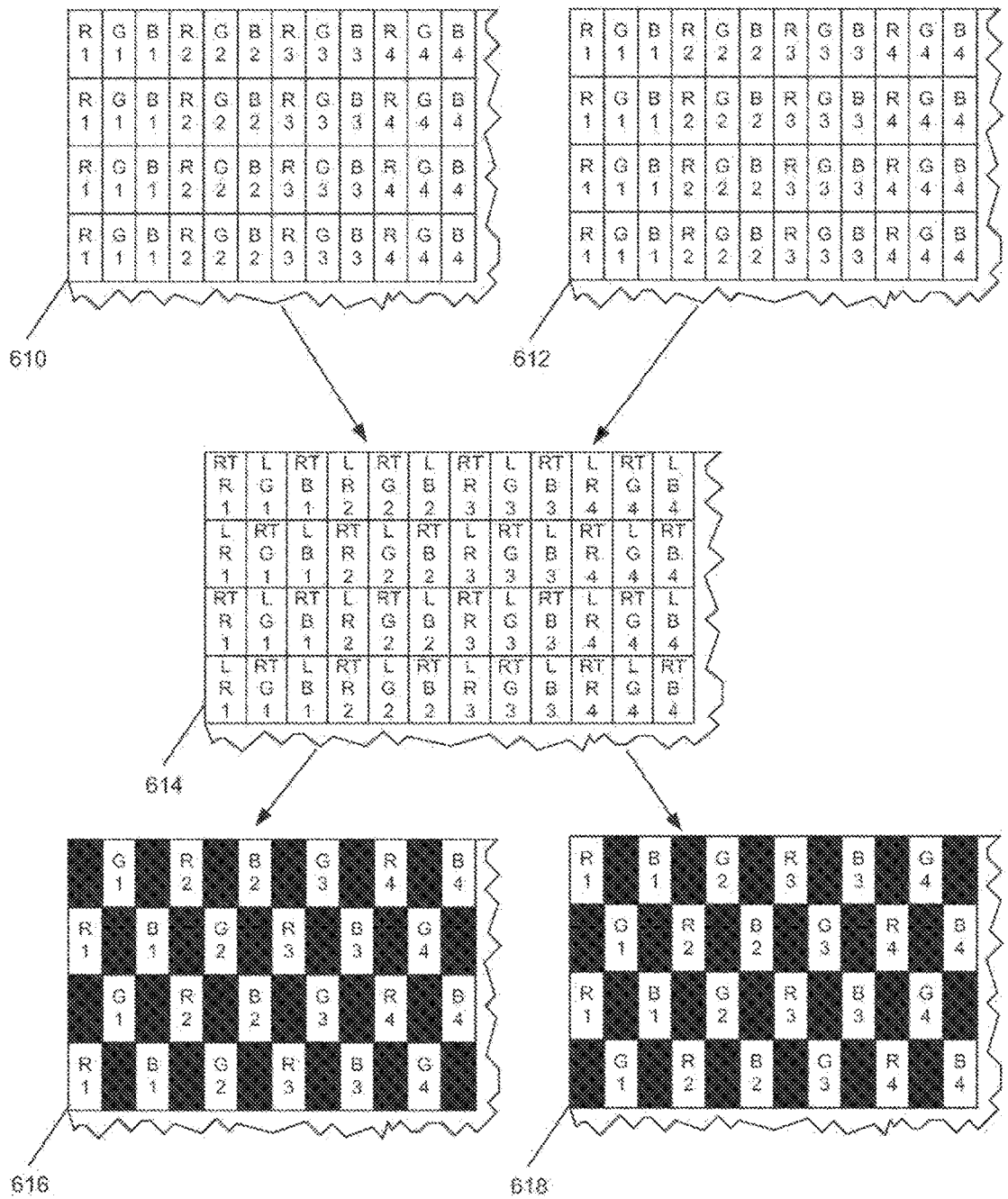
FIG. 6 shows the preferred processing sequence used by a mixer/encoder of the present invention when selecting data values from sub-pixels in right-eye and left-eye image buffers to form a composite image.

The following describes the preferred processing sequence used by the mixer/encoder 518 when selecting data values from the sub-pixels in the right and left buffers 514 to form the composite image of the preferred embodiment of the present invention which will be transmitted to the viewer. This can be better understood with reference to FIG. 6. Charts 610 and 612 respectively show the upper left portion of the left and right images of a stereo pair to be transmitted and displayed according to the preferred embodiment of the present invention. That is, chart 610 corresponds to the left image and chart 612 corresponds to the right image. Starting at the left of each scanning line in each image, the red, green, and blue sub-pixels of each first pixel are labeled R1, G1, and B1 in charts 610 and 612. The sub-pixels of each second pixel in each row of each image are labeled R2, G2, and B2, and so on, indicating the color of each sub-pixel and which number pixel it represents from each scanning line of each image of the stereo pair. This is repeated in each scanning line. Composite chart 614 depicts the upper left portion of the composite image, formed by the mixer during the first progressive display period (or after two interlaced display periods), which is to be transmitted and displayed on the viewer's TV. The first sub-pixel of each odd scanning line in the composite image is labeled "RT R 1", indicating that it came from the right image buffer and it has the value of the first red sub-pixel in that scanning line. The second sub-pixel of each odd scanning line in the composite image is labeled "L G 1", indicating that it came from the left image buffer and it has the value of the first green sub-pixel in that scanning line. In the same way, all the sub-pixels in the composite image depicted in chart 614 are labeled to show whether they came from the right or left image buffer, which pixel number, and which sub-pixel color provided the value for the sub-pixel in each scanning line of the composite image.

Data values from the sub-pixels of the first pixel, in the beginning of the first scanning line of both the right and left images (of frame number one), are taken from the right and left image buffers 514 by the mixer 518, and some are used to form the composite image, while some values are discarded. The same process is used to form each frame of the composite image. First the red sub-pixel value from the right image buffer, represented in chart 612 is sent to the mixer to become a part of the first pixel of the composite image represented in chart 614, while the green sub-pixel value from the right image buffer is discarded. Then the mixer discards the red sub-pixel value from the left image buffer and selects the green sub-pixel value from the left image buffer, represented by chart 610, and sends it to the mixer to become a part of the composite image, represented by chart 614, as well. Finally, after discarding the value of the blue sub-pixel from the left image buffer, represented by chart 610, the mixer selects the value of the blue sub-pixel from the right image buffer, represented by chart 612, and sends it to the mixer, represented by chart 614, completing the data set of the first pixel in the first odd scanning line of the composite image. The second pixel is constructed in the opposite order. First the red sub-pixel value from the left image buffer, represented in chart 612, is selected by the mixer, while the green sub-pixel value from the left image buffer is discarded. Then the mixer discards the red sub-pixel value from the right image buffer and selects the green sub-pixel value from the right image buffer, and sends it to the mixer to become a part of the composite image as well. Finally, after discarding the value of the blue sub-pixel from the right image buffer, the mixer selects the value of the blue sub-pixel from the left image buffer, and sends it to the mixer, completing the data set of the second pixel in the first scanning line of the composite image. All odd numbered pixels in the first odd scanning line are created by the mixer in the same fashion as the first pixel just described was created. All even numbered pixels in the first odd scanning line are created by the mixer in the same fashion as the second pixel just described was created.

The pixels in the rest of the odd scanning lines of the composite image are constructed in the same way from the sub-pixel data values of the pixels in the odd scanning lines of the left and right stereoscopic images to be transmitted and displayed. If the mixer is producing one field at a time, this would constitute the first field to be transmitted and displayed. If full frames are constructed progressively, each odd line would be followed by the construction of an even line.

The even scanning lines are sampled in the opposite sequence, generating the next field for interlaced scanning or the next line of a frame constructed progressively to be transmitted and displayed. First the red sub-pixel value from the left image buffer, represented in chart 612 is sent to the mixer to become a part of the first pixel of the composite image represented in chart 614, while the green sub-pixel value from the left image buffer is discarded. Then the mixer discards the red sub-pixel value from the right image buffer and selects the green sub-pixel value from the right image buffer, represented by chart 610, and sends it to the mixer to become a part of the composite image, represented by chart 614, as well. Finally, after discarding the value of the blue sub-pixel from the right image buffer, represented by chart 610, the mixer selects the value of the blue sub-pixel from the left image buffer, represented by chart 612, and sends it to the mixer, represented by chart 614, completing the data set of the first pixel in the first even scanning line of the composite image. The second pixel is constructed in the opposite order. First the red sub-pixel value from the right image buffer, represented in chart 612, is selected by the mixer, while the green sub-pixel value from the right image buffer is discarded. Then the mixer discards the red sub-pixel value from the left image buffer and selects the green sub-pixel value from the left image buffer, and sends it to the mixer to become a part of the composite image as well. Finally, after discarding the value of the blue sub-pixel from the left image buffer, the mixer selects the value of the blue sub-pixel from the right image buffer, and sends it to the mixer, completing the data set of the second pixel in the first even scanning line of the composite image. All odd numbered pixels in the first even scanning line are created by the mixer in the same fashion as the first pixel just described was created. All even numbered pixels in the first even scanning line are created by the mixer in the same fashion as the second pixel just described was created.

The pixels in the rest of the even scanning lines of the composite image are constructed in the same way from the sub-pixel data values of the pixels in the even scanning lines of the left and right stereoscopic images to be transmitted and displayed. If the mixer is producing one field at a time, this would constitute the second field to be transmitted and displayed. If full frames are constructed progressively, each even line would be followed by the construction of an odd line.

It is to be understood that, although the first pixel in each odd row is depicted as containing red and blue sub-pixel data values from the right image and the green sub-pixel data value from the left image, while the first pixel in each even row is depicted as containing the green sub-pixel data value from the right image and the red and blue sub-pixel data values from the left image, this choice is arbitrary and the reverse could be utilized (with all other pixels in each row following suit) without departing from the spirit of the invention. It is also to be understood that the mixer/encoder 518 could be configured to select pixel data values (from the left and right image buffers 514) one row at a time in consecutive order or from the odd rows first, followed by the even rows, to form a complete composite field or frame to be transmitted and displayed.

Other encoding algorithms can be used within the scope of the present invention as illustrated, for instance, in the section below entitled "Alternate Embodiments".

When a double resolution 2-D image is used with the present invention instead of a stereoscopic image pair, the odd numbered pixels (for instance) in the original double resolution 2-D image can be treated as if it was the left-eye image of a stereo pair while the even numbered pixels (for instance) in the original double resolution 2-D image can be treated as if it was the right-eye image of a stereo pair. With that substitution, processing can proceed as just described to produce a new composite image.

Decoding and Display

After the composite image 614 is compressed by image processor 522 and delivered to a viewer location by a signal delivery system 526, the composite image is decompressed by decoder 530 as either complete progressively scanned frames or interlaced fields in accordance with the type of display being used to view the 3-D imagery. The display could present 30 composite frames per second to the viewers or, alternately, it could present more frames per second to the viewers by flashing each frame more than once or by creating and displaying interpolated intermediate frames between the showing of any two transmitted composite frames as is known in the art. If the display resolution is different than the resolution of the image sent to the decoder 530, the decoder can alter the resolution of the image before sending it to the display (as is also known in the art). If the display resolution is higher, interpolation can be used (such as explained herein below) to create the extra pixels necessary while adhering to the algorithm of the present invention. If the display resolution is lower, the decoder can delete a sufficient number of evenly spaced pixel rows and columns before sending the image to the display. The user could input the display resolution being used to the decoder to allow images to be displayed properly on virtually any resolution display. Alternatively, the monitor could automatically change the incoming signal resolution to match the resolution of the monitor (as is known in the art).

Preferably, the display will present a continuing sequence of full frames (or partial frames, such as fields, adding up to full frames over a period of time) to viewers wherein each frame consists of a left-eye view 422 and a right-eye view 424, which are reproductions of the transmitted image sections 616 (left-eye image) and 618 (right-eye image) of composite image 614. If the display is progressively scanned, and passive polarized (with the micro-waveplate lens array screen on the display) or active colored glasses are being used to view the display, a full frame 414 (wherein some pixels are turned off) will be displayed during the first display period while the passive polarized or active colored glasses transmit only the portion of the image 410 made from green sub-pixels to the left eye and only the portion of the image 412 made from red and blue sub-pixels to the right eye. This is indicated by the colored glasses icon 428. During the next display period, another full frame 420 (wherein some other pixels are turned off) will be displayed while the passive polarized or active colored glasses transmit only the portion of the image 416 made from red and blue sub-pixels to the left eye and only the portion of the image 418 made from green sub-pixels to the right eye. This is indicated by the colored glasses icon 430. Over the course of two display periods (on a 60 Hz display), a full frame 426 (wherein all pixels are addressed) will have been displayed to the viewer, which reproduces the transmitted composite image 614, with a full-color, full-resolution image 422 (from the left image of the stereo pair) being transmitted to the left eye and a full-color full-resolution image 424 (from the right image of the stereo pair) being transmitted to the right eye.

As will be explained further hereinbelow, in addition to working properly with active colored glasses, this encoding scheme is compatible with a passive polarized viewing system. This works because whether a given pixel part on the display comes from the right-eye image or from the left-eye image never changes. Thus, with each pixel part polarized, either using properly configured prior art micro-polarizers or the micro-waveplate lens array screen filter of the present invention discussed herein, a viewer would be able to receive the right and left image data in the correct eyes using conventional passive polarized glasses. The micro-waveplate lens array screen polarizes the sub-pixels of the display so that the proper image information is sent to the proper eyes of any viewer who is wearing passive polarized glasses.

The filters of the active colored glasses, on the other hand, switch their color every $\frac{1}{60}^{th}$ of a second (for a 60 Hz display), allowing each eye to see 30 green images and 30 magenta (red and blue) images each second in alternating fashion. Thus, during $\frac{1}{30}^{th}$ of a second (for a display showing 30 frames per second), each eye of the viewer sees a full-color, full-resolution image frame from a transmitted and displayed stereo pair when wearing the active colored glasses of the present invention, providing the viewer with a full-color stereoscopic view of a 3-D frame. This process is repeated for each frame of each stereo pair transmitted and displayed by the present invention.

Various methods of interpolation (discussed below) can be used to create more data on the display end than is being transmitted to show more full frames per second, increasing apparent image quality and reducing any possibility of perceived flicker. In addition, such interpolation techniques can also be used to create more pixels to form higher resolution images that can be shown on displays with higher resolutions such as 2K, 4K, or 8K displays, while still adhering to the pixel part sharing system of the present invention.

Figure 1M:
FIG. 1M shows the image of FIG. 1a utilizing the preferred embodiment of the encoding methods of the present invention on an interlaced display.
Figure 1N:
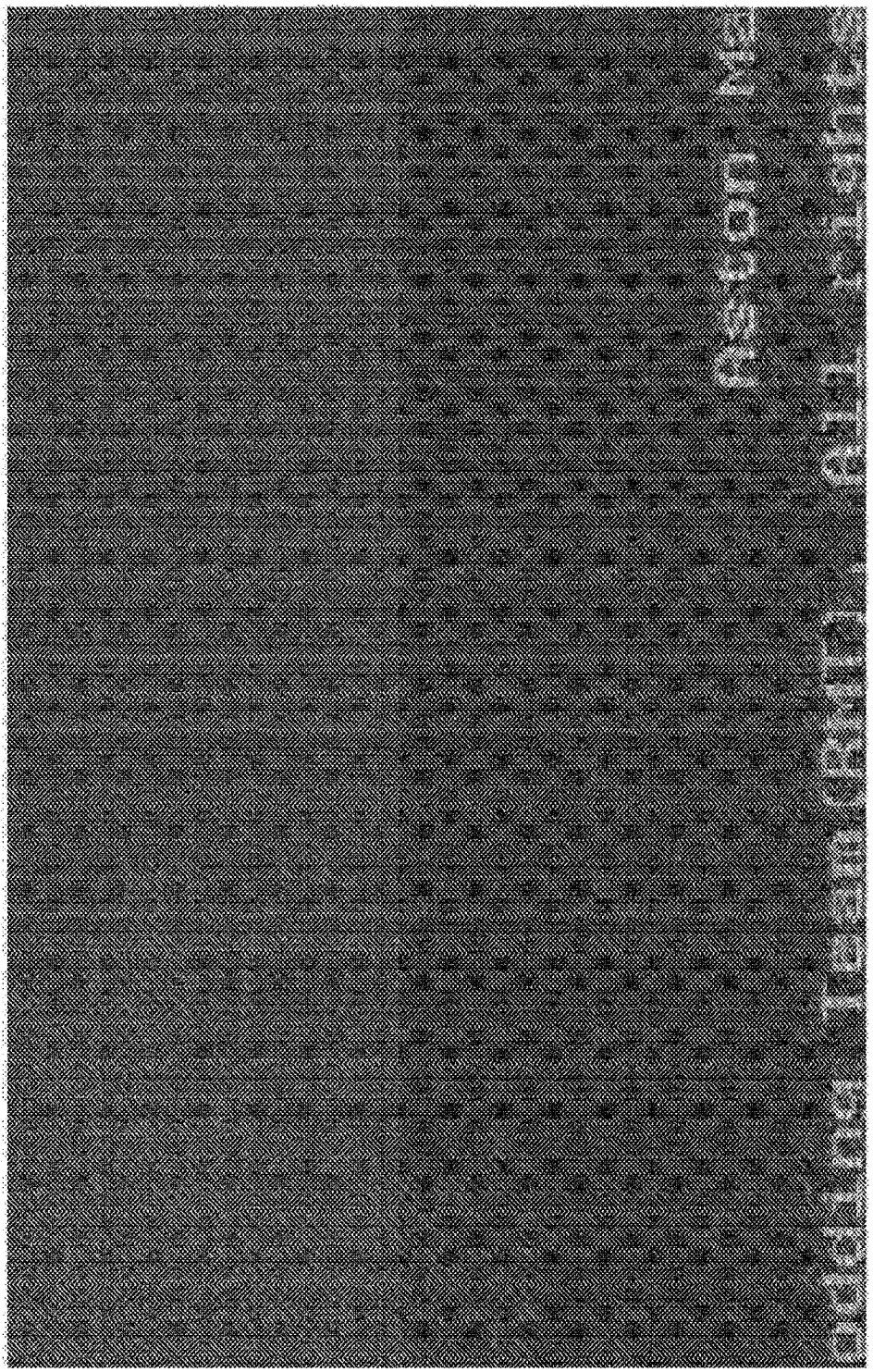
FIG. 1N shows the same area as FIG. 1b, but using the preferred embodiment of the encoding methods of the present invention on an interlaced display.
Figure 1P:
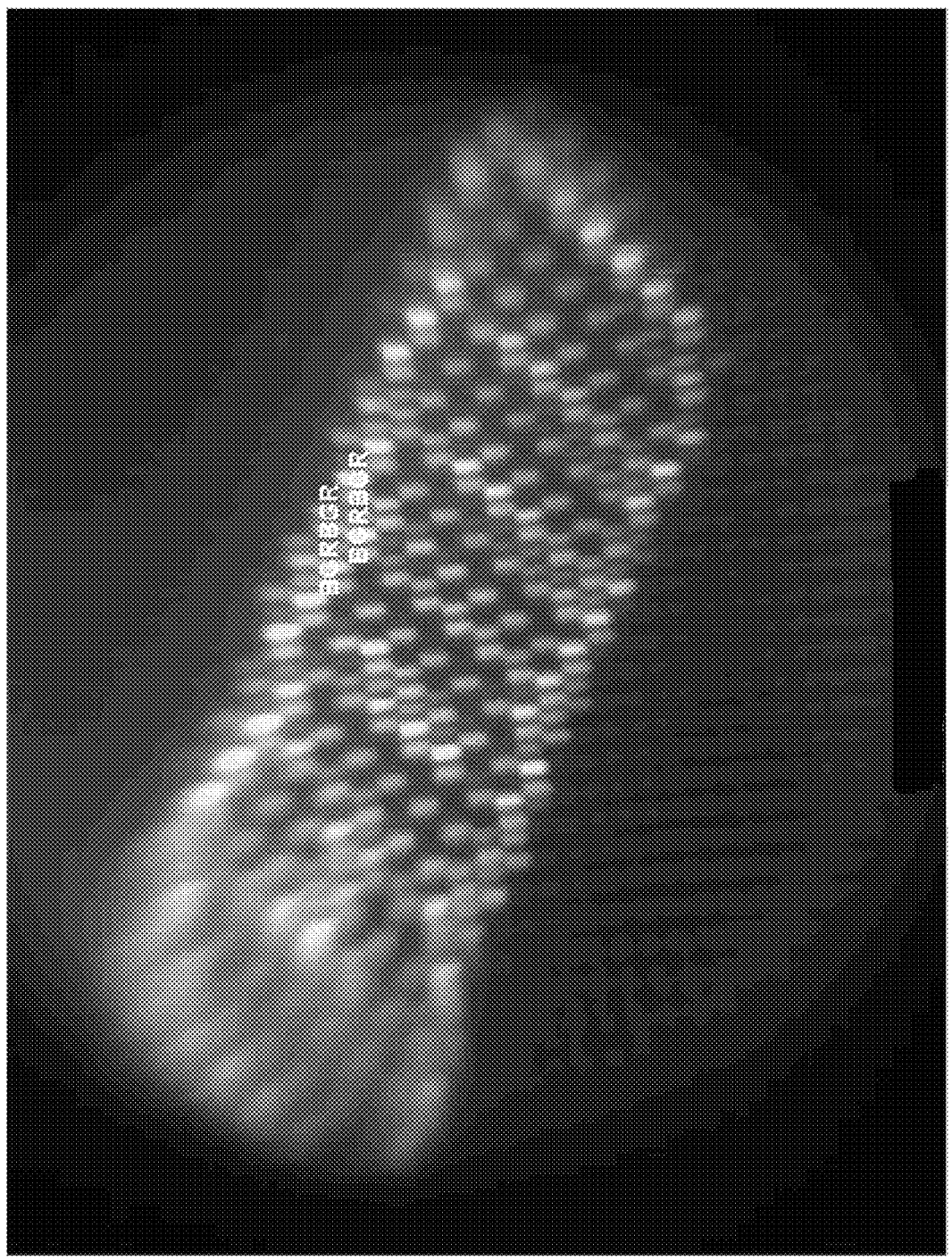
FIG. 1P shows an area of the email address on the windshield from FIG. 1o as seen through a magnifying lens, showing the actual pixel structure using the preferred embodiment of the encoding methods of the present invention on an interlaced display.
Figure 2:
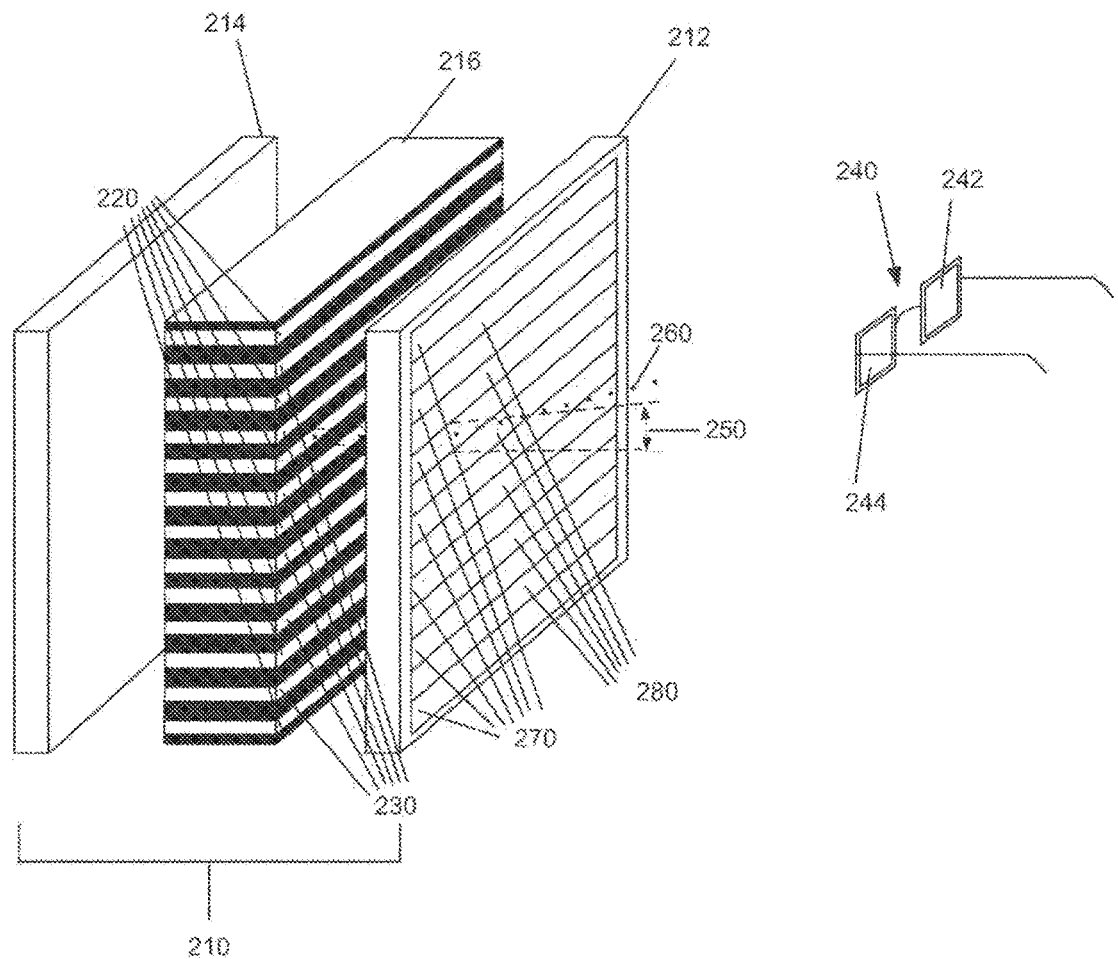
FIG. 2 depicts an LCD monitor of the prior art with micro-polarizers mounted on the outside of the glass surface of the monitor.
Figure 3:
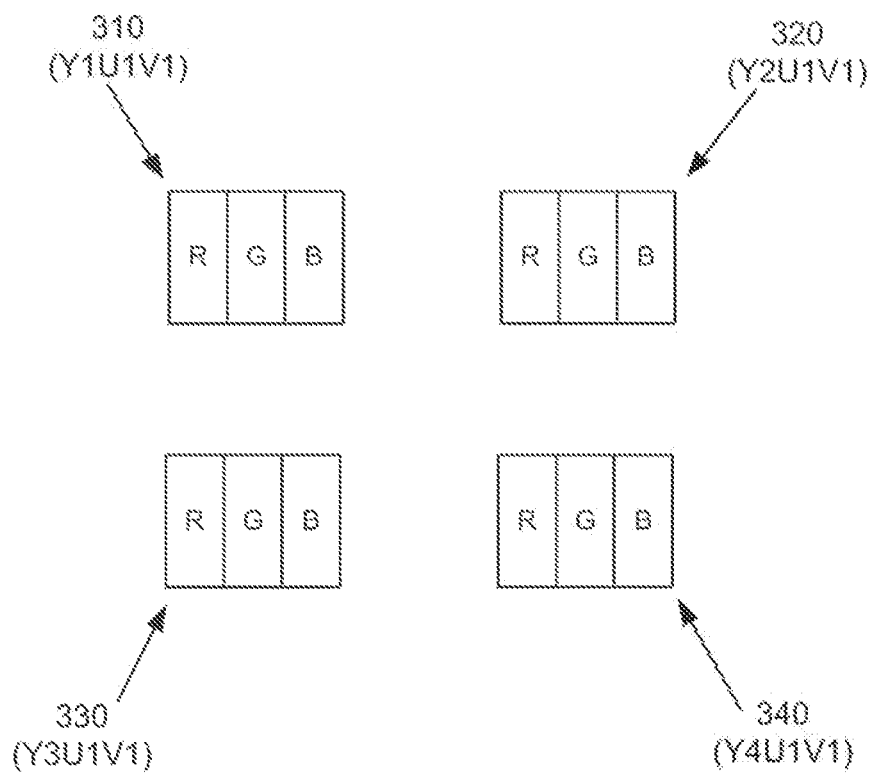
FIG. 3 shows a pixel arrangement, including labeling of the signal information content of the pixels, produced as a result of digital video compression.

If the display is interlaced, and passive polarized or active colored glasses are being used to view the display, the odd rows will be displayed during a first display period (providing one field) while the even rows are not being addressed, and the passive polarized or active colored glasses will transmit only green information to the left eye and only red and blue information to the right eye. During the next display period (the next field), only the even rows will be addressed and the passive polarized or active colored glasses will transmit only red and blue information to the left eye and only green information to the right eye. Thus, during each $\frac{1}{30}^{th}$ of a second, a full-resolution stereoscopic image pair is displayed to the viewers' two eyes, providing 30 full stereoscopic frames per second to each eye. The use of an interlaced display will provide a somewhat lower quality image than the use of a progressively scanned display because the left eye will always see only green sub-pixel data on the odd lines of the display and only red and blue sub-pixel data on the even lines of the display while the right eye will always see only red and blue sub-pixel data on the odd lines of the display and only green sub-pixel data on the even lines of the display. However, the perception of quality will still be noticeably better than that seen, even on a progressively scanned display, using the prior art. This can be readily seen by referring to FIGS. 1m-1p which show only one eye's view of the image displayed on an interlaced screen (the perceived effect of seeing the interlaced display when viewing it with both eyes is even better than what is shown here). FIG. 1m shows the image of FIG. 1a utilizing the preferred embodiment of the present invention as shown on an interlaced display. Although some small color artifacts can be seen in a few spots where there are features or data that are only one or two pixels in size, the picture is generally good in quality (even through one eye) and noticeably better than FIG. 1e, which utilizes the prior art, wherein every other line is black for each eye. Notice that the tiny text in FIG. 1n (originally shown in FIG. 1b) is much more readable than in FIG. 1f, which shows the same text utilizing the prior art. The text in FIG. 1o (originally shown in FIG. 1c) demonstrates that the small e-mail address situated at 45° is perfectly readable, whereas the same view, shown in FIG. 1g utilizing the prior art, is extremely difficult to read. FIG. 1p shows a close-up view of some of the actual pixels of FIG. 1o as seen through a magnifying lens. This FIG. clearly shows that, for one eye's view, the odd lines show only green sub-pixels while the even lines show only red and blue sub-pixels. It is important to note that, although color information is clearly missing from each line of the interlaced display for a given eye, all luminance differences are still preserved, keeping even the smallest text readable.

Figure 7:
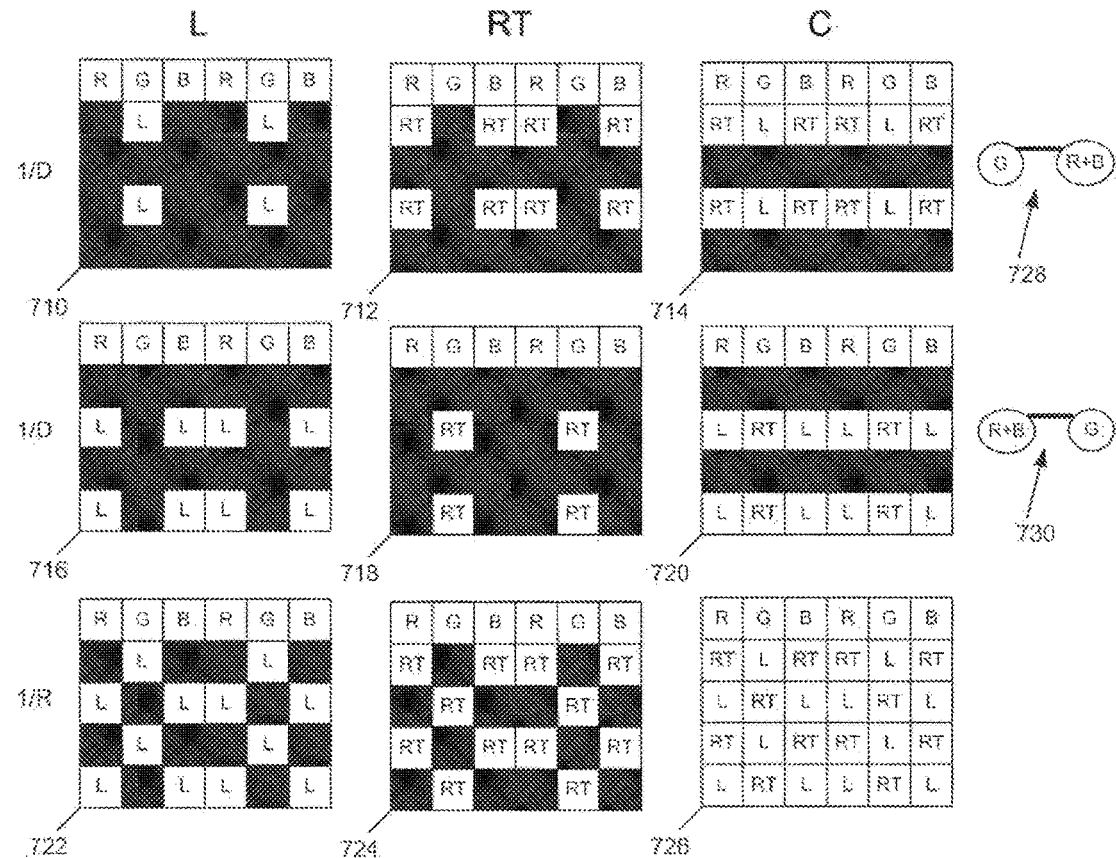
FIG. 7 shows a preferred pixel display sequence of the present invention displayed over time on an interlaced display.

The pixel display sequence displayed over time on an interlaced display is further broken down in FIG. 7. Chart 710 represents the arrangement of image information that is displayed in the upper left corner of the display for the left eye of a viewer during the first field of a frame. The letters above each column indicate the color of the sub-pixels in that column. As can be seen, the data for the G-part of each pixel in every other row (for instance, every odd row) of the left-eye image is displayed. Chart 712 represents the information displayed for the right eye of a viewer during the same field. As chart 712 shows, the RB-part of each pixel in every other (odd, for instance) row of the right-eye image is also displayed. The combined image displayed to both eyes during this field is shown in chart 714. Colored glasses icon 728 illustrates that the G-parts of the pixels for the left-eye image are transmitted through the colored glasses to the viewer's left eye and the RB-parts of the corresponding right-eye image pixels are transmitted through the colored glasses to the viewer's right eye during that time period. Charts 710, 712, and 714 represent a field that is to be displayed for the time period of 1/D, wherein D represents the number of fields that are displayed in one second for a particular display. As discussed previously, some displays operate at 60 Hz, whereas others operate at 120 Hz, or at other frequencies. This means that D will vary depending on the frequency of the particular display. Moving to the subsequent field, which is to be presented in the next 1/D time period, charts 716, 718, and 720 show that the rows (the even rows, for instance) that were not addressed in the previous field (charts 710, 712, and 714) are addressed in this field. As chart 716 illustrates, the RB-parts of the pixels for the left-eye image are displayed during this field. Chart 718 shows that the G-parts of the corresponding pixels of the right-eye image are also displayed during this field. Chart 720 shows which sub-pixels would be directed to which eye in this field. Colored glasses icon 730 shows that the RB-parts of the left-eye image and the G-parts of the right-eye image are transmitted through the colored glasses to the viewer's eyes during display of this field. Charts 722, 724, and 726 show what the frame (corresponding to the two fields) displays to the left eye, the right eye, and both eyes together. The frame is to be displayed for the time period 1/R, where R represents the number of frames that the particular display is capable of showing per second. Chart 722 represents the left-eye image data and chart 724 represents the right-eye image data. Chart 726 shows a composite of the information represented in charts 722 and 724. As can be seen, the left-eye does not receive just G-parts or just RB-parts of the original left-eye image. Instead, it gets a mixture, receiving either G-parts or RB-parts depending on the row of the display. The same is true for the right-eye image.

Chart 726, which illustrates the sub-pixel layout of a full frame displayed on an interlaced screen, however, does not exactly match the sub-pixel layout in 614, which is the preferred sub-pixel layout formed in the mixer/encoder 518, transmitted to viewers, and provided to viewers on progressively scanned displays, as shown in chart 426. The preferred method of providing the sub-pixel layout of chart 726, required for display on an interlaced monitor (or any other desired sub-pixel layout), from the transmitted sub-pixel layout 614 is to use interpolation. Comparing charts 726 and 426 it can be seen that all odd numbered pixels (pixels in odd numbered columns) from both charts have the same sub-pixel layout, whereas all even numbered pixels (pixels in even numbered columns) have the opposite sub-pixel layout to each other (in chart 726 as compared with chart 426). Consequently, the even numbered pixels have to be interpolated from the transmitted image 614 when forming the image for display on an interlaced monitor (as shown in chart 726). Interpolation can be accomplished by using any of a number of selected algorithms to determine the required color-sub-pixel values of any unknown pixel (the even numbered pixels in this case) by utilizing the color sub-pixel values of known surrounding pixels and from the transmitted sub-pixel values (in the even columns) that have to be altered. Interpolation is made easier and more accurate in this case because one or two of the actual sub-pixel values are transmitted in the even columns for each "unknown pixel". Many methods of pixel interpolation are well known in the art.

The simplest interpolation method, called "Nearest Neighbor", locates the nearest pixel data value, and assigns the same value to the newly created pixel. This method is very often inaccurate. Another of the simplest forms of interpolation takes the arithmetic average of the values of two adjacent pixels to create the value of the pixel being created between them. This will give the same result as a linear function evaluated at the midpoint, thereby being referred to as Linear interpolation. If one pixel's luminance value is 2, for instance, and the next pixel's value is 3, it is simple to calculate 2.5 as the value of a pixel created between them by adding the values together and dividing by 2. Linear interpolation is quick and easy, but it is not very precise.

Polynomial interpolation is a generalization of linear interpolation. Generally, if we have n data points, there is exactly one polynomial of degree at most n−1 going through all the data points. The interpolation error is proportional to the distance between the data points to the power n. Furthermore, the interpolant is a polynomial and thus infinitely differentiable. The polynomial interpolation solves the problems of linear interpolation. However, polynomial interpolation is computationally "expensive" as compared with Linear interpolation and it still may not always be accurate, especially at endpoints. These problems are alleviated with Spline interpolation.

Spline interpolation uses low-degree polynomials in each of the intervals, and chooses the polynomial pieces such that they fit smoothly together. Like Polynomial interpolation, Spline interpolation incurs a smaller error than Linear interpolation and the interpolant is smoother. In addition, the interpolant is easier to evaluate than the high-degree polynomials used in Polynomial interpolation.

Another method, called Bilinear interpolation, uses the 4 nearest pixel values which are located in a diagonal direction from the pixel being created in order to find the appropriate value of the pixel. The key idea is to perform Linear interpolation first in one diagonal direction, and then again in the other diagonal direction, finally averaging the two results.

A better method, referred to as Bicubic interpolation is an extension of cubic interpolation for interpolating data points on a 2-dimensional regular grid. It uses the information from sixteen of the surrounding pixels to determine the value of the new pixel that is being created. Since these surrounding pixels are at various distances from the unknown pixel, closer pixels are given a higher weighting in the calculation. The interpolated values obtained by Bilinear interpolation or Nearest-Neighbor interpolation provide smoother transitions and fewer interpolation artifacts. Bicubic interpolation can be accomplished using either Lagrange polynomials, cubic splines, or cubic convolution algorithms.

The most accurate, but most computationally complex method of interpolation for imagery is "Fractal interpolation". In Fractal interpolation, an image is encoded into fractal codes via fractal compression, and subsequently decompressed at a higher resolution. The result is an up-sampled image in which iterated function systems have been used as the interpolant. Because Fractal interpolation operates on geometric information in the image, rather than pixel information, it maintains geometric detail very well as compared to other interpolation methods. Fractal compression relies on the fact that in certain images, parts of the image resemble other parts of the image. Fractal algorithms convert these parts (as selected geometric shapes) into mathematical data called "fractal codes" which are used to recreate the encoded image. Fractal compression differs from pixel-based compression schemes such as JPEG, GIF, and MPEG since no pixels are saved. Once an image has been converted into fractal code, its relationship to a specific resolution has been lost, making it resolution independent. The image can be recreated to fill any screen size without the introduction of image artifacts or loss of sharpness that occurs in pixel-based compression schemes. The resolution independence of a fractal-encoded image can thus be used to increase the display resolution of an image to produce the most pleasing result.

Interpolation algorithms can be further improved to maximize detail while minimizing interpolation artifacts by making them adaptive. This is done by modifying the algorithm to locate the presence of edges in the image (on a pixel by pixel basis) and treating the creation of "edge pixels" differently to make possible errors less noticeable.

In the present invention, although any interpolation method can be used, with Spline, Bilinear, or Bicubic interpolation (or a combination or variant) providing the best quality versus complexity ratio, Bicubic interpolation is preferred to the other methods to provide an optimized balance of quality and a minimum of computational complexity (which affects speed and cost).

As an illustration, when creating a pixel for an interlaced display (with the preferred pixel layout as shown in Chart 726) in an even-numbered column (EC4 in FIG. 8) and an even-numbered row (ER4 in FIG. 8), one pixel part (the G-Part) should originate from the right-eye image while the other pixel part (the RB-Part) should originate from the left-eye image. However, as can be seen in 614, the corresponding pixel from the composite image (in the fourth column and the fourth row) that is transmitted to the viewer only contains the RB-Part from the right-eye image and the G-Part from the left-eye image. To calculate the proper pixel part values to display in this pixel of the viewer's monitor, the preferred method is to perform the interpolation in the image decoder 530. An image buffer within the decoder 530, addressed from the top row down, would store at least three rows, and preferably seven rows of the decoded image at any one time (although any number of rows or an entire frame could be stored at one time in such a buffer), initially utilizing a FIFO (first-in-first-out) system and then a FILO (first-in-last-out) system after the buffer is filled, for the rows. This way, there would always be seven rows in the buffer, with the top row always being deleted as each row's data is moved up a row and an eighth row of data is scanned in as a new bottom row using the preferred embodiment.

Figure 8:
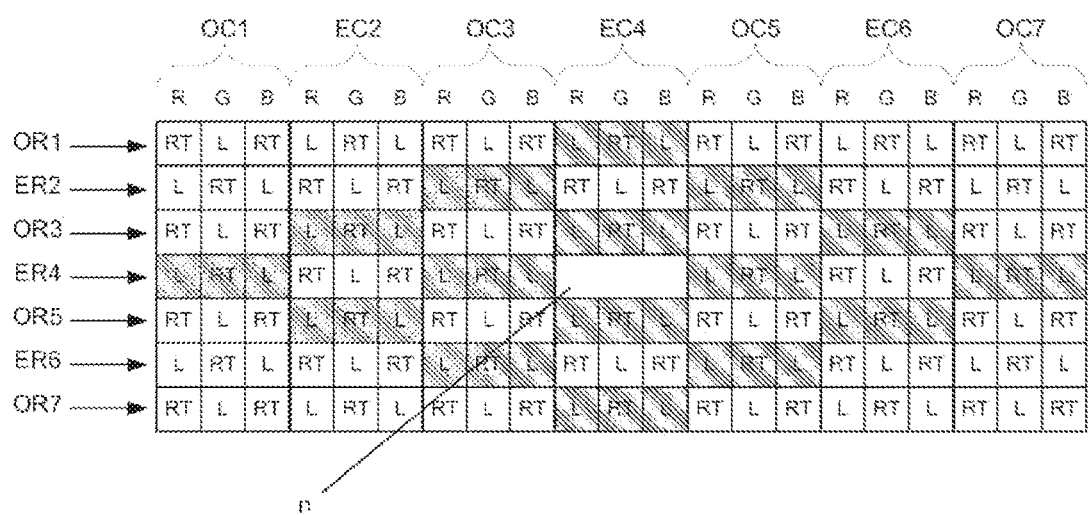
FIG. 8 shows a diagram of how missing pixel data for an interlaced display is determined using interpolation according to the present invention.

FIG. 8 illustrates two methods (with the second method being preferred) of interpolating the values of the sub-pixels which make up the pixel parts of a pixel "n", located (in this example) in the fourth column (EC4) and the fourth row (ER4). First the sub-pixel values from the pixel in the fourth column (EC4), third row (OR3) are averaged with the sub-pixel values from the pixel in the fourth column (EC4), fifth row (OR5), (red averaged with red, green averaged with green, and blue averaged with blue) forming a first set of intermediate sub-pixel values. Then the sub-pixel values from the pixel in the third column (OC3), fourth row (OR4) are averaged with the sub-pixel values from the pixel in the fifth column (OC5), fourth row (OR4), (in the same way) forming a second set of intermediate sub-pixel values. Then the first set of intermediate sub-pixel values are averaged with the second set of intermediate sub-pixel values (in the same way) to form the final sub-pixel values of the pixel "n". This is a form of Bilinear interpolation.

The preferred method of determining the sub-pixel values of pixel "n", however only starts with the Bilinear interpolation just described. Next, the same type of sub-pixel value averaging is carried out with the sub-pixel values of the pixel in the third column (OC3), second row (ER2) and the sub-pixel values of the pixel in the fifth column (OC5), sixth row (ER6), forming a third set of intermediate sub-pixel values. Then a fourth set of intermediate sub-pixel values is determined from the sub-pixel values of the pixel in the third column (OC3), sixth row (ER6) and the sub-pixel values of the pixel in the fifth column (OC5), second row (ER2). Next, the same type of sub-pixel value averaging is carried out with the sub-pixel values of the pixel in the second column (EC2), third row (OR3) and the sub-pixel values of the pixel in the sixth column (EC6), fifth row (OR5), forming a fifth set of intermediate sub-pixel values. Then a sixth set of intermediate sub-pixel values is determined from the sub-pixel values of the pixel in the second column (EC2), fifth row (OR5) and the sub-pixel values of the pixel in the sixth column (EC6), third row (OR3). Next, the same type of sub-pixel value averaging is carried out with the sub-pixel values of the pixel in the first column (OC1), fourth row (ER4) and the sub-pixel values of the pixel in the seventh column (OC7), fourth row (ER4), forming a seventh set of intermediate sub-pixel values. Lastly, an eighth set of intermediate sub-pixel values is determined from the sub-pixel values of the pixel in the fourth column (EC4), first row (OR1) and the sub-pixel values of the pixel in the fourth column (EC4), seventh row (OR7). The third through the eighth set of intermediate sub-pixel values are also averaged together in pairs, as both the first and second intermediate sub-pixel values were. However, the seven resulting sub-pixel value averages are only averaged with the sub-pixel values of pixel "n" (which was earlier determined by the Bilinear interpolation described above) in a "distance-weighted" manner, wherein the further the pixels involved in the averaging process forming the intermediate sub-pixel values are from the pixel "n", the less they influence the values of the sub-pixels in pixel "n". The pixels "involved" in the averaging process are the pixels nearest to the "target" pixel (pixel "n" in this example) which contain accurate information about the "needed" pixel parts (in this case, RB-Parts from the left eye image and G-Parts from the right eye image). This weighted average technique of interpolation utilizing sixteen pixels, wherein the influence on the "target" pixel is based on the distance from the "target" pixel, is a form of Bicubic interpolation, and is usually very accurate. For pixels that don't have three rows of pixel data above them, below them, to the left, and to the right of them (which only occurs with pixels located in the periphery of the display within the first and last three columns and rows), such Bicubic interpolation can still be carried out utilizing the nearest available sixteen pixels containing the "needed" pixel part data or, alternatively, with less than sixteen pixels being used for interpolation in those six columns and rows.

The values of the sub-pixels within all the pixels in the even columns are interpolated from the incoming signal in the same way for display on an interlaced screen. To further improve the accuracy of the interpolated pixels, if the sub-pixel values of a pixel involved in the interpolation are very different (differing by more than a selected threshold amount) from the sub-pixel values of the other pixels involved in the interpolation, those very different sub-pixel values can be ignored and not used in the interpolation, since sub-pixel values exhibiting such large differences indicate the presence of a border. Utilizing such border detection makes the interpolation "adaptive" which, as mentioned above, further reduces artifacts and errors, improving detail.

Additionally, image information can be sent to any display (using an alternate embodiment, as described hereinbelow) and can be viewed in 3-D and full color using the static passive colored glasses described below.

Directing the Stereoscopic Images to the Correct Eyes of Viewers

As disclosed in detail above, the present invention transmits and displays pixel data originating in left-eye and right-eye images from stereoscopic pairs of images on specifically selected "pixel parts". In the preferred embodiment, certain "pixel parts" always display only right-eye information while other "pixel parts" always display only left-eye information. Consequently, in the preferred embodiment of the present invention, light from the "pixel parts" that display left-eye data should only be sent to viewers' left eyes, while light from the "pixel parts" that display right-eye data should only be sent to viewers' right eyes.

For example, Chart 426 of FIG. 4 depicts which pixel parts display right-eye information and which pixel parts display left-eye information on a progressively scanned display using the preferred embodiment of the present invention. The depicted left-eye information should only be seen by the left eyes of viewers while the depicted right-eye information should only be seen by the right eyes of viewers.

The preferred method for accomplishing this when using polarized displays (i.e. LCD-based displays, direct-view or projection) is to cause left-eye-data-displaying "pixel parts" and right-eye-data-displaying "pixel parts" to be polarized perpendicularly to each other (for linear polarizations) or opposite-handed to each other (for circular polarizations). Then viewers can wear passive polarized glasses whose axes are the same as the two polarization orientations being displayed, allowing only the proper information to be viewed by the respective eyes of the viewers. Although the present invention will work with linearly polarized light and linearly polarized glasses, circularly polarized light and glasses are preferred for viewing since they allow the viewers' heads to be rotated in either direction with respect to the display without causing "bleeding" of light of the wrong polarization to either eye of the viewers (which would cause ghosting). Consequently, the pixel parts on the display (either on the LCD itself or on the display screen where the pixels are focused) are preferred to be made circularly polarized with the proper orientations so that they can be seen by the proper eyes of the viewers wearing circularly polarized glasses.

The light emanating from an LCD is conventionally linearly polarized. Other types of displays that don't produce polarized light, such as plasma and DLP displays, can be made to produce linearly polarized light as well by adding a linear polarizer to their display screens, although this cuts down display brightness. However, either way, with a display that produces light that is linearly polarized, all pixels and sub-pixels have the same polarization. To match traditional linearly polarized glasses, this polarization axis should be oriented at 45° to the vertical and horizontal axes of the display. When the display polarization axis is oriented other than at that angle, a half wave plate can be used to rotate it as needed (as is known in the art). To provide 3-D viewing with linearly polarized light with the present invention, the pixel parts corresponding to the right-eye image have to be polarized perpendicularly to the pixel parts corresponding to the left-eye image, and, when using circularly polarized light, one eye's image has to be right-circularly polarized while the other eye's image has to be left-circularly polarized. Different pixel parts can be made to have perpendicular linear polarizations by using micro-polarizers, whose methods of manufacture are known in the prior art (for instance, as described in U.S. Pat. No. 5,327, 285). However, the preferred embodiment of the present invention utilizes micro-waveplate filters made in a new way that are placed over the appropriate pixel parts to provide the proper circular polarization for each of the images of the stereo pair.

Figure 9:
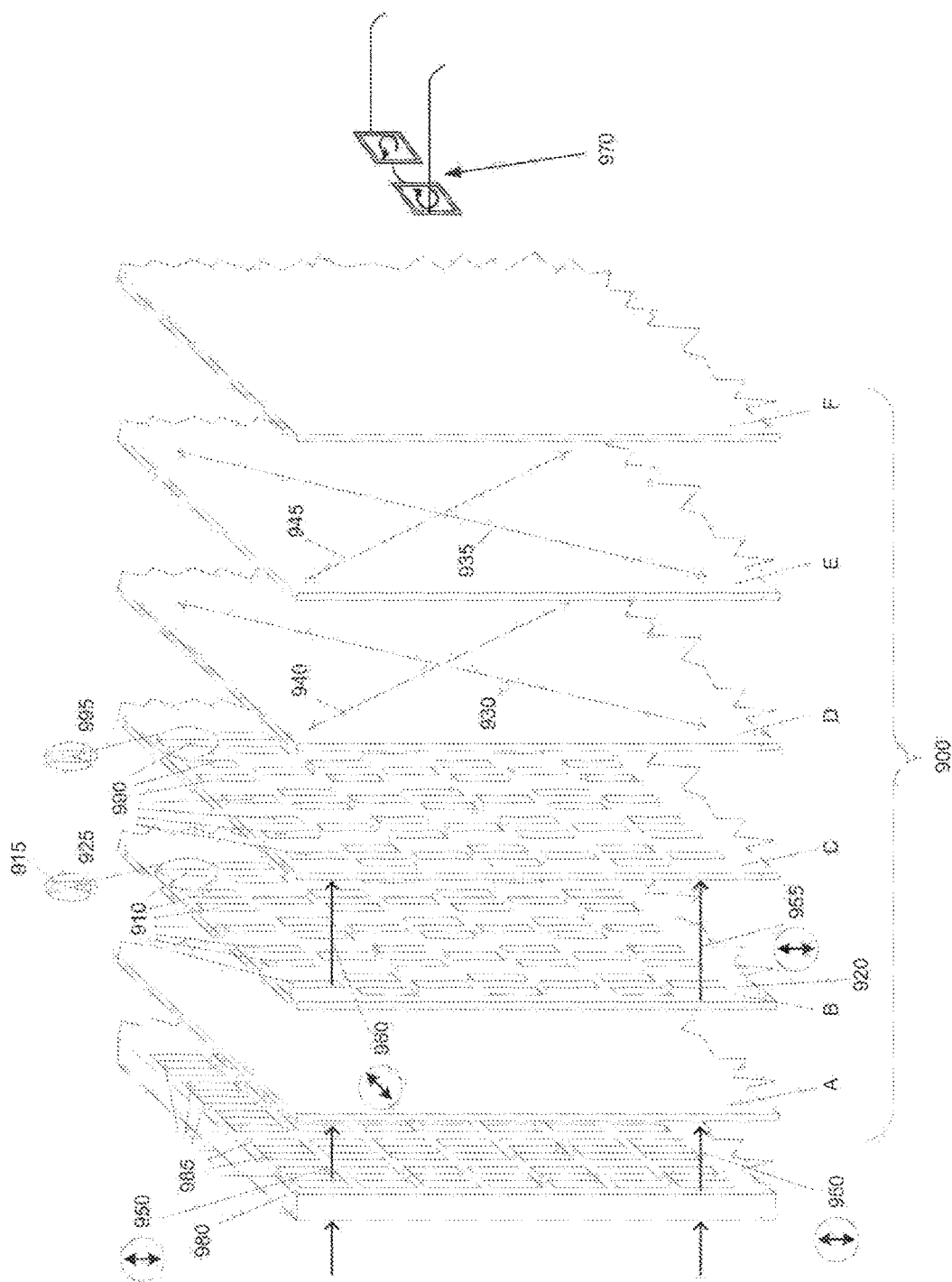
FIG. 9 shows a perspective view of micro-waveplate filters made in a new way that are placed over corresponding sub-pixels to provide proper circular polarization for each image in a stereo pair
Figure 10:
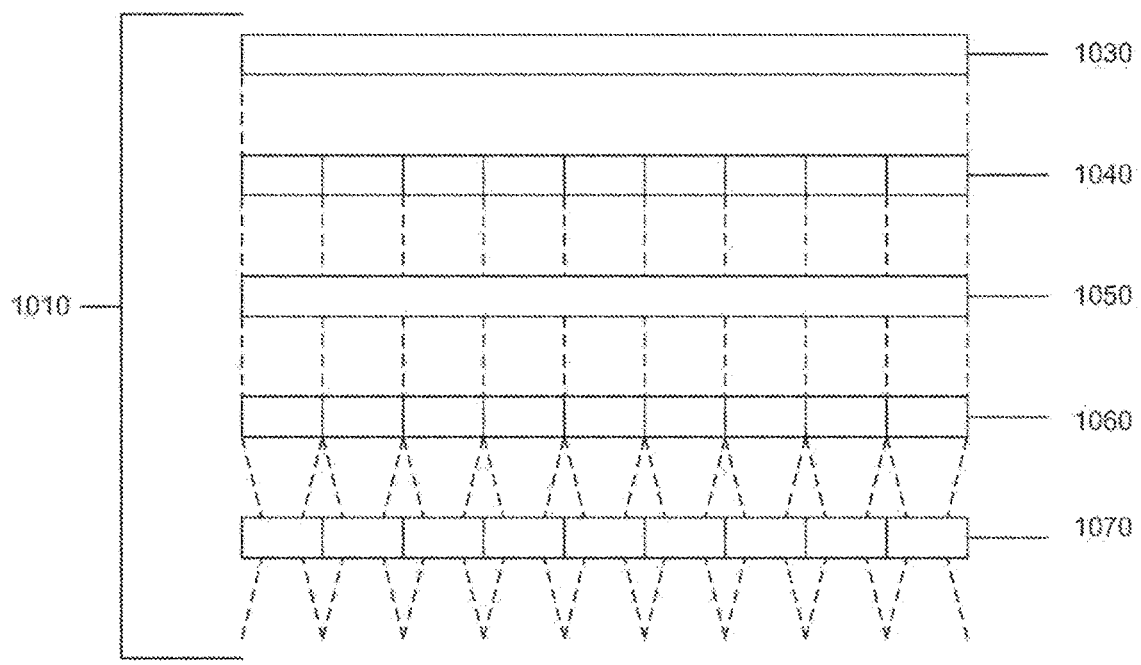

To accomplish this, a multi-layer filter 900, preferably consisting of six layers, A, B, C, D, E, and F (although, as described below, an alternative embodiment of such a filter, made without layers C, E, and F, would work) is utilized in front of the display 980 as shown in FIG. 9. One layer (B) of the filter consists of half-waveplate material in an array of rectangular areas 910, mounted on a transparent substrate 920, wherein the rectangular areas 910 correspond to the pixel parts 985 on the display 980 that display one eye's image. The half-waveplate material areas 910 can be made from several materials, such as liquid crystals, but are preferably made of a birefringent polymer (such as aniso-tropic polycarbonate), while the substrate material 920 is not birefringent (such as isotropic polycarbonate or glass). Both materials must have a relatively low coefficient of expansion and a high $T_G$ (that is, T sub G) so as not to deform or distort (relative to the display screen) from display or environmental heating, which would create misalignment or delamination. The non-half-waveplate areas 920 of this layer B therefore consist of the substrate only, with no half-waveplate material. As a result, linearly polarized light 950 emanating from the display 980 that also passes through the substrate areas 920, which contain no half-waveplate material, (displaying the other eye's image) continues to propagate with no change in polarization 955, while linearly polarized light passing through the substrate areas on B which do contain half-waveplate material 910 is rotated to a perpendicular polarization orientation 960. This occurs because the fast axis 915 of the half-waveplate material is carefully oriented at 45° with respect to the axis 950 of polarization of the linearly polarized light that enters the half-waveplate material. In addition, by choosing the thickness of the half-waveplate material properly, interference between the emerging resolved polarization components causes the light to remain linearly polarized, but with the polarization axis 960 rotated by twice the number of degrees (90° in this case) that the input polarization axis was offset from the fast axis 915 of the half-waveplate material (45° in this case).

"Proper choice" of half-waveplate material thickness means the thickness at which the resolved component of the linearly polarized light (at the center frequency of the waveband used), whose polarization axis is oriented parallel to the slow optic axis 925 of the half-waveplate material, is delayed half a wavelength (by the time it emerges from the half-waveplate material), with respect to the resolved component of the linearly polarized light whose axis is perpendicular to the slow optic axis 925 of the half-waveplate material. In practice, however, this thickness would be impractically small and, consequently, difficult to produce and work with. The common way to deal with this difficulty is to make the half-waveplate material much thicker, so that the phase shift between the two resolved components of the polarized light becomes half a wavelength plus an integer rather than just half a wavelength (the relative phase change is larger than the required value by an integer multiple of 2n). This is referred to as a "multiple-order waveplate". Using this technique would eliminate the need for layers C and E. Multiple-order waveplates, however, have the drawbacks of having a reduced bandwidth capability (over which the phase shift is correct), lower acceptance angles, higher temperature sensitivity, and unwanted dispersion.

These limitations can be minimized by adding a second half-waveplate material layer C (arranged in the same array of rectangular areas 990, corresponding to the array of rectangular areas 910 in layer B, with the half-waveplate material sides of the B and C filters facing each other to minimize the space between them) of a slightly different thickness than the half-waveplate material in layer B, with the slow axis of one half-waveplate material layer (in layer B) 925 aligned with the fast axis of the half-waveplate material layer (in layer C) 995, nearly canceling the birefringence of the two half-waveplate material layers and precisely providing the required net phase shift (a half wave, in this case). This provides a half-waveplate filter sandwich that has a practical, manufacturable, and easily handleable thickness, while acting like a "net-zero-order waveplate", imparting a relative phase shift of only half a wavelength over a broad wavelength range with reduced temperature sensitivity and wide acceptance angles. By using different materials with properly chosen different dispersions for the half-waveplate material layers B and C, the combined half-waveplate material filter (B+C) can operate achromatically as well.

Although the micro-polarizer production techniques in prior art U.S. Pat. No. 5,327,285 are applicable to the production of half-waveplate material arrays as required herein by the present invention, a new simpler preferred method of production of the half-waveplate material array is disclosed herein utilizing casting or molding. An alternative method, utilizing embossing, is also proposed.

In general, a biaxial birefringent optical film is produced by stretching an isotropic or a uni-axial polymer film, making it anisotropic. The thickness of the resulting film is modified by a mold when the film is hot and deformable so that some areas have the proper thickness to act as a half-waveplate while other areas have the proper thickness to act as a full-waveplate (imparting no resultant relative phase delay between the ordinary and extraordinary waves passing through the material, and thereby imparting no rotation to the plane of polarization of light passing through the full-waveplate areas). Alternatively, the anisotropic polymer is initially made either with a uniform thickness, constructed as a full-waveplate, or an isotropic polymer with no optical activity is initially utilized, after which a pattern is embossed into the polymer sheet utilizing heat and pressure to squeeze selected areas so that they act as half-waveplates. It is well-known in the art that compression of isotropic polymers can be used to create birefringence. The required molds and embossing tools can be made utilizing known methods such as using a computer controlled scanning laser beam to polymerize a monomer which is then metalized, use of conventional "3-D Printers", or by directly laser etching metal.

Another two layers (D+E) of the multi-layer filter 900 form net-zero-order quarter-waveplate material made of the same type of birefringent polymer material as the half-waveplate material, but with their thicknesses chosen to provide a total relative phase delay between the resolved polarization components of the linearly polarized light coming from the C layer of the filter 900 of exactly one quarter of the wavelength of the center frequency of the waveband used. The D layer is oriented with its perpendicular fast 930 and slow 940 axes at 45° to the two perpendicular linear polarization axes 950 and 960 propagating through the B and C layers of the filter. As with the B and C layers, the D layer is preferably followed by an additional layer (E), which has it's fast 945 and slow 935 axes perpendicular to the fast 930 and slow 940 axes of the D layer (with the fast axis of one layer parallel to the slow axis of the other layer), nearly canceling the birefringence of the two quarter-waveplate material layers and precisely providing the required net phase shift of one quarter of a wave at the center frequency of the waveband used. The result of propagation of light from the display 980 through layers B, C, D, and E is to impart right-circular polarization to one eye's image and left-circular polarization to the other eye's image. Consequently, viewers wearing circularly polarized glasses 970 will be able to see the proper image with each eye without crosstalk.

The A layer of the filter can be a mask or, preferably, a micro-lens array. If a mask is used as the A layer, it is constructed with black rectangles which are preferably positioned in front of each sub-pixel on the display. Each black rectangle acts as a stop which, while allowing light from a given sub-pixel to enter a corresponding half-waveplate area on the B and C layers directly in front of the sub-pixel, prevents light from nearby sub-pixels on the display from passing through the same half-waveplate areas on the B and C layers. This minimizes crosstalk between sub-pixels (and pixel parts) originating in both left-eye and right-eye stereoscopic images.

When a micro-lens array is used in the A layer (which is preferred) lenses in the array abut each other and are preferably rectangularly shaped to match the shapes of the pixels directly behind them in the display 980. Although it is preferred for the micro-lenses in the array to have the same pitch as the pixels on the display, other lens shapes and pitches are possible, such as having each micro-lens element match the size and shape of the sub-pixel or, alternately, the pixel part behind it on the display. Sufficient space is provided between the display 980 and the micro-lens array in the A layer, as well as between the lens array in the A layer and the micro-waveplate filter sandwich (B, C, D, E, and F) to allow each lens in the array to focus the light from the pixel part directly behind it on the display 980 into a corresponding section of the micro-waveplate filter sandwich (between layers B and C). This puts each sub-pixel optically in the plane of the micro-waveplate filter sandwich, eliminating parallax error and providing a wide horizontal and vertical angle of view of each sub-pixel (and each pixel part) without crosstalk between neighboring sub-pixels (and pixel parts), eliminating ghosting.

Although light emanating from the display 980 normally spreads out enough to create a very wide angle of view, use of a lens array in layer A restricts that angle. Since the lens array is preferred, layer F, a diffuser layer, is added to increase the angles that light spreads out, thereby increasing the angle of view of the display even though lenses are used in the A layer. Known diffuser technology, such as holographic or simple irregular surface diffuser materials can be used for this layer.

As mentioned herein above, prior art 3-D LCD displays utilizing micro-polarizer arrays produce significant parallax error since the micro-polarizer array is outside of the glass enclosure of the LCD, while the liquid crystal material is between the glass plates of the display in a different physical (and optical) plane from the micro-polarizer array. Light from a given pixel can be seen through its corresponding micro-polarizer element only within a limited viewing angle. Viewing the display outside of that viewing angle allows the pixel to be seen through an adjacent micropolarizer element, as well as through the proper corresponding micro-polarizer element, producing ghosting and eliminating 3-D. Use of the above described micro-lens array with prior art micro-polarizers would also eliminate this parallax error.

Figure 10:
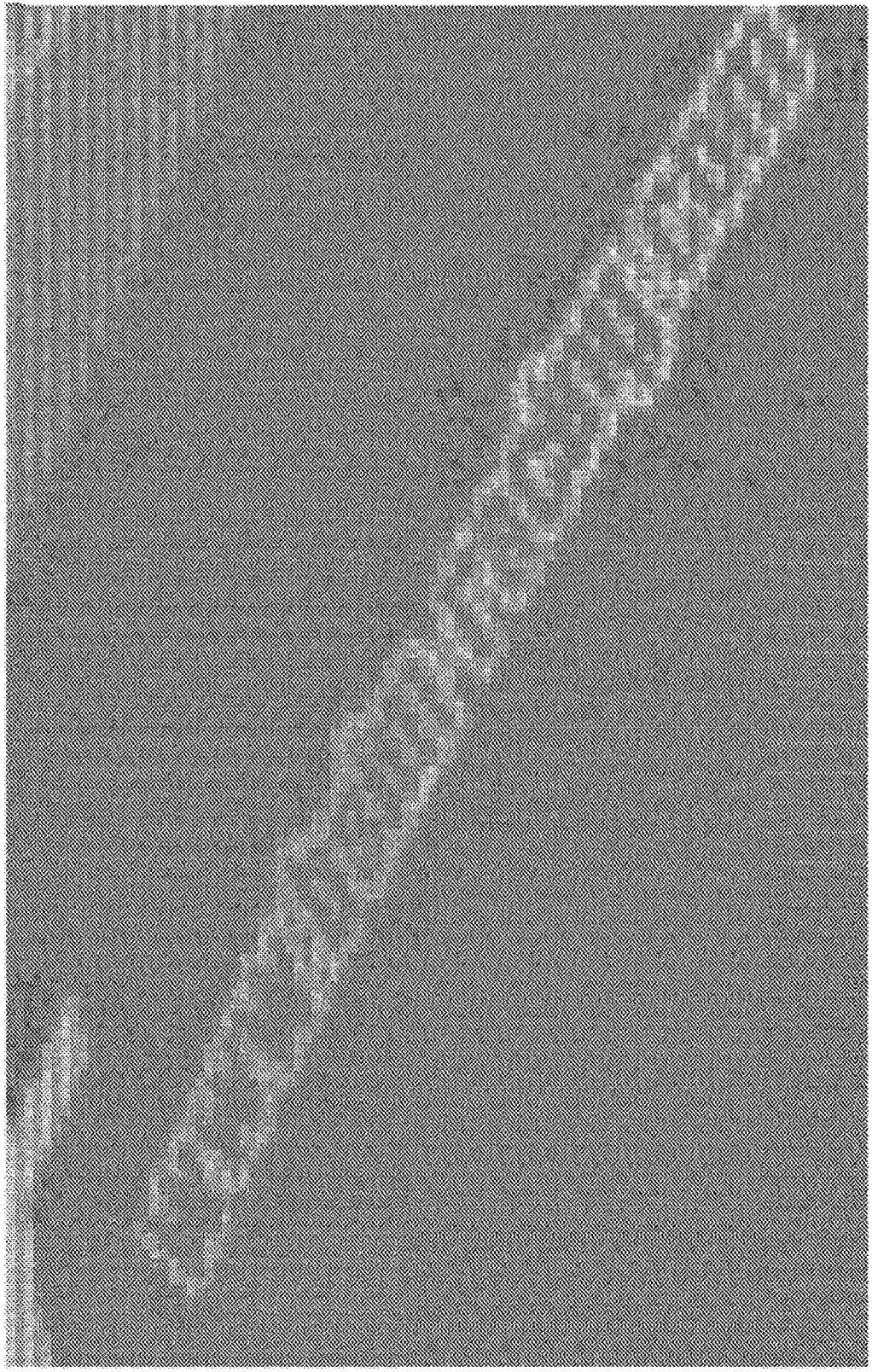
FIG. 10 shows an overhead view of a display utilizing the micro-lens array and micro-waveplate filter of the present invention.

FIG. 10 is an exploded plan view of an LCD 1010 incorporating a lens array 1060 (the A layer described above) to focus light onto the micro-waveplate screen filter 1070 (layers B-F described above). A light source (not shown) shines light through glass panel 1030, through a layer of liquid crystal material 1040, through another glass panel 1050, through the lens array 1060, and through the micro-waveplate layers (B-F) 1070 of the micro-waveplate screen filter. The glass panels 1030 and 1050 are standard in an LCD and are necessary to contain the liquid crystal layer 1040. The lens array 1060, as explained above, is an array of rectangular-cut lenses that focus light from each sub-pixel onto the corresponding micro-waveplate area of the micro-waveplate screen filter 1070. The micro-waveplate screen filter 1070 has a diffusion component (layer F) which spreads out the light as it exits. This allows viewers to see the display from wide viewing angles instead of requiring the viewer to be directly in front of the screen. Without the lens array present to focus the light into the proper micro-waveplate areas, viewing the display from an angle would result in ghosting. This is because unfocused light from each sub-pixel would pass not only through the micro-waveplate area directly in front of it, but also through the other micro-waveplate areas near it, making such light visible to a viewer who is not directly aligned with the screen.

Figure 11A:
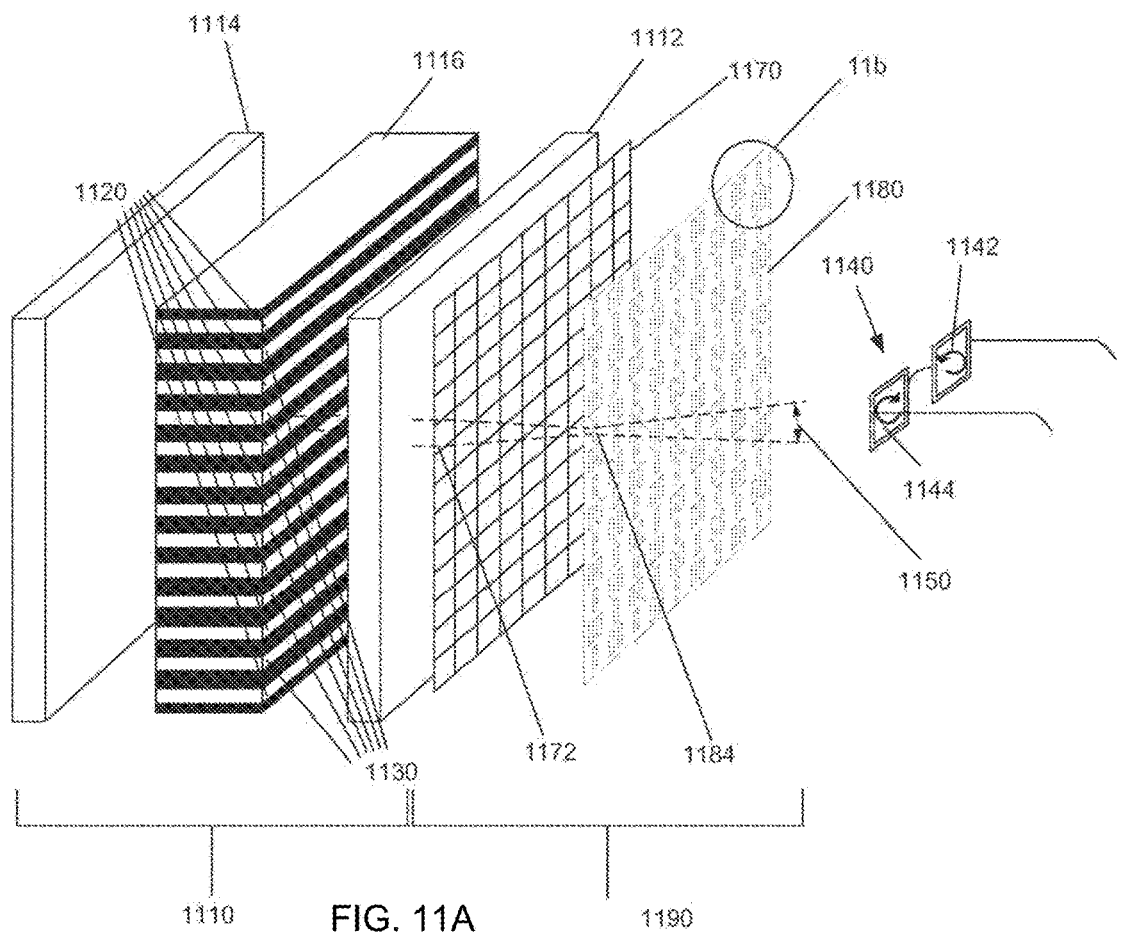
FIGS. 11A-11B show a side view of an LCD display utilizing the micro-lens array and micro-waveplate filter of the present invention.
Figure 11B:
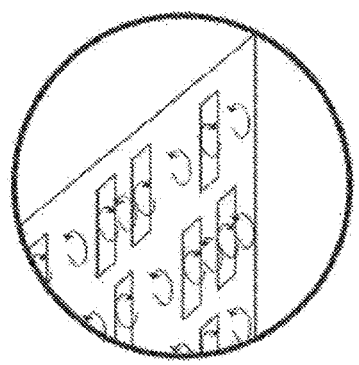

FIG. 11 depicts an exploded view of an LCD 1110 with a micro-waveplate screen filter 1190, including a lens array 1170 (layer A described above) and micro-waveplate array 1180 (layers B-F described above), mounted on the outside of the glass surface 1112 of the LCD 1110. The LCD 1110 comprises liquid crystal material 1116 suspended between two glass plates, one plate 1112 on the viewer side of the LCD and one plate 1114 on the light source side (light source not shown). Odd horizontal rows 1120 and even horizontal rows 1130 are viewed through the lens array 1170 and micro-waveplate screen filter 1180 and through polarizers 1142 and 1144 of passively-polarized viewing glasses 1140. Section 11*b* of the micro-waveplate array 1180 illustrates how individual micro-waveplate areas of the micro-waveplate array 1180 rotate the polarization of light coming from different sub-pixels in the odd and even horizontal rows, 1120 and 1130 respectively, of the LCD 1110. Light corresponding to an odd row 1120 is shown passing through glass plate 1112, then through lens array element 1172 of lens array 1170, and then through micro-waveplate area 1184 of the micro-waveplate array 1180. Lens 1172 of lens array 1170 focuses the light onto the corresponding micro-waveplate area 1184 of the micro-waveplate array 1180. The micro-waveplate area 1184 of the micro-waveplate array 1180 has a diffusion component (the F layer described above) that causes light to diffuse after passing through it, as can be seen at angle 1150. In this embodiment, every pixel of the LCD 1110 has a corresponding lens array element in the lens array 1170 and micro-waveplate area in the micro-waveplate array 1180. It is to be understood that the lens array 1170 and micro-waveplate array 1180 together form the micro-waveplate screen filter 1190. In other embodiments, the lens array may, for instance, be manufactured to operate on a sub-pixel-by-sub-pixel basis, instead of on a pixel-by-pixel basis.

When a non-polarized display (such as a CRT, Plasma, or DLP display) is used with the present invention, another method of sending the correct image to each eye is with a new type of device referred to herein as "active colored glasses". These glasses act as color filters that change their color repeatedly over very short time periods. In accordance with the preferred embodiment of the present invention, during a first period of time, the filter in front of one eye allows green wavelengths to pass through, while blocking all other wavelengths, at the same time that the filter in front of the other eye allows red and blue wavelengths to pass through, while blocking all other wavelengths. During a second period of time, the filters reverse their transmission bands so that the filter which transmitted green wavelengths during the first period of time only transmits red and blue wavelengths during the second period of time and the filter that transmitted red and blue wavelengths during the first period of time transmits only green wavelengths during the second period of time. During a third period of time, the filters revert back to the state they were in during the first period of time, and so on, continuously reversing their wavelength bands (whenever they are turned on). The filter bandpass reversals are triggered by a signal, initially transmitted during the vertical blanking period, which goes to a sync-pulse transmitter 538 in the vicinity of the display 534, that sends a signal 542 (which could be infrared, or, preferably, RF) to the receiver 550 of the active colored glasses 546 worn by viewers. This synchronizes the glasses with the color sub-pixel patterns displayed on the screen. When utilizing RF, a signal privacy system, such as Bluetooth technology, can be utilized to prevent crosstalk between units operating in the same vicinity.

When the first field is displayed on the viewer's TV, the active colored glasses are triggered by the signal 542, preferably sent from an RF transmitter located within, or controlled from, the device generating the field images (such as a monitor or projector). For this field, the left filter in the glasses transmits only green information to the viewer's left eye, while the right filter in the glasses transmits only red and blue information to the viewer's right eye. This is indicated by the picture of the glasses 428 (for a progressively scanned display) and 728 (for an interlaced display) to the right of the field composite images represented in charts 414 and 714. When the next field is displayed, the left filter of the glasses is triggered to transmit only red and blue information to the viewer's left eye while the right filter of the glasses is triggered to transmit only green information to the viewer's right eye. This is indicated by the picture of the glasses 430 (for a progressively scanned display) and 730 (for an interlaced display) to the right of the field composite images represented in charts 420 and 720. The charts 414 (for a progressively scanned display) and 714 (for an interlaced display) show what each eye of the viewer will see when viewing the composite image through the active colored glasses of the present invention during the display of the first field. The charts 420 (for a progressively scanned display) and 720 (for an interlaced display) show what each eye of the viewer will see when viewing the composite image through the active colored glasses of the present invention during the display of the second field. Charts 422 and 722 depict what the viewer's left eye will see during the period of display of one frame (two fields) and charts 424 and 724 depict what the viewer's right eye will see during the period of display of the same frame (two fields). Charts 426 and 726 depict what the eyes of a viewer will see during the period of display of the same frame just described. The standard vertical sync signal sent with the TV image, for instance, can be used to trigger the glasses to transmit the proper colors to the viewer's eyes in synchronization with the display of different fields on the TV, computer monitor, hand-held device, or projector (as is known in the art when used with conventional shutter glasses). The composite images constructed by this process can thus be seen in 3-D by viewers wearing the active colored glasses of the present invention.

The simplest way to produce the active colored glasses is to use a single full-color transmissive additive color LCD in front of each eye of the viewer. This type of LCD consists of an array of pixels, each of which is composed of colored (such as red, green, and blue) sub-pixels, as is illustrated in FIG. 9 (980). The color of each pixel is produced by color addition since the eyes of viewers perceive the pixel color as a result of the amounts of light coming from the differently colored sub-pixels added together. During a first period of time, all of the green sub-pixels of the LCD in front of one eye can be in the transmissive state, while all red and blue sub-pixels are in the opaque state. Simultaneously, all of the red and blue sub-pixels of the LCD in front of the other eye could be in the transmissive state while all of the green sub-pixels on that LCD could be in the opaque state. During a second period of time, all sub-pixels on both LCDs that were in the opaque state could switch to the transmissive state while all sub-pixels on both LCDs that were in the transmissive state could switch to the opaque state. This will provide a repeating sequence of alternating color filters (transmitting only green wavelengths to one eye while transmitting only red and blue wavelengths to the other eye, followed by the reverse). The constant switching of transmitted colors to each eye, triggered by a synchronizing signal 542, in conjunction with the changing pixel information described above, will allow viewers to see a full-color image with each eye, together providing a 3-D stereoscopic view, during each frame period (such as 1/30 of a second). One advantage of using this type of additive LCD in the active colored glasses of the present invention is that the LCD does not have to have high-resolution (since image resolution is determined by the display being watched), and thus, can be very inexpensive. The main disadvantage of using an additive display with colored sub-pixels is a reduction in overall brightness. In a given LCD, since the sub-pixels are adjacent to each other on the display, different spatially located areas (where each sub-pixel is located) can only transmit one waveband or nothing, reducing the maximum potential transmission to one third. For instance, the green sub-pixels can transmit green wavelengths during one period of time, but transmit nothing during the next period of time. Thus, no red or blue wavelengths ever come through those areas of the LCD. The same is true for each of the sub-pixels.

A more efficient solution, which is preferable in the present invention, is the use of a subtractive color filter stack. In this type of color filter, three or more layers are stacked on top of each other. Each layer has the ability to transmit all wavelengths or to absorb one selected band of wavelengths (such as the green wavelengths, for instance), allowing the remaining wavelengths (such as blue and red wavelengths, for instance) to pass through. Therefore, during a first period of time, one layer could absorb all green wavelengths while all layers could transmit all red and blue wavelengths through every spatial area on the filter. During another period of time, one layer could absorb all red wavelengths while another layer could absorb all blue wavelengths. However, during that same time all three layers could transmit all green wavelengths through every spatial area on the filter. Consequently, this type of subtractive filter has the potential to produce a significantly brighter image to the eyes of viewers as compared with viewing through an additive filter (such as a conventional LCD).

Several technologies have been developed that can be utilized as electronic subtractive color filters. Some of these technologies have been described in various U.S. patents including: U.S. Pat. Nos. 3,703,329, 4,002,081, 4,003,081, 4,091,808, 4,232,948, 4,232,984, 4,240,696, 4,416,514, 4,582,396, 4,674,841, 4,758,818, 4,917,465, 4,966,441, 5,032,007, 5,050,965, 5,122,887, 5,124,818, 5,132,826, 5,184,156, 5,347,378, 5,422,756, 5,612,820, 5,686,931, 5,686,961, 5,689,317, 5,714,970, 5,751,384, 5,822,021, 5,822,021, 5,929,946, 5,990,996, 5,999,240, 6,049,367, 6,183,091, 6,273,571, 6,417,892, 6,667,784, 6,882,384, and 7,170,679, and in various U.S. pending applications including: 2002/0101546, 2005/0122454, and 2007/0024779. To the extent that the disclosures of the aforementioned references contain subject matter required to enable a skilled worker to make and use an embodiment of the present invention, they are incorporated herein by reference. Currently, the subtractive filter preferred for use in the active colored glasses of the present invention is the Snap Wave solid state switchable color filter made by ColorLink of Boulder, Colo.

It is very important to select the bandpass wavelengths for the filters very carefully to provide correct colors and minimize ghosting. Although the filters are switching their bandpass wavelengths rapidly and constantly, at any given point in time each eye sees a different band of wavelengths, causing the glasses to operate (for that short period of time) like static passive colored glasses. Consequently, the major drawbacks of prior art static anaglyphic or other colored glasses (the inability to produce full natural color and the production of discomfort, eyestrain, and headaches) have to be corrected for the active colored glasses to work properly.

These problems stem from the facts that prior art anaglyphic or other colored glasses have always created a brightness imbalance between the two eyes of viewers (creating discomfort, eyestrain, and image rivalry), have not provided the proper ratio of primary colors to allow viewers to see full-color imagery, and have not been made with the proper combination of wavelength bandpass and blocking to match the spectra emitted by various displays to prevent crosstalk and ghosting.

Since three primary colors are used in today's displays, one eye has to view one primary color while the other eye views the other two primary colors. Since color television utilizes a mixture of approximately 59% green, 30% red, and 11% blue to create the experience of white, the best separation is achieved by displaying green to one eye while red and blue are displayed to the other eye. Utilizing green for one eye and magenta (red and blue) for the other eye at any given point in time, the brightness difference between the images displayed to the eyes of the viewers is minimized (59% green is seen by one eye while 41% magenta is seen by the other eye). Any other distribution of primary colors would create a greater imbalance in brightness between the two eyes of viewers. As it turns out, since our eye/brain system has the greatest sensitivity to green light, and because the brain will rebalance the perceived color space after a short period of time, the green image can be reduced in brightness even more (since it is seen alone, without the other primary colors), further improving the brightness balance between both eyes, while still allowing an acceptable color image to be seen. The brightness of the green image can be reduced by narrowing the bandpass of the green filter and/or adding a neutral density filter to the green filter (when using static passive colored glasses such as with the preferred embodiment described below) or decreasing total transmissivity of the filter transmitting green wavelengths at any given point in time by shortening the duty cycle (when using active colored glasses).

Figure 12:
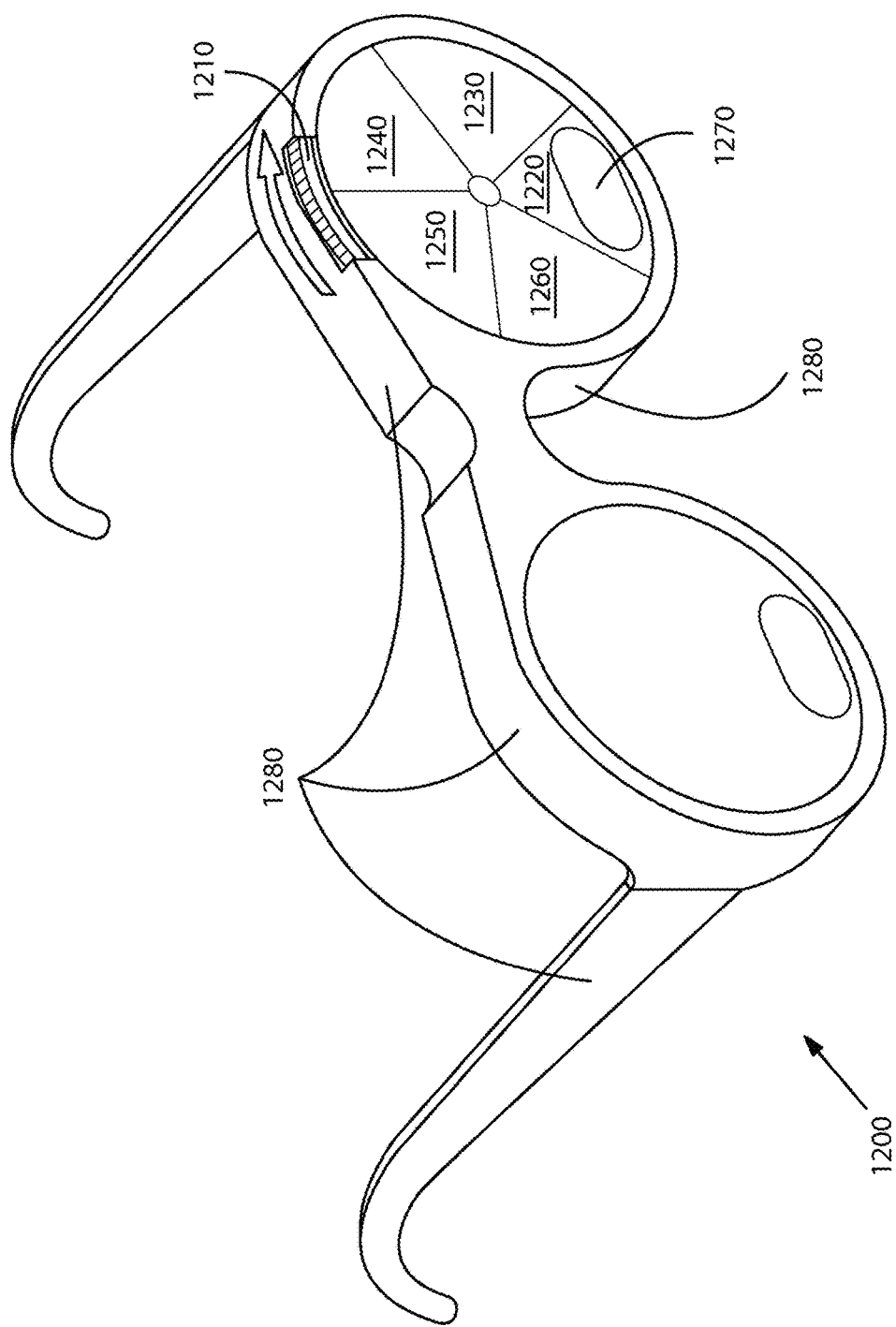
FIG. 12 shows a pair of static colored glasses of the present invention.

Researchers have discovered that everyone has a different makeup (quantity and distribution) of short, medium, and long wavelength cones in their retinas. See "Organization of the Human Trichromatic Cone Mosaic", H. Hofer et al. in J. Neuroscience Oct. 19, 2005, 25(42):9669-9679. The present inventor has postulated that this is one of the main reasons that different people experience different perceptions of color hues as a result of subtle brightness changes of the green image when using the static or active colored glasses of the present invention. Consequently, it is beneficial to provide the wearer of active colored glasses (used in the present invention), as well as the wearer of static colored glasses (used in the preferred embodiment of the present invention, detailed below) with a brightness adjustment means for the observed green image (although the magenta image brightness could be adjustable instead or in addition). With the active colored glasses, this can be accomplished, for instance, with a simple adjustment knob or up and down buttons on the glasses to modify a bias setting which changes the brightness of the view seen by either eye when it is viewing the green image. With static colored glasses 1200, an electronic dimming mechanism (such as an adjustable liquid crystal filter, as is known in the art) could be used, or a wheel 1210, adjustable by the wearer, consisting of neutral density filters of different densities 1220-1260 (such as 0.15, 0.3, 0.45, 0.6, and 0.75, providing a reduction of ½ stop, 1 stop, 1½ stops, 2 stops, and 2½ stops, respectively) can be placed in series with the green (and/or magenta) filter 1270 to allow the viewer to adjust the perceived color hues. This is shown in FIG. 12.

Figure 13:
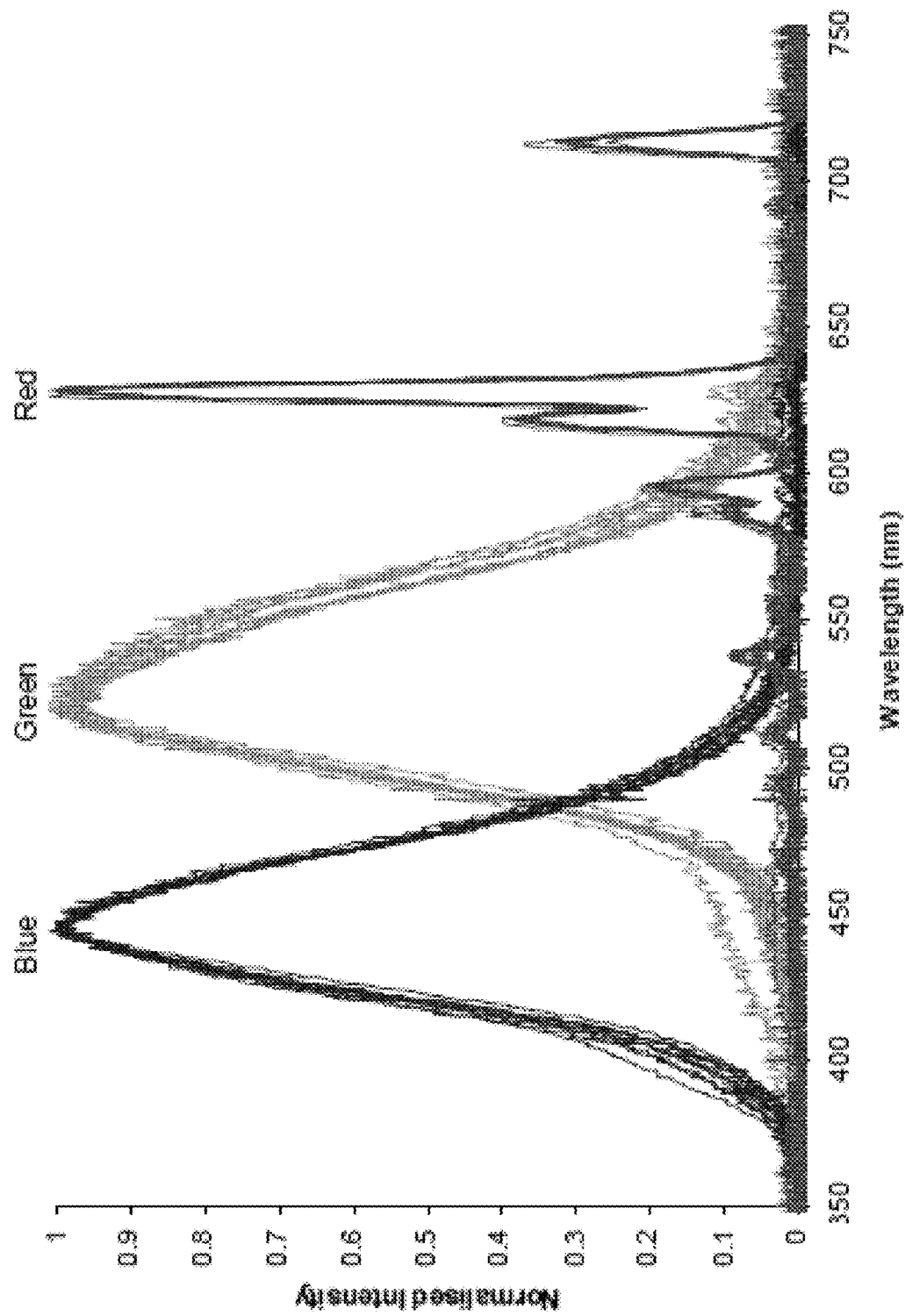
FIG. 13 shows a graph depicting the wavelengths emitted by the phosphors of 11 different CRT displays.

To determine the proper bandpass and blocking wavelengths for the filters used in the static and active colored glasses, the wavelengths emitted by various displays have to be measured and graphed. In 2002, Andrew J. Woods and Stanley S. L. Tan of the Centre for Marine Science and Technology (CMST), Curtin University of Technology, Perth, Australia measured the spectral outputs of 11 different CRTs and plotted them on a single graph, publishing it in the proceedings of the SPIE volume 4660 in January 2003. This is shown in FIG. 13. In 2007, Andrew J. Woods, Ka Lun Yuen, and Kai S. Karvinen measured the spectral outputs of 13 different LCD monitors, plotting them, and 14 different plasma displays plotting them as well. These were published in the Journal of the Society for Information Display (volume 15, issue 11, pp. 889-898) in November 2007 and are shown superimposed on two single graphs in FIGS. 14 and 15.

Figure 14:
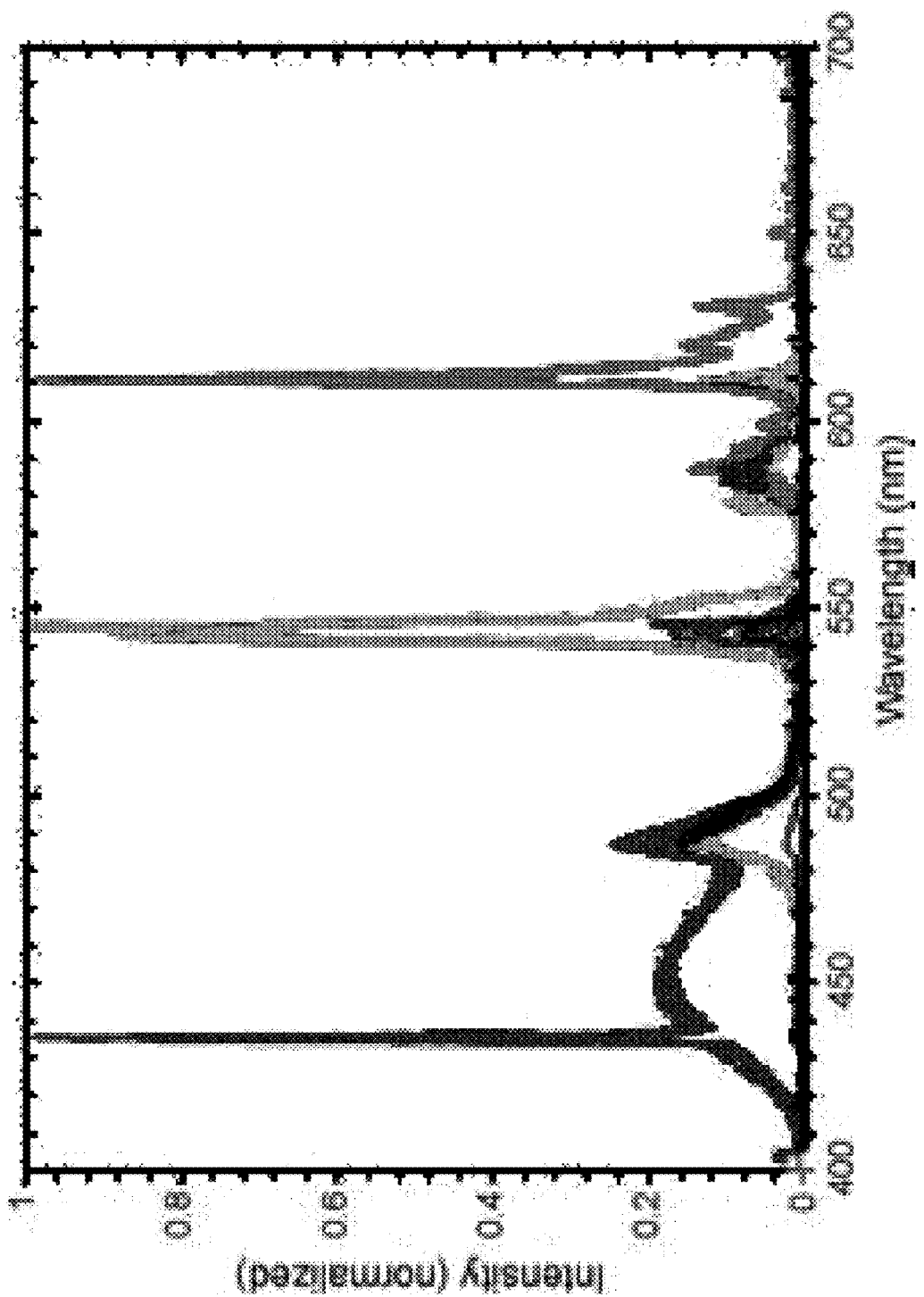
FIG. 14 shows a graph depicting the wavelengths transmitted by the filters of 13 different LCD displays.
Figure 15:
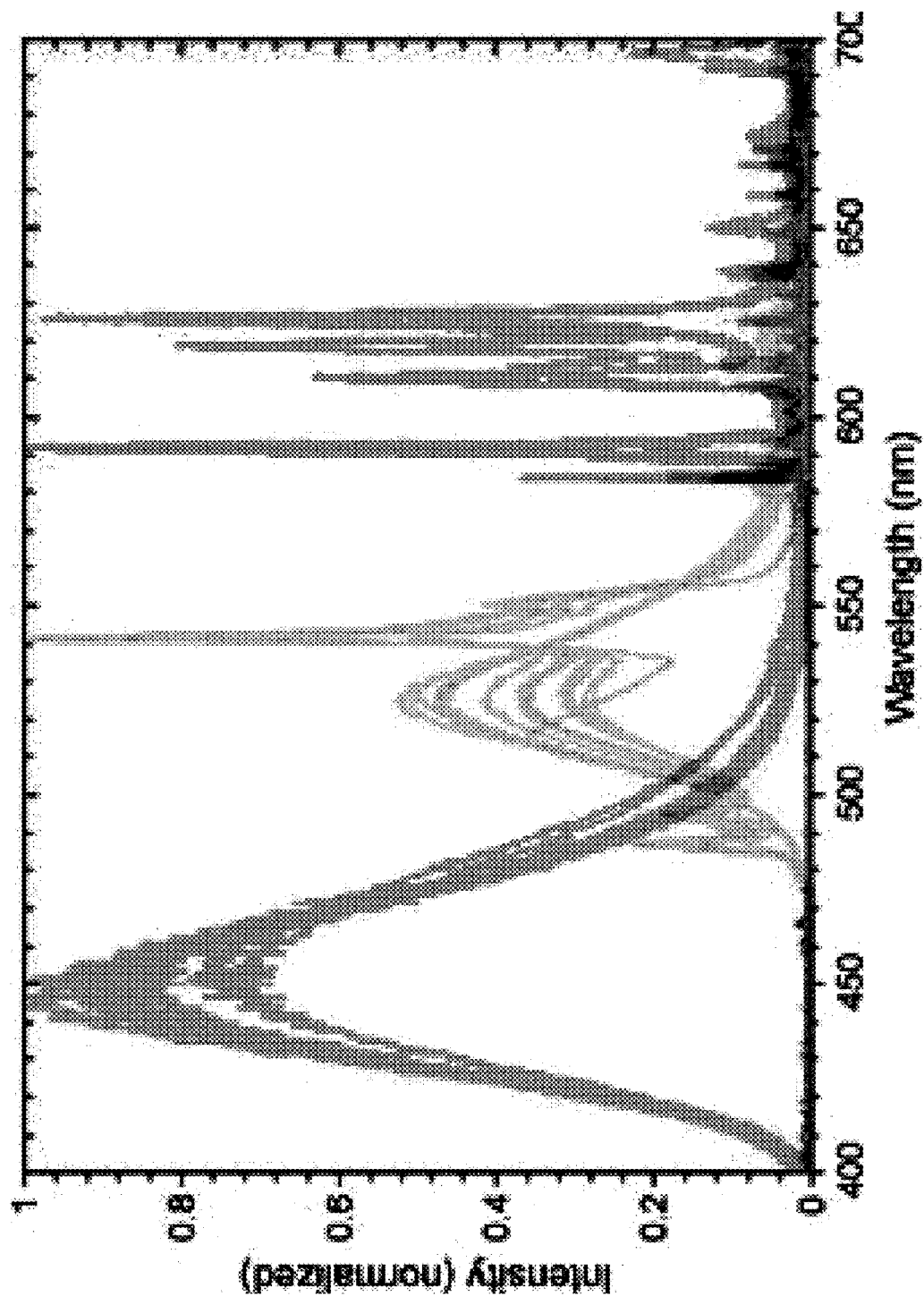
FIG. 15 shows a graph depicting the wavelengths emitted by the phosphors of 14 different plasma displays.

As can be seen from FIG. 13, the green and blue phosphors have a significant overlap in wavelengths, as do the green and red phosphors. FIG. 14 shows that similar overlaps occur with LCD display filters. FIG. 15 shows a significant overlap of green and blue wavelengths from the phosphors of plasma displays as well. Consequently, if the left-eye image was displayed with only green sub-pixels, for instance, while the right-eye image was displayed with only red and blue sub-pixels, for instance, a filter transmitting only all green wavelengths placed in front of the left eye would show the left-eye image plus a somewhat dimmer view of the right-eye image in green. In addition, a filter transmitting only all red and blue wavelengths placed in front of the right eye would show the right-eye image plus a somewhat dimmer view of the left eye image in red and blue. This ghosting (or double image) would be very annoying and would dramatically decrease the amount of 3-D that could be seen (which has always been a major drawback of all forms of anaglyphic as well as other colored glasses).

To eliminate this problem, each eye's filter has to block (as much as possible) the wavelengths that overlap each other. Looking at FIG. 13, depicting CRT wavelengths, this means that the filters have to block as much of the light as possible at wavelengths between about 460 nm and 540 nm as well as between about 580 nm and 635 nm to minimize crosstalk when observing CRT displays. Blocking more wavelengths would reduce crosstalk somewhat further, but would significantly reduce image brightness. The preferred way to produce the necessary blocking filter for the active colored glasses is to superimpose two multilayer dielectric (dichroic) coatings to produce blocking of only the overlapped wavelengths. Production of such multilayer dielectric coatings by vacuum deposition of alternating layers of SiO and TiO, for instance, is well-known in the art. The first multilayer dielectric coating would be transmissive at all visible wavelengths except between 460 nm and 540 nm. The second multilayer dielectric coating would be transmissive at all visible wavelengths except between 580 nm and 635 nm. The same two multilayer dielectric coatings would be placed in front of each eye's color filter in the active colored glasses to eliminate crosstalk when watching CRT displays.

Looking at FIG. 14, depicting LCD display wavelengths, it can be seen that the blocking filters would have to be made to block as much of the light as possible at wavelengths between about 475 nm and 545 nm as well as between about 580 nm and 615 nm. Consequently, the blocking filters required for viewing CRT displays would also work pretty well when viewing LCD displays.

FIG. 15, which depicts plasma display wavelengths, shows that blocking filters would have to be made to block as much of the light as possible at wavelengths between about 480 nm and 545 nm as well as between about 580 nm and 630 nm. Again, the blocking filters required for viewing CRT displays would also work pretty well when viewing plasma displays.

It can be seen from the above that one type of blocking filter could be produced that would work well in the active colored glasses on all three types of displays. Ideally this blocking filter would block as much of the light as possible at wavelengths between about 460 nm and 545 nm as well as between about 580 nm and 635 nm. Decreasing the width of each blocked wavelength region would increase brightness while also increasing ghosting. Such a tradeoff can be made based on the amount of brightness vs. ghosting that is deemed tolerable by viewers. For active colored glasses, each eye could have a combination of a subtractive color filter which can alternate between only green transmissivity and only magenta transmissivity (as described above) and a blocking filter. For static passive colored glasses, one eye (such as the left eye, for instance) could have a broad green filter with a blocking filter and the other eye (such as the right eye, for instance) could have a broad magenta filter with a blocking filter. Alternatively, static colored glasses could use one dichroic filter for each eye which incorporates the transmissivity and blocking characteristics of the color filter and blocking filter described above that is required for each eye. The bandpass of the filters for the static passive colored glasses should correspond to the same wavelength bands described above. Other types of filters, such as gel filters, could be used in static colored glasses, but would only work as well as they could approach the transmissivity and blocking characteristics required, as described above.

In addition to making the proper choice of wavelength bands that should be transmitted to the viewers' eyes (as defined above), it is an essential part of the embodiments of the present invention which utilize static or active colored glasses that the amount of light (the relative intensities) of each color be properly balanced by transmitting the basic display colors (red, green, and blue) to viewers' eyes in a relative relationship to each other which approximates the 30%-59%-11% ratio used in color television (to ensure the perception of full color, including white), while regulating the overall transmission to each of the viewers' eyes so that they perceive similar intensities (to prevent retinal color rivalry, eyestrain, fatigue, and headache).

Two methods that can be used to achieve this balance are: 1. calculating photopic perception values from irradiances measured through prospective filters, and 2. viewing a specific test pattern through prospective filters to make visual determinations of pattern visibility. After these tests are done, the final decision regarding acceptability of prospective filters can ultimately be made by viewing full-color 2-D or 3-D content on a type of monitor that will be used for actual viewing and alternating between different prospective filters for subjective color acceptability comparison.

Figure 20:
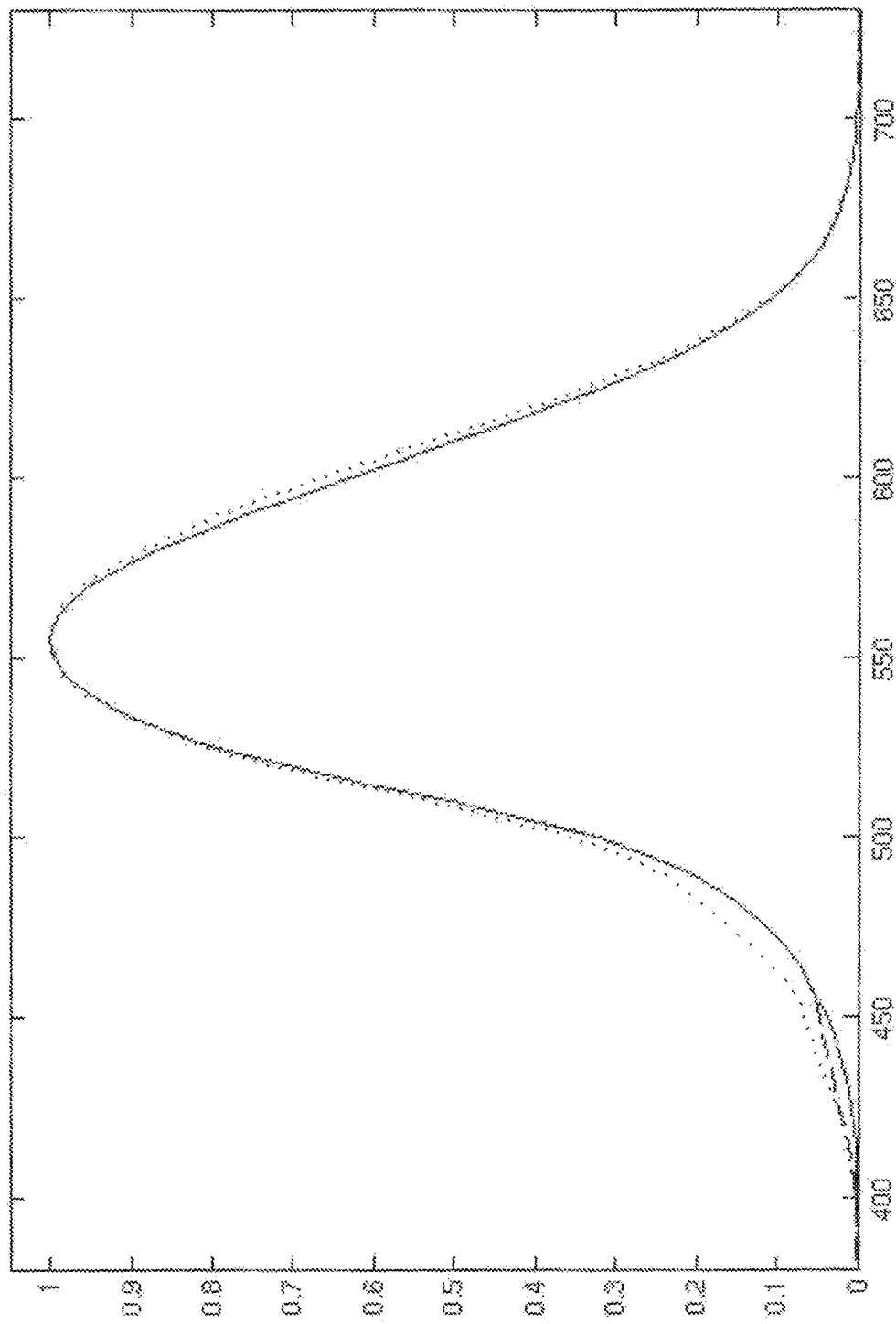
FIG. 20 shows the accepted standard photopic curve depicting specific sensitivities (on average) of the cones of the human eye to different wavelengths.

In the first method, a spectrometer is used to measure the transmission of each prospective filter at different wavelengths of the visible spectrum. To do this accurately, the type of display which will be used to view 3-D images on (such as an LCD display) is made to display a white screen (R=255, G=255, B=255). This can be done with multiple types of displays to select filters that work well with all displays to be viewed, or to provide different sets of filters to be used when viewing different types or models of displays. The spectrometer probe then measures the output of the display as it passes through each prospective filter. This produces a graph and a table of values depicting the relative intensity at each listed wavelength. If the spectrometer software doesn't have the required conversion capability, this data must be converted to display photopic values. The cones of the human eye have specific sensitivities (on average) to different wavelengths, as depicted in the accepted standard photopic curve shown in FIG. 20. To convert raw photometric measurement values to photopic values, the relative intensity measured at each wavelength has to be multiplied by the photopic conversion factor (known in the art) for that wavelength to produce the photopic value at each wavelength. Once the values are calculated at all the desired wavelengths, a new curve emerges which shows the perceived relative intensities of the different color bands in relation to each other. Then, selecting be wavelengths that define a particular color band (red, green, or blue) and adding up all the photopic intensities for those wavelengths provides the total perceived transmission of that color as seen with the prospective filter on the display being viewed. With these photopic curves and values it becomes relatively easy to select filters that have the potential to display the proper balance of transmission in the primary colors emanating from the display.

Figure 21:
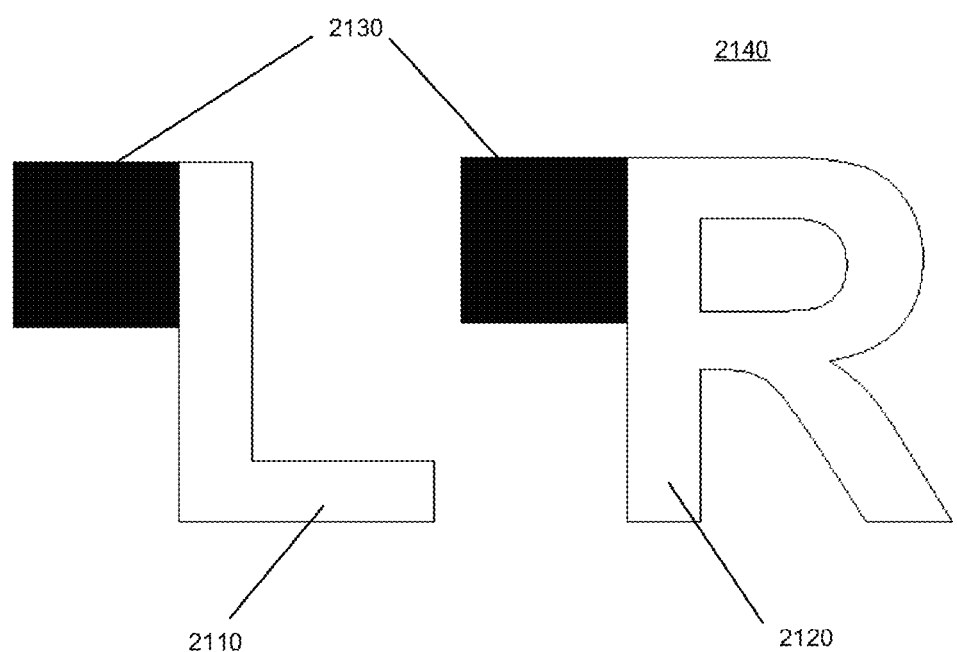
FIG. 21 shows a test pattern to be viewed through prospective filters for static or active colored glasses to determine whether the filters transmit properly balanced amounts of light (the relative intensities) of the basic display colors (red, green, and blue) to viewers' eyes.

Using the second method, a pattern is made such as is depicted in FIG. 21. Two block letters are provided such as an "L" 2110 and an "R" 2120 wherein the "L" 2110 is produced with all green pixels (for instance) turned on (G=255) while all red and blue pixels (for instance) are turned off (R=0, B=0). The "R" 2120 would then be produced with all red and blue pixels turned on (R=255, B=255) and all green pixels turned off (G=0). Adjacent to each letter are areas 2130 which are black (R=0, G=0, B=0). Otherwise, the rest of the image (the background 2140) is white (R=255, G=255, B=255). When testing a prospective filter for the left eye (for instance) the letter "L" 2110 should appear to blend in with the white background 2140 (which now appears green when viewed through a proper green filter) as much as possible, and thus, should be difficult or impossible to see. This would indicate that the filter is blocking all red and blue light coming from the display (from the white background 2140) while allowing all green light from the display (from the white background 2140 as well as from the green "L" 2110) to be seen. The display area which contains the "R" 2120 should appear as black as possible (and as similar to the black areas 2130 on the display as possible) when viewed through that green filter, since no green pixels are turned on in these areas of the display. Similarly, when testing a prospective filter for the right eye (for instance), the letter "R" 2130 should appear to blend in with the white background 2140 (which now appears magenta when viewed through a proper magenta filter) as much as possible, and thus, should be difficult or impossible to see. This would indicate that the filter is blocking all green light coming from the display (from the white background 2140) while allowing all red and blue light from the display (from the white background 2140 as well as from the magenta "R" 2130) to be seen. The display area which contains the "L" 2110 should appear as black as possible (and as similar to the black areas on the display 2130 as possible) when viewed through that magenta filter since no red or blue pixels are turned on in these areas of the display. The more closely these conditions are met, the better the 3-D and color will be, and ghosting will be greatly reduced or eliminated.

Figure 19:
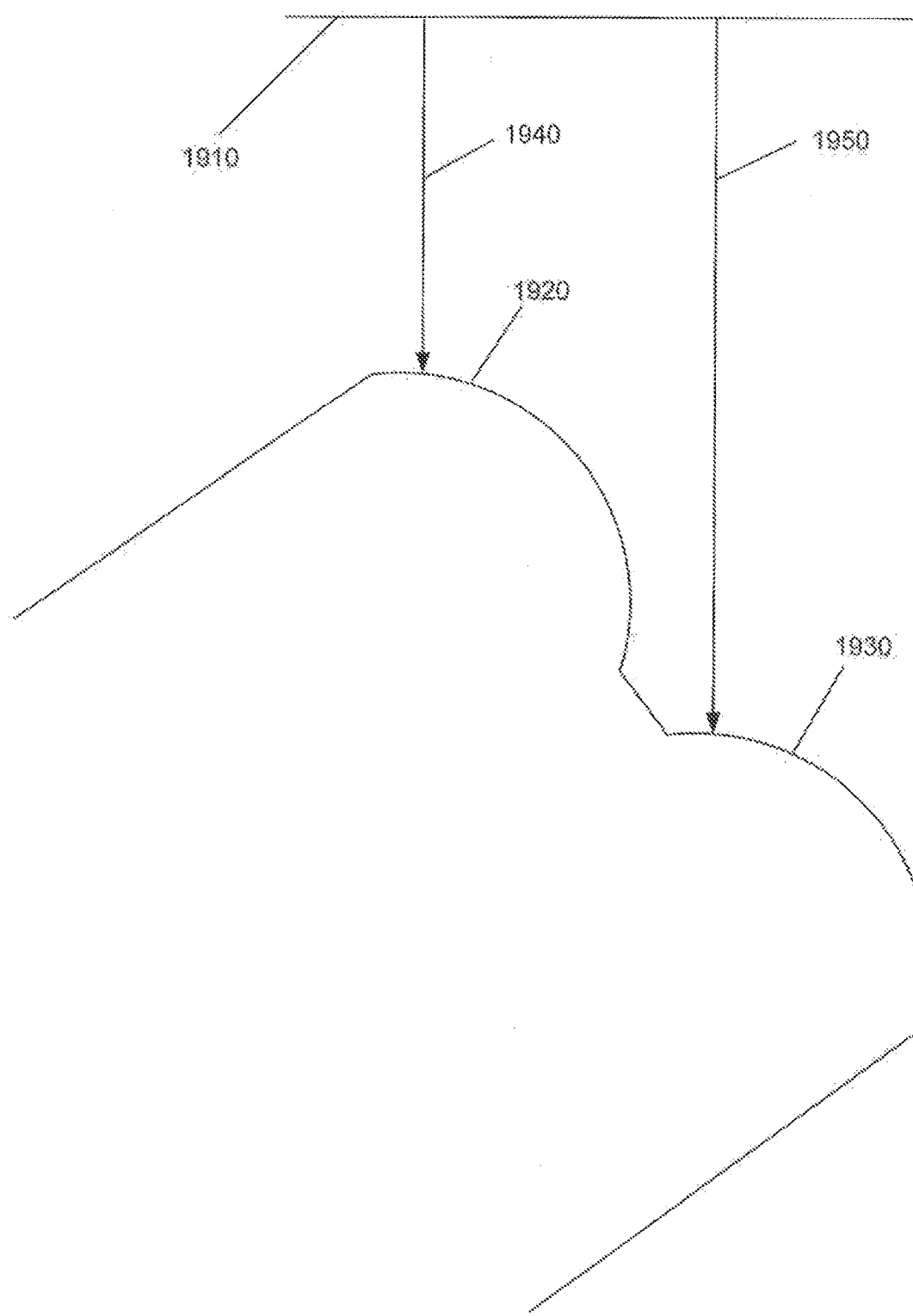
FIG. 19 is a plan view of curved viewing glasses (which are preferred when using dichroic filters) receiving light from a 3-D display.

FIG. 19 is a plan view of curved viewing glasses (which are preferred when using dichroic filters) receiving light from a 3-D display. Filtering based on the wavelength of light works best when the light hits the filter at a right angle (normal) to the plane of the coating layers on the filter. Otherwise, wavelengths that should have been filtered out will pass through, and wavelengths that should have passed through will be filtered out. This can result in ghosting. Thus, the static or active colored glasses disclosed herein, when using dichroic filters, are preferably curved such that if a viewer is viewing a display 1910 from an angle, instead of straight-on, light rays, depicted as 1940 and 1950, from the display 1910 hit the filter normal to the layers of each respective coating, 1920 and 1930, and the proper wavelengths are transmitted or blocked as required. Although various curvatures will work, the preferred radius of curvature is approximately 6 inches. This represents the approximate distance between the axis of rotation of a person's head (centered on a person's cervical spine) and the location of glasses that would typically be worn by a viewer.

Utilizing the static or active colored glasses of the present invention, wherein overlapping wavelengths are blocked, reduces the amount of light available to the eyes of viewers. The resulting image brightness reduction can be compensated for by modifying the design of the glasses to include shielding structures to reduce the amount of ambient light that can be seen by viewers' eyes. Such shielding structures 1280 (shown in FIG. 12) can surround the filters in the glasses frames, preferably touching the face of the viewers, to prevent ambient light from being seen. This creates a mini-darkroom for the viewers' eyes. Just as in a darkened movie theater, this mini-darkroom will cause the viewers' eyes to dark-adapt over a short period of time, causing the pupils to dilate and making the image appear brighter (as it does in a movie theater).

Many movie theaters have converted to digital projection, and the trend will continue to expand. Theatrical digital projectors utilize DLP technology which allows projection at high frame rates. Consequently, such projectors could be used to alternately project images wherein, during one period of time, the left-eye image of a stereo pair is projected in green wavelengths while the right-eye image is projected in red and blue wavelengths, followed by a period of time wherein the left-eye image is projected in red and blue wavelengths while the right-eye image is projected in green wavelengths. Moviegoers wearing the active colored glasses of the present invention would then see full-color 3-D movies without the need to polarize the light coming from the projector and without the need for a metalized screen (necessary to maintain light polarization when watching movies with polarized 3-D glasses). Alternatively, digital as well as film projectors could project 3-D at standard frame rates onto conventional movie screens wherein one eye's image is always green and the other eye's image is always magenta, while moviegoers where the static colored glasses of the present invention to view full-color 3-D movies, again eliminating the need to polarize the light from the projector or to use a metalized screen.

Utilizing the understanding, presented in this patent specification, that ghosting in 3-D displays results from the overlap of wavelengths from the phosphors and filters of today's displays, it would be preferable to produce new displays wherein the wavelengths emitted by the phosphors or transmitted by the color filters of the displays are selected so that they do not overlap. Such displays could be utilized to view 3-D images with simple high-transmissivity, broad-color-filter static or active colored glasses, without the need for the special blocking filters of the present invention, as well as to view conventional full-color 2-D images.

When a double resolution 2-D image is viewed utilizing the present invention, no filter is required to be placed on the display screen and no special glasses need to be worn by viewers. Both eyes of viewers are then able to see all pixel parts of all pixels on the display device and, since there are twice as many pixel parts as there are pixels on the display, the observed image has twice the resolution of the display itself.

Alternate Embodiments

Alternate encoding embodiments can be used to form the composite images in the mixer 518 and/or to display information on displays 534 while still using the basic principles of the present invention. Such alternate embodiments (which are considered to be within the scope of the present invention), can be utilized to provide different data configurations (resulting in different image appearances), as well as to provide resistance to data loss and corruption caused by the use of lossy, higher compression transmission algorithms. For instance, different versions and configurations of MPEG-2 and other compression algorithms, coupled with different choices by broadcasters regarding sampling, quantization, and other bandwidth selection parameters will affect how different images with high levels of detail will be transmitted and reproduced on viewers' displays. Consequently, different embodiments are provided to assure a best fit with chosen transmission and display parameters.

MPEG-2 is the most popular compression algorithm used in video applications today in the television industry, including for satellite, cable, broadcast, DVDs and HDTV. It can be used with video streams representing many different image sizes. Video delivery suppliers can reduce the bandwidth required in a number of ways. By sub-sampling, for instance, broadcasters can reduce the size of the image before it is compressed by the MPEG-2 algorithm, although with a resulting loss of image quality. The algorithms of the present invention should be applied to the image after any sub-sampling is done to prevent loss of information about which pixel data should go to which eye of a viewer. Although MPEG-2 is considered a standard, it isn't a single algorithm. Many versions of MPEG-2 encoding algorithms exist and the industry does not regulate exactly how the compression is carried out, as long as the (much simpler) decoding algorithms employed at the receiving end are capable of decoding an acceptable image, regardless of the compression variations utilized on the transmission end. Generally, MPEG-2 breaks each frame down into 8 pixel×8 pixel blocks and reconfigures their data using a discrete cosine transform (DCT quantization) to reduce data content within each frame. Different levels of quantization can be chosen to reduce bandwidth, and, since low contrast, high frequency components are extremely difficult to see, they can be removed to reduce bandwidth with little or no loss of perceived image quality. The majority of the compression provided by MPEG-2, however, is accomplished by removing redundancy between frames. With this technique, a full frame is sent once in a while, with only the changes between full frames sent regularly. Since the number of changes may vary widely from time to time, while the overall system has a fixed bit-rate, buffers have to be used to deal with the varying amounts of time these changes require. Algorithms are used to prevent underflow and overflow of these buffers by, for instance, dropping or repeating video frames. On the receiving end, intermediate frames, which weren't actually sent, are reconstructed from this reduced set of frame data. Manufacturers can employ different rate control algorithms, which include motion estimation and prediction, to reconstruct a full sequence of frames to be displayed, and most such systems remain proprietary.

To deal with the possibility of compression technology that is too "lossy", further alternate embodiments, still based on the basic principles of the present invention, are offered to assure that left and right image data isn't lost and remains separate and not commingled. These other embodiments accomplish essentially the same transmission and display results utilizing the same basic principals of the present invention, although data layout and pixel-part addressing schemes and timing vary from one embodiment to another.

Figure 16:
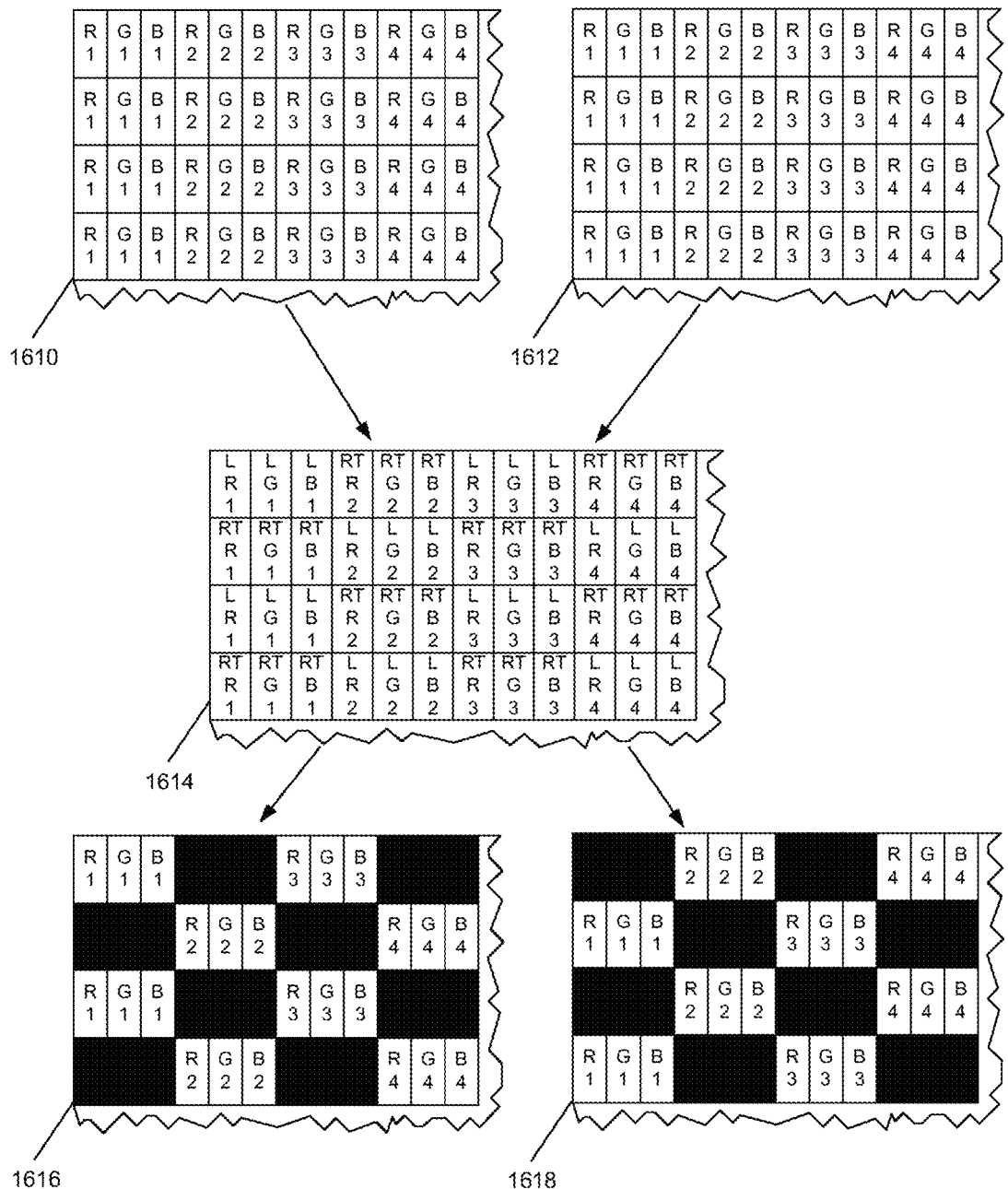
FIG. 16 shows an alternate data processing arrangement for producing composite images from two stereoscopic image streams.
Figure 17:
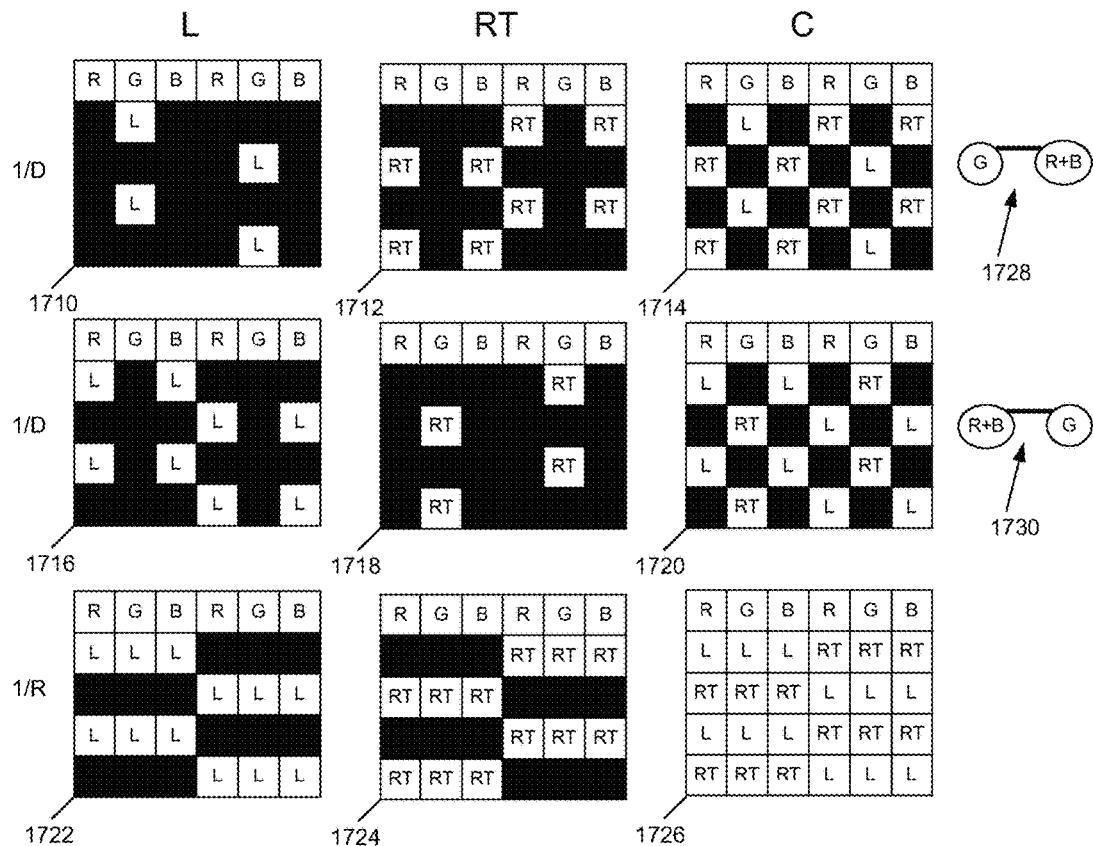
FIG. 17 shows an alternate pixel arrangement displayed on a monitor over time, including labeling of the signal information content of the pixels, produced as a result of one embodiment of digital video compression of the present invention.

FIG. 16 shows an alternate data processing arrangement for producing composite images from two stereoscopic image streams. This encoding scheme can be referred to by the acronym "SLAP" for staggered line, alternating pixel encoding. Chart 1614 of FIG. 16 shows a composite image constructed from the left and right images 1610 and 1612 encoded into one frame. As can be seen, each whole pixel comes from a whole pixel from either the left-eye or right-eye image. This differs from the preferred embodiments discussed herein above, in which data from the two images of any given stereo pair is mixed within each pixel in the composite image. Every pixel within a row originates either from the left-eye image or the right-eye image in an alternating fashion. In addition, each row is staggered with respect to which eye's image the odd and even pixels within the row comes from. In other words, in the odd rows, the odd numbered pixels come from one eye's image (the left eye, for instance) and the even numbered pixels come from the other eye's image (the right eye, for instance), while, in the even rows, the opposite is true. Selection of sub-pixel data values from the images in the stereoscopic image buffers 514 is carried out in the same basic manner by the image encoder 518 as it is in the other embodiments of the present invention to form the composite image to be sent. After compression and delivery to an image decoder 530, the composite image is decoded into a different arrangement as can be seen in FIG. 17. Charts 1710 and 1712 show the sub-pixel arrangements displayed to viewers' left and right eyes, respectively, during the first 1/D period of time, with Chart 1714 depicting the composite image displayed for both eyes during that period. For polarized displays, the sub-pixels labeled with an "L" would be polarized utilizing the present invention so that they would be seen by the left eyes of viewers wearing passive polarized glasses while the sub-pixels labeled with an "R" would be polarized utilizing the present invention so that they would be seen by the right eyes of viewers wearing passive polarized glasses. Viewers wearing the active colored glasses of the present invention would see the indicated green sub-pixels with their left eyes while the indicated red and blue sub-pixels would be seen with their right eyes, as indicated by the colored glasses icon 1728. Charts 1716 and 1718 depict which sub-pixels are displayed to the left and right eyes of viewers during the next 1/D period of time, with Chart 1720 depicting the composite image seen by both eyes during that time period.

Again, the pixels labeled with an "L" would be polarized utilizing the present invention so that they would be seen by the left eyes of viewers wearing passive polarized glasses while the sub-pixels labeled with an "R" would be polarized utilizing the present invention so that they would be seen by the right eyes of viewers wearing passive polarized glasses. Colored glasses icon 1730 shows which colors are shown to each eye of viewers wearing the active colored glasses of the present invention. As can be seen in Charts 1722 and 1724, during the display of a full frame over a period of time 1/R, each eye of viewers sees entire pixels which originate from either the left-eye image or the right-eye image of the original stereo pair. The composite image shown to both eyes during the display of a full frame is shown in Chart 1726. However, even though each eye of viewers sees entire pixels which originate from entire pixels in the left-eye and right-eye images in this embodiment, the selection and presentation of sub-pixels during different time periods still allows the viewing of 3-D images by viewers with transmission and/or display of the same signal whether viewers are using passive polarized or active colored glasses (as in the embodiments of the present invention described herein above).

Instead of selecting and arranging data on the transmission end within the mixer 518 as depicted in Chart 1614, the preferred arrangement depicted in Chart 614 could be utilized with this alternate embodiment to provide the arrangement of pixel data shown in Chart 1726 utilizing interpolation as detailed elsewhere in this specification.

Figure 18:
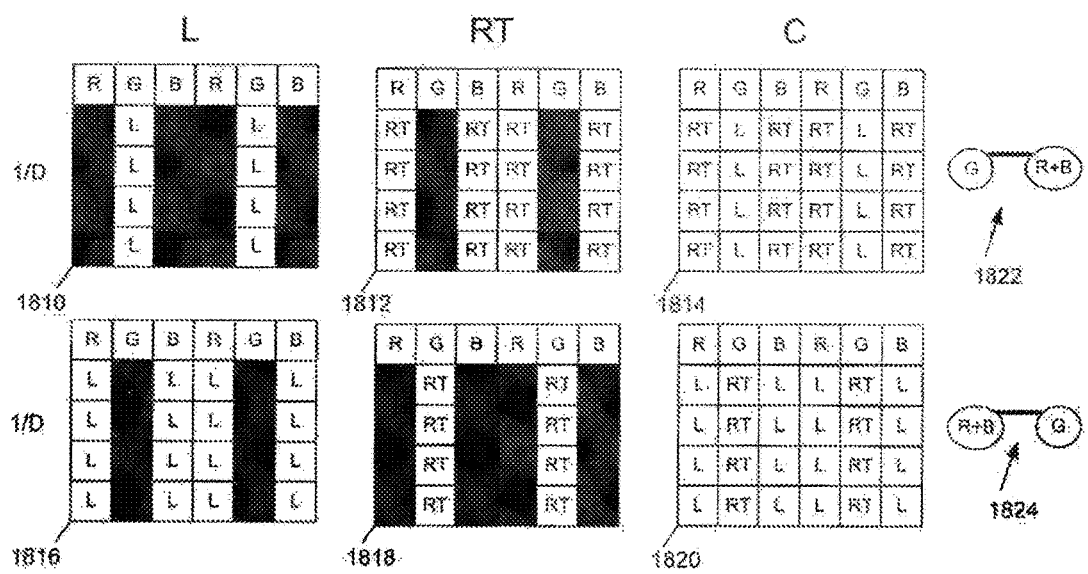
FIG. 18 shows another pixel arrangement displayed on a monitor over time, including labeling of the signal information content of the pixels, produced as a result of one embodiment of digital video compression of the present invention.

FIG. 18 shows a fourth pixel data processing arrangement for producing composite images from two stereoscopic image streams. In this encoding scheme, each sub-pixel changes from the left eye to the right eye, and vice versa, from one field to the next. For a given frame, the first field contains the G-part of the pixel data for the left-eye image as shown by the left-eye chart 1810 and composite chart 1814, and the RB-part of the pixel data for the right-eye image, as shown by the right-eye chart 1812 and the composite chart 1814. Colored glasses icon 1822 also shows which eye sees which pixel-parts for this field. The subsequent field contains the data for the RB-parts of the left eye-image, as shown by left-eye chart 1816 and composite chart 1820, in addition to the G-parts of the right-eye image, as shown by chart 1818 and composite chart 1820. Colored glasses icon 1824 also illustrates this fact. This encoding scheme is compatible with an active colored glasses viewing system, but to work with a passive polarized viewing system, a pi-cell must be employed in addition to the micro-waveplate lens array filter described elsewhere herein. In this case, the pi-cell would be placed between the "D" and "E" layers of the micro-waveplate filter to rotate all linear polarizations of all sub-pixels by 90 degrees on a repeating basis in synchronization with the image field rate and the active colored glasses (when used). Starting with a particular polarization for each sub-pixel, the pi-cell would rotate the polarization for each sub-pixel 90 degrees for every field. By alternating the polarization of each sub-pixel from one field to the next with a pi-cell, a viewer wearing passive polarized glasses would receive the correct left and right eye information at all times.

As can be seen from the above descriptions, the present invention has the capability of providing images with new pixel data configurations that can be displayed in 3-D and full color to viewers wearing either passive polarized glasses or the static or active anaglyphic glasses of the present invention.

As mentioned with reference to FIG. 4, the various existing 3-D formats including anaglyph or other color separation methods, formats where the left and right images are placed side by side on the screen, formats where one eye's image is placed vertically above the other eye's image, interlaced-odd-even images, page-flipping, and the diamond-checkerboard format discussed with reference to published U.S. Patent Application 2008/0036854 can be converted into a signal encoded with one of the inventive encoding schemes disclosed herein.

The above-described embodiments are intended to illustrate the principles of the invention, but not to limit its scope. Other embodiments and variations will be apparent to those skilled in the art and may be made without departing from the spirit and scope of the invention.

The invention claimed is:

1. A method for compressing and encoding an input high resolution image stream, comprising:
    (a) receiving from an input video source into a processor having a first input buffer, a second input buffer, and a third input buffer an input high resolution image stream of sequential image frames having an input frame rate and an input transmission bandwidth, said input high resolution image stream comprising input high resolution image frames, each said input high resolution image frame comprising input pixels, each said input pixel comprising input pixel parts, each said input pixel part comprising one or more input sub-pixels, each said input sub-pixel comprising an input color value and an input luminance value;
    (b) generating one or more first-image frames, each said first-image frame comprising first-image pixels, each said first-image pixel comprising first-image pixel parts, each said first-image pixel part comprising one or more first-image sub-pixels, each said first-image sub-pixel comprising a first-image color value and a first-image luminance value, and one or more second-image frames, each said second-image frame comprising second-image pixels, each said second-image pixel comprising second-image pixel parts, each said second-image pixel part comprising one or more second-image sub-pixels, each said second-image sub-pixel comprising a second-image color value and a second-image luminance value, the generating comprising:
    (c) storing in said memory said input color values and said input luminance values of the sub-pixels of the first input pixel from an input high resolution image frame, said memory now comprising a first-image pixel, storing in said memory said input color values and said input luminance values of the sub-pixels of the second input pixel from said input high resolution image frame, said memory now comprising a second-image pixel, repeating the previous two steps until all input pixels in said input high resolution image frame have been stored in said memory, said memory now comprising a first-image frame and a second-image frame, said first-image frame comprising said first-image pixels, and said second-image frame comprising said second-image pixels, and storing in said first image buffer said input color values and said input luminance values of the sub-pixels of odd-numbered input pixels from said input high resolution image frame, said first image buffer now containing a first-image frame;
    (d) storing in said second image buffer said input color values and said input luminance values of the sub-pixels of even-numbered input pixels from said input high resolution image frame, said second image buffer now containing a second image frame;
    (e) performing steps (c) and (d) until the desired number of first-image frames is stored in said first input buffer and the desired number of second-image frames is stored in said second input buffer;
    (f) generating one or more composite image frames from said first-image frames and said second-image frames, each said composite image frame having a sub-pixel layout of sub-pixel positions, each of said sub-pixel positions being either a first-image sub-pixel position or a second-image sub-pixel position, each said composite image frame comprising composite pixels, each said composite pixel comprising composite pixel parts, each said composite pixel part comprising one or more composite sub-pixels, each said composite sub-pixel comprising a composite color value and a composite luminance value, each said composite sub-pixel being positioned in one of a first image sub-pixel position or a second image sub-pixel position in said composite image frame, wherein said composite resolution is approximately the same as said first-image resolution and said second-image resolution, the generating comprising:
    (g) storing said composite pixels in said third input buffer, each composite pixel comprising one or more first-image pixel parts, one or more second-image pixel parts, or one first-image pixel part and one second-image pixel part, and performing said storing until said third input buffer holds a number of composite pixels equal to one of (1) the number of first-image pixels in a first-image frame and (2) the number of second-image pixels in a second-image frame, said third input buffer now containing a composite image frame, and performing steps (e) and (f) until the desired number of composite image frames is stored in said third input buffer, wherein each first-image sub-pixel position in the subpixel layout in each composite image frame comprises a first-image sub-pixel and each second-image sub-pixel position in the sub-pixel layout in each composite image frame comprises a second-image sub-pixel, and wherein said sub-pixel layout is constant from composite image frame to composite image frame
    (h) transmitting said one or more composite image frames from said processor, one or more said transmitted composite image frames comprising a sequential composite image stream, said composite image stream having a composite frame rate and a composite transmission bandwidth, said composite frame rate being approximately the same as said input frame rate, said composite transmission bandwidth being approximately the same as said input transmission bandwidth, and the sub-pixel layout of each composite image frame remaining constant from composite image frame to composite image frame;
(i) receiving into a display device said composite image stream; and
(j) displaying on said display device said composite image stream to a human viewer, so that said human viewer perceives said composite image stream as continuous high resolution video.

2. The method of claim 1 wherein said high resolution image stream is a double resolution image stream.

\* \* \* \* \*